US012386028B2

(12) United States Patent
Kishigami

(10) Patent No.: US 12,386,028 B2
(45) Date of Patent: Aug. 12, 2025

(54) RADAR APPARATUS

(71) Applicant: Panasonic Intellectual Property Management Co., Ltd., Osaka (JP)

(72) Inventor: Takaaki Kishigami, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 741 days.

(21) Appl. No.: 17/532,843

(22) Filed: Nov. 22, 2021

(65) Prior Publication Data

US 2022/0171048 A1 Jun. 2, 2022

(30) Foreign Application Priority Data

Nov. 27, 2020 (JP) .................................. 2020-197085

(51) Int. Cl.
*G01S 7/02* (2006.01)
*G01S 13/32* (2006.01)
*G01S 13/34* (2006.01)
*G01S 13/931* (2020.01)

(52) U.S. Cl.
CPC .......... *G01S 7/0233* (2021.05); *G01S 13/325* (2013.01); *G01S 13/343* (2013.01); *G01S 13/931* (2013.01)

(58) Field of Classification Search
CPC ...... G01S 7/0233; G01S 7/354; G01S 13/931; G01S 13/325; G01S 13/343
See application file for complete search history.

(56) References Cited

U.S. PATENT DOCUMENTS

| 9,541,638 B2 | 1/2017 | Jansen et al. |
| 11,099,267 B2 | 8/2021 | Wu et al. |
| 11,555,882 B2 * | 1/2023 | Bai .......................... G01S 7/35 |

(Continued)

FOREIGN PATENT DOCUMENTS

| GB | 2247356 A | 2/1992 |
| JP | 2008-304417 A | 12/2008 |

(Continued)

OTHER PUBLICATIONS

Li et al., "MIMO Radar with Colocated Antennas," *IEEE Signal Processing Magazine*, pp. 106-114, Sep. 2007, 9 pages.

(Continued)

*Primary Examiner* — Matthew M Barker
(74) *Attorney, Agent, or Firm* — Seed IP Law Group LLP

(57) ABSTRACT

The radar apparatus includes: a plurality of transmission antennas that transmit a transmission signal; and a transmission circuit that applies a phase rotation amount corresponding to a Doppler shift amount and a code sequence to the transmission signal to perform multiplexing transmission of the transmission signal from the plurality of transmission antennas. A transmission delay of the transmission signal is set for a transmission period of the transmission signal. Each of the plurality of transmission antennas is associated with a combination of the Doppler shift amount and the code sequence such that at least one of the Doppler shift amount and the code sequence is different between a plurality of the combinations. A number of multiplexing by the code sequence corresponding to a first Doppler shift amount is different from a number of multiplexing by the code sequence corresponding to a second Doppler shift amount.

13 Claims, 24 Drawing Sheets

(56) References Cited

U.S. PATENT DOCUMENTS

| | | |
|---|---|---|
| 11,808,880 B2 * | 11/2023 | Bai .................. G01S 13/44 |
| 2008/0303711 A1 | 12/2008 | Matsuoka |
| 2011/0074620 A1 | 3/2011 | Wintermantel |
| 2011/0074621 A1 | 3/2011 | Wintermantel |
| 2011/0080313 A1 | 4/2011 | Wintermantel et al. |
| 2011/0080314 A1 | 4/2011 | Wintermantel |
| 2017/0115384 A1 | 4/2017 | Loesch et al. |
| 2017/0131392 A1 | 5/2017 | Schoor et al. |
| 2017/0131393 A1 | 5/2017 | Schoor et al. |
| 2017/0131399 A1 | 5/2017 | Ioannidis et al. |
| 2018/0088224 A1 | 3/2018 | Kishigami |
| 2019/0379137 A1 | 12/2019 | Ohguchi |
| 2020/0182991 A1 | 6/2020 | Hakobyan et al. |
| 2021/0080537 A1 * | 3/2021 | Melzer ............... G01S 13/584 |
| 2022/0107402 A1 | 4/2022 | Kishigami |
| 2022/0171049 A1 | 6/2022 | Wu et al. |
| 2023/0092131 A1 * | 3/2023 | Lao .................. G01S 7/35 342/200 |

FOREIGN PATENT DOCUMENTS

| | | | |
|---|---|---|---|
| JP | 2011-526371 | A | 10/2011 |
| JP | 2014-119344 | A | 6/2014 |
| JP | 2016090431 | A | 5/2016 |
| JP | 2016090432 | A | 5/2016 |
| JP | 2017-522549 | A | 8/2017 |
| JP | 2017-522575 | A | 8/2017 |
| JP | 2017-522576 | A | 8/2017 |
| JP | 2018054327 | A | 4/2018 |
| JP | 2019211388 | A | 12/2019 |
| JP | 2020148754 | A | 9/2020 |

OTHER PUBLICATIONS

Kronauge et al., "Fast Two-Dimensional CFAR Procedure," *IEEE Transactions on Aerospace and Electronic Systems*, 49(3): 1817-1823, Jul. 2013, 7 pages.

Cadzow, "Direction-of-Arrival Estimation Using Signal Subspace Modeling," *IEEE Transactions on Aerospace and Electronic Systems*, 28(1):64-79, Jan. 1992, 16 pages.

Japanese Notice of Reasons for Refusal dated Jan. 30, 2024, for the corresponding 1 Japanese Patent Application No. 2020-197085, 5 pages. (With English Machine Translation).

English Translation of Japanese Notice of Reasons for Refusal, dated Apr. 9, 2024, for 1 Japanese Patent Application No. 2020-204938. (6 pages).

* cited by examiner (a) Case where $N_{DOP\_CODE}(1) = 2$ and $N_{DOP\_CODE}(2) = 1$ (b) Case where $N_{DOP\_CODE}(1) = 1$ and $N_{DOP\_CODE}(2) = 2$ (a) Case where $N_{DOP\_CODE}(1) = 2$ and $N_{DOP\_CODE}(2) = 1$ (b) Case where $N_{DOP\_CODE}(1) = 1$ and $N_{DOP\_CODE}(2) = 2$ (a) Case where $N_{DOP\_CODE}(1) = 2$, $N_{DOP\_CODE}(2) = 1$, and $N_{DOP\_CODE}(3) = 1$ (b) Case where $N_{DOP\_CODE}(1) = 1$, $N_{DOP\_CODE}(2) = 2$, and $N_{DOP\_CODE}(3) = 1$ (c) Case where $N_{DOP\_CODE}(1) = 1$, $N_{DOP\_CODE}(2) = 1$, and $N_{DOP\_CODE}(3) = 2$ (a) Case where $N_{DOP\_CODE}(1) = 2$, $N_{DOP\_CODE}(2) = 1$, and $N_{DOP\_CODE}(3) = 1$ (b) Case where $N_{DOP\_CODE}(1) = 2$, $N_{DOP\_CODE}(2) = 1$, and $N_{DOP\_CODE}(3) = 1$ (c) Case where $N_{DOP\_CODE}(1) = 2$, $N_{DOP\_CODE}(2) = 1$, and $N_{DOP\_CODE}(3) = 1$ (a) Case where $N_{DOP\_CODE}(1) = 3$ and $N_{DOP\_CODE}(2) = 1$ (b) Case where $N_{DOP\_CODE}(1) = 1$ and $N_{DOP\_CODE}(2) = 3$ (a) Case where the same code is used (b) Case where different codes are used (a) Case where $N_{DOP\_CODE}(1) = N_{DOP\_CODE}(2) = 2$ and $N_{DOP\_CODE}(3) = N_{DOP\_CODE}(4) = 1$ (b) Case where $N_{DOP\_CODE}(1) = N_{DOP\_CODE}(3) = 2$ and $N_{DOP\_CODE}(2) = N_{DOP\_CODE}(4) = 1$ (a) Case where the same code is used (b) Case where different codes are used

RADAR APPARATUS

TECHNICAL FIELD

The present disclosure relates to a radar apparatus.

BACKGROUND ART

Recently, studies have been developed on radar apparatuses that use a radar transmission signal of a short wavelength including a microwave or a millimeter wave that can achieve high resolution. Further, it has been demanded to develop a radar apparatus which senses small objects such as pedestrians in addition to vehicles in a wide-angle range (e.g., referred to as "wide-angle radar apparatus") in order to improve the outdoor safety.

Examples of the configuration of the radar apparatus having a wide-angle sensing range include a configuration using a technique of receiving a reflected wave from a target by an array antenna composed of a plurality of antennas (or also referred to as antenna elements), and estimating the direction of arrival of the reflected wave (or referred to as the angle of arrival) using a signal processing algorithm based on received phase differences with respect to element spacings (antenna spacings) (Direction of Arrival (DOA) estimation). Examples of the DOA estimation include a Fourier method, and, a Capon method, Multiple Signal Classification (MUSIC), and Estimation of Signal Parameters via Rotational Invariance Techniques (ESPRIT) that are methods achieving higher resolution.

In addition, a radar apparatus has been proposed which, for example, includes a plurality of antennas (array antenna) at a transmitter side in addition to at a receiver side, and is configured to perform beam scanning through signal processing using the transmission and reception array antennas (also referred to as Multiple Input Multiple Output (MIMO) radar) (e.g., see Non-Patent Literature (hereinafter referred to as "NPL") 1).

CITATION LIST

Patent Literature

PTL 1
Japanese Patent Application Laid-Open No. 2008-304417
PTL 2
Japanese Unexamined Patent Application Publication (Translation of PCT Application) No. 2011-526371
PTL 3
Japanese Patent Application Laid-Open No. 2014-119344

Non Patent Literature

NPL 1
J. Li, and P. Stoica, "MIMO Radar with Colocated Antennas," Signal Processing Magazine, IEEE Vol. 24, Issue: 5, pp. 106-114, 2007
NPL 2
M. Kronauge, H. Rohling, "Fast two-dimensional CFAR procedure," IEEE Trans. Aerosp. Electron. Syst., 2013, 49, (3), pp. 1817-1823
NPL 3
Direction-of-arrival estimation using signal subspace modeling Cadzow, J. A.; Aerospace and Electronic Systems, IEEE Transactions on Volume: 28, Issue: 1 Publication Year: 1992, Page(s): 64-79

SUMMARY OF INVENTION

However, methods for a radar apparatus (e.g., MIMO radar) to sense a target object (or a target) have not been comprehensively studied.

One non-limiting and exemplary embodiment of the present disclosure facilitates providing a radar apparatus with an enhanced sensing accuracy for sensing a target object.

A radar apparatus according to an exemplary embodiment of the present disclosure includes: a plurality of transmission antennas that transmit a transmission signal; and a transmission circuit that applies a phase rotation amount corresponding to a Doppler shift amount and a code sequence to the transmission signal to perform multiplexing transmission of the transmission signal from the plurality of transmission antennas, in which a transmission delay of the transmission signal is set for a transmission period of the transmission signal, each of the plurality of transmission antennas is associated with a combination of the Doppler shift amount and the code sequence such that at least one of the Doppler shift amount and the code sequence is different between a plurality of the combinations, and a number of multiplexing by the code sequence corresponding to a first Doppler shift amount of a plurality of the Doppler shift amounts is different from a number of multiplexing by the code sequence corresponding to a second Doppler shift amount of the plurality of Doppler shift amounts.

Note that these generic or specific exemplary embodiments may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, the target-object sensing accuracy of a radar apparatus can be improved.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
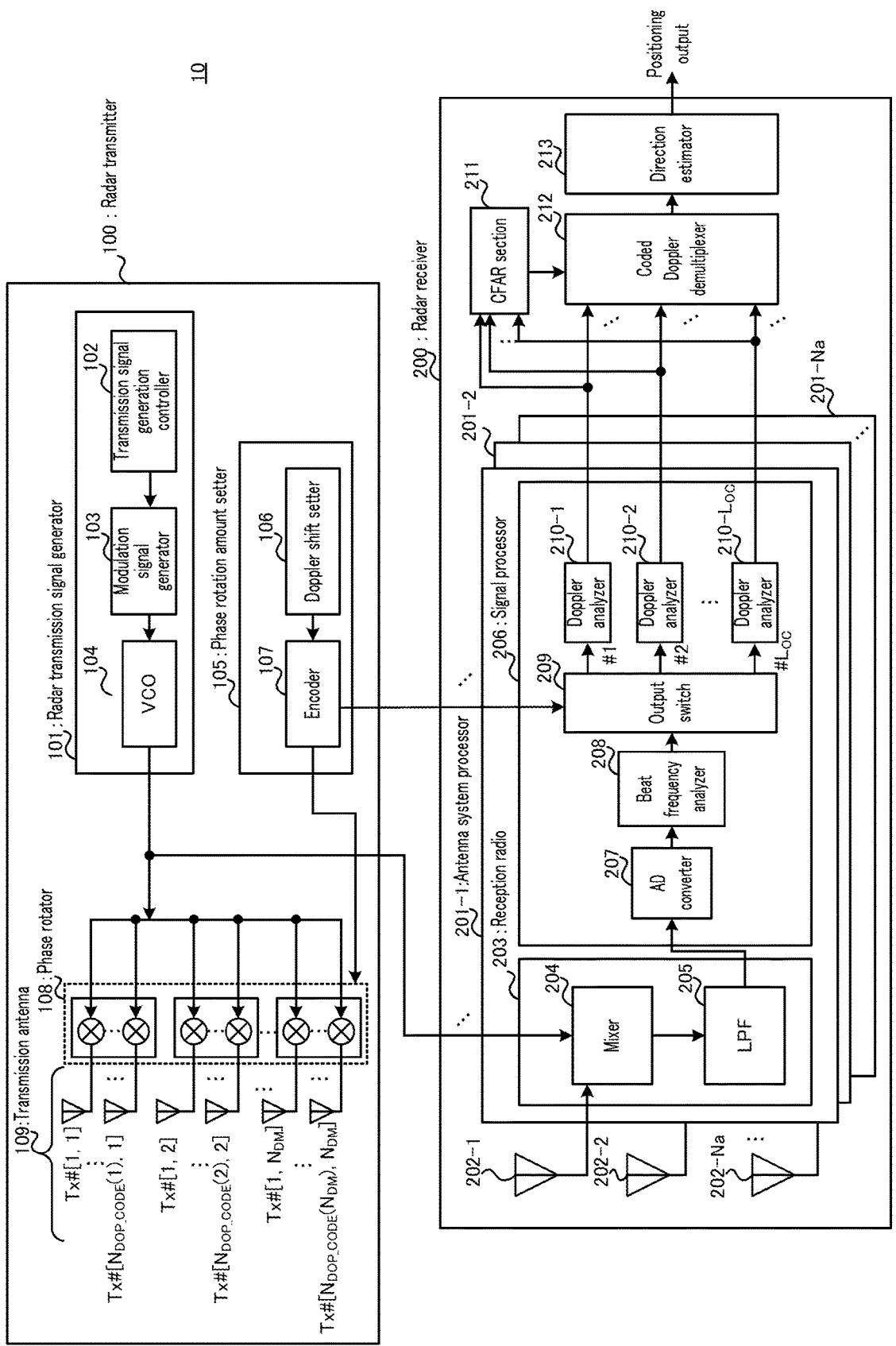
FIG. 1 is a block diagram illustrating an example of a configuration of a radar apparatus.

A MIMO radar transmits, from a plurality of transmission antennas (also referred to as "transmission array antenna"), signals (radar transmission waves) that are time-division, frequency-division, or code-division multiplexed, for example. The MIMO radar then receives signals (radar reflected waves) reflected, for example, by an object around the radar using a plurality of reception antennas (also referred to as "reception array antenna") to separate and receive multiplexed transmission signals from reception signals. With this processing, the MIMO radar can extract a propagation path response indicated by the product of the number of transmission antennas and the number of reception antennas, and performs array signal processing using these reception signals as a virtual reception array.

Further, in the MIMO radar, it is possible to enlarge the antenna aperture of the virtual reception array so as to enhance the angular resolution by appropriately arranging element spacings in transmission and reception array antennas.

For example, PTL 1 discloses a MIMO radar (hereinafter referred to as a "time-division multiplexing MIMO radar") that uses, as a multiplexing transmission method for the MIMO radar, time-division multiplexing transmission by which signals are transmitted at transmission times shifted per transmission antenna. Time-division multiplexing transmission can be implemented with a simpler configuration than frequency multiplexing transmission or code multiplexing transmission. Further, the time-division multiplexing transmission can maintain proper orthogonality between the transmission signals with sufficiently large intervals between the transmission times. The time-division multiplexing MIMO radar outputs transmission pulses, which are an example of transmission signals, while sequentially switching the transmission antennas in a defined period. The time-division multiplexing MIMO radar receives, at a plurality of reception antennas, signals that are the transmission pulses reflected by an object, performs processing of correlating the reception signals with the transmission pulses, and then performs, for example, spatial fast Fourier transform (FFT) processing (processing for estimation of the directions of arrival of the reflected waves).

The time-division multiplexing MIMO radar sequentially switches the transmission antennas, from which the transmission signals (for example, the transmission pulses or radar transmission waves) are to be transmitted, in a defined period. Accordingly, in the time-division multiplexing transmission, transmission of the transmission signals from all the transmission antennas may take a longer time to be completed than in frequency-division transmission or code-division transmission. Accordingly, for example, in a case where transmission signals are transmitted respectively from transmission antennas and Doppler frequencies (i.e., the relative velocities of a target) are detected from their reception phase changes as in PTL 2, the time interval for observing the reception phase changes (for example, sampling interval) for application of Fourier frequency analysis to detect the Doppler frequencies is long. This reduces frequency conditions satisfying the sampling theorem, for example, the Doppler frequency range where the Doppler frequency can be detected without aliasing (i.e., the range of detectable relative velocities of the target).

If a reflected wave signal outside the Doppler frequency range over which the Doppler frequency can be detected without aliasing (in other words, the range of relative velocities) is assumed to come from the target, the radar apparatus is unable to identify whether the reflected wave signal is an aliasing component. Accordingly, the ambiguity (uncertainty) of the Doppler frequency (in other words, the relative velocity of the target) is caused.

For example, when the radar apparatus transmits transmission signals (transmission pulses) while sequentially switching Nt transmission antennas in periods Tr, it takes a transmission time given by Tr×Nt to complete transmission of the transmission signals from all the transmission antennas. In a case where this time-division multiplexing transmission operation is repeated $N_c$ times and Fourier frequency analysis is applied for detection of the Doppler frequency, the Doppler frequency range in which the Doppler frequency can be detected without aliasing is $\pm 1/(2Tr \times Nt)$ according to the sampling theorem. Accordingly, the Doppler frequency range over which the Doppler frequency can be detected without aliasing decreases as number Nt of transmission antennas increases, and the ambiguity of the Doppler frequency is likely to occur even for lower relative velocities.

In the time-division multiplexing MIMO radar, the ambiguity of the Doppler frequency described above is likely to occur for lower relative velocities. In the following, focus is on a method for simultaneously multiplexing and transmitting transmission signals from a plurality of transmission antennas, as an example.

Examples of the method for simultaneously multiplexing and transmitting transmission signals from a plurality of transmission antennas include a method (hereinafter referred to as Doppler multiplexing transmission) for transmitting signals such that a plurality of transmission signals can be separated in the Doppler frequency domain on the receiving side (see, for example, PTL 3).

In the Doppler multiplexing transmission, on the transmitting side, transmission signals are simultaneously transmitted from a plurality of transmission antennas in such a manner that, for example, with respect to a transmission signal to be transmitted from a reference transmission antenna, transmission signals to be transmitted from transmission antennas different from the reference transmission antenna are given Doppler shift amounts greater than the Doppler frequency bandwidth of reception signals. In the Doppler multiplexing transmission, on the receiving side, filtering is performed in the Doppler frequency domain to separate and receive the transmission signals transmitted from the respective transmission antennas.

In the Doppler multiplexing transmission as compared with time-division multiplexing transmission, simultaneous transmission of transmission signals from a plurality of transmission antennas can reduce the time interval for observing the reception phase changes for application of Fourier frequency analysis to detect the Doppler frequencies (or relative velocities). In the Doppler multiplexing transmission, however, since filtering is performed in the Doppler frequency domain to separate the transmission signals of the respective transmission antennas, the effective Doppler frequency bandwidth per transmission signal is restricted.

For example, Doppler multiplexing transmission in which a radar apparatus transmits transmission signals from Nt transmission antennas in periods Tr will be described. When this Doppler multiplexing transmission operation is repeated $N_c$ times and Fourier frequency analysis is applied for detection of the Doppler frequency (or relative velocity), the Doppler frequency range over which the Doppler frequency can be detected without aliasing is $\pm 1/(2 \times Tr)$ according to the sampling theorem. For example, in the Doppler multiplexing transmission, the Doppler frequency range over which the Doppler frequency can be detected without aliasing is increased by Nt times in comparison with time-division multiplexing transmission (for example, $\pm 1/(2Tr \times Nt)$).

Note that, in the Doppler multiplexing transmission, as described above, filtering is performed in the Doppler frequency domain to separate transmission signals. Accordingly, the effective Doppler frequency bandwidth per transmission signal is restricted to $1/(Tr \times Nt)$, and thus a Doppler frequency range similar to that in time-division multiplexing transmission is obtained. Further, in the Doppler multiplexing transmission, in a Doppler frequency band exceeding the effective Doppler frequency range per transmission signal, the transmission signal intermingles with a signal in a Doppler frequency band of another transmission signal different from the transmission signal. It may thus be difficult to correctly separate the transmission signals.

Accordingly, an exemplary embodiment of the present disclosure describes a method for extending the range of Doppler frequencies over which ambiguity does not occur in the Doppler multiplexing transmission. With this method, a radar apparatus according to an exemplary embodiment of the present disclosure can improve target-object sensing accuracy over a wider Doppler frequency range.

Embodiments of the present disclosure will be described in detail with reference to the drawings. In the embodiments, the same constituent elements are identified with the same numerals, and a description thereof is omitted to avoid redundancy.

The following describes a configuration of a radar apparatus (in other words, MIMO radar configuration) having a transmitting branch in which multiplexed different transmission signals are simultaneously sent from a plurality of transmission antennas, and a receiving branch in which the transmission signals are separated and subjected to reception processing.

Further, by way of example, a description will be given below of a configuration of a radar system using a frequency-modulated pulse wave such as a chirp pulse (e.g., also referred to as chirp pulse transmission (fast chirp modulation)). However, the modulation scheme is not limited to frequency modulation. For example, an exemplary embodiment of the present disclosure is also applicable to a radar system that uses a pulse compression radar configured to transmit a pulse train after performing phase modulation or amplitude modulation on the pulse train.

Further, the radar apparatus performs Doppler multiplexing transmission. In addition, in the Doppler multiplexing transmission, the radar apparatus performs coding (for example, code division multiplexing (CDM)) on signals (hereinafter referred to as "Doppler-multiplexed transmission signals") to which different phase rotations (in other words, phase shifts), the number of which corresponds to the number of Doppler multiplexing, are applied, so as to multiplex and transmit the coded signals (hereinafter referred to as "coded Doppler multiplexing").

[Configuration of Radar Apparatus]

FIG. 1 is a block diagram illustrating an example of configuration of radar apparatus 10 according to the present embodiment.

Radar apparatus 10 includes radar transmitter (transmitting branch) 100 and radar receiver (receiving branch) 200.

Radar transmitter 100 generates radar signals (radar transmission signals) and transmits the radar transmission signals in a defined transmission period using a transmission array antenna composed of a plurality of transmission antennas 109 (for example, Nt transmission antennas).

Radar receiver 200 receives reflected wave signals, which are radar transmission signals reflected by a target object (target) (not illustrated), using a reception array antenna composed of a plurality of reception antennas 202-1 to 202-Na. Radar receiver 200 performs signal processing on the reflected wave signals received at reception antennas 202 to, for example, detect the presence or absence of the target object, or estimate the distances through which the reflected wave signals arrive, the Doppler frequencies (in other words, the relative velocities), and the directions of arrival, and outputs information on an estimation result (in other words, positioning information).

Note that, radar apparatus 10 may be mounted, for example, on a mobile body such as a vehicle, and a positioning output of radar receiver 200 (information on the estimation result) may, for example, be connected to an Electronic Control Unit (ECU) (not illustrated) such as an Advanced Driver Assistance System (ADAS) or an autonomous driving system for enhancing the collision safety and utilized for a vehicle drive control or alarm call control.

Radar apparatus 10 may also be mounted on a relatively high-altitude structure (not illustrated), such as, for example, a roadside utility pole or traffic lights. Radar apparatus 10 may also be utilized, for example, as a sensor of a support system for enhancing the safety of passing vehicles or pedestrians, or as a sensor of a suspicious intrusion prevention system (not illustrated). In this case, the positioning output of radar receiver 200 may also be connected, for example, to a control device (not illustrated) in the support system or the suspicious intrusion prevention system for enhancing safety and may be utilized for an alarm call control or an abnormality detection control. The use of radar apparatus 10 is not limited to the above, and may also be used for other uses.

In addition, the target object is an object to be detected by radar apparatus 10. Examples of the target object include vehicles (including four-wheel and two-wheel vehicles), a person, and a block or a curb.

[Configuration of Radar Transmitter 100]

Radar transmitter 100 includes radar transmission signal generator 101, phase rotation amount setter 105, phase rotators 108, and transmission antennas 109.

Radar transmission signal generator 101 generates a radar transmission signal. Radar transmission signal generator 101 includes, for example, transmission signal generation controller 102, modulation signal generator 103, and Voltage Controlled Oscillator (VCO) 104. The constituent sections of radar transmission signal generator 101 will be described below.

Figure 2:
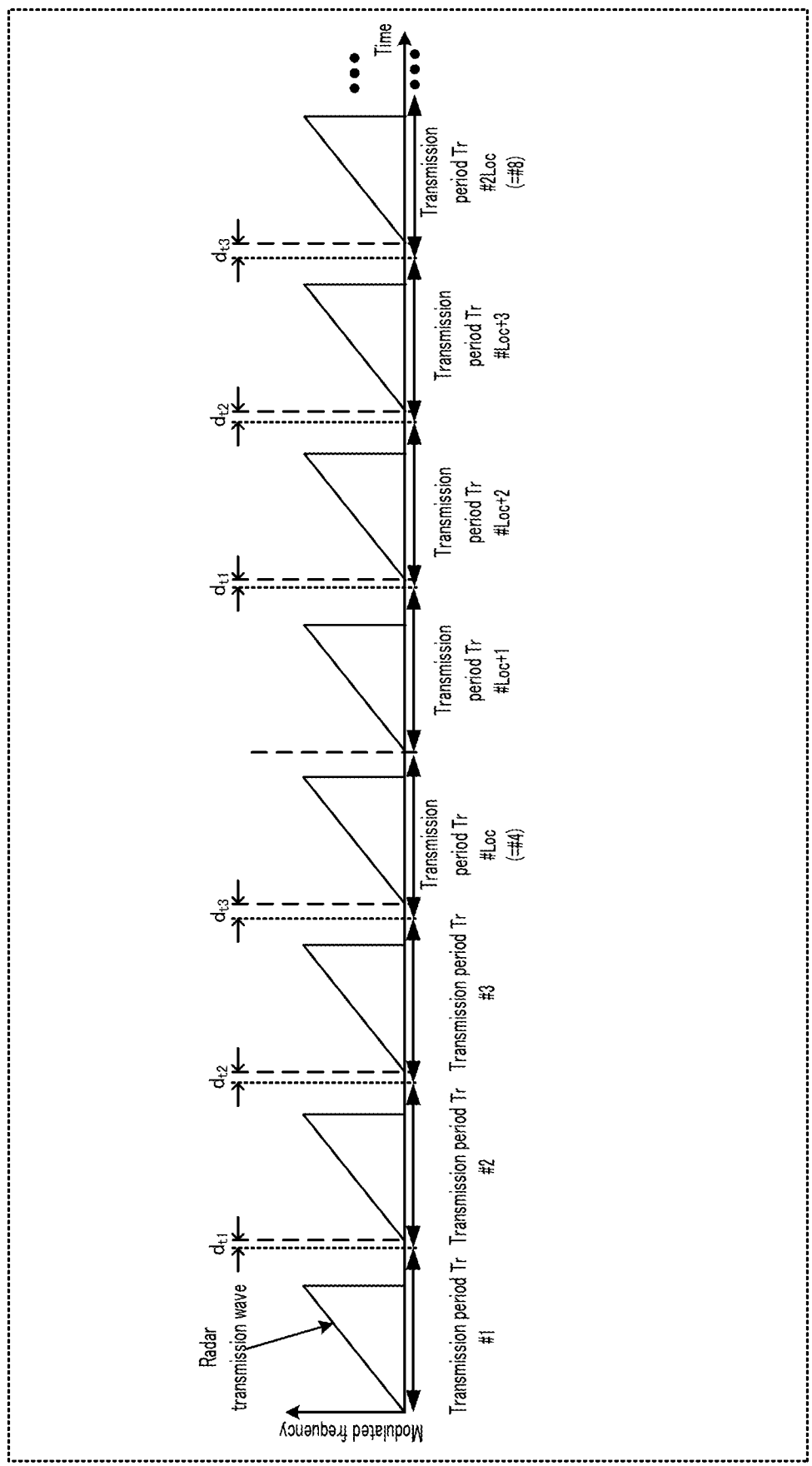
FIG. 2 illustrates an example of a transmission signal in a case where a chirp pulse is used.

Transmission signal generation controller 102 controls, for example, generation of the radar transmission signal. For example, transmission signal generation controller 102 may control a radar transmission signal transmission timing for radar transmission signal generator 101. FIG. 2 illustrates an example of radar transmission signals (for example, radar transmission waves) outputted from radar transmission signal generator 101.

For example, as illustrated in FIG. 2, transmission signal generation controller 102 may cyclically set transmission delays $d_{t1}, d_{t2}, \ldots, d_{t(Loc-1)}$ of the radar transmission signals for respective code transmission periods (which are described below in detail) (e.g., Loc×Tr) with respect to timings of transmission periods Tr (for example, referred to as "reference timings"). Transmission signal generation controller 102 may control a generation timing for generation of a modulation signal by modulation signal generator 103 with respect to the reference timing of each transmission period Tr, for example, based on the setting of transmission delays $d_t$.

Modulation signal generator 103 generates, for example, saw-toothed modulation signals based on the control of the generation timing by transmission signal generation controller 102.

VCO 104 outputs, based on the modulation signals outputted from modulation signal generator 103, frequency-modulated signals (hereinafter referred to as, for example, frequency chirp signals or chirp signals) to phase rotators 108 and radar receiver 200 (mixer 204 described below) as the radar transmission signals.

By the operation of radar transmission signal generator 101 as described above, the radar transmission waves are transmitted after the elapses of transmission delays $d_{t1}$, $d_{t2}, \ldots, d_{t(Loc-1)}$ set respectively for transmission periods Tr, for example, as illustrated in FIG. 2. For example, one of transmission delays $d_{t1}, d_{t2}, \ldots, d_{t(Loc-1)}$ is set for a radar transmission wave, for example, for each of transmission periods Tr. Note that while 0 may be set to one of transmission delays $d_{t1}, d_{t2}, \ldots, d_{t(Loc-1)}$, at least one transmission delay may include a value different from 0. Here, the radar transmission period is represented by Tr.

Note that a positive transmission delay represents delaying the time. Further, the transmission delay may be expressed by a negative value, which represents advancing the time.

Phase rotation amount setter 105 sets phase rotation amounts for phase rotators 108 (in other words, phase rotation amounts corresponding to Doppler shift amounts and code sequences, or, phase rotation amounts corresponding to coded Doppler multiplexing transmission). Phase rotation amount setter 105 includes, for example, Doppler shift setter 106 and encoder 107.

Doppler shift setter 106 sets, for example, a phase rotation amount corresponding to a Doppler shift amount to be applied to the radar transmission signal (for example, chirp signal).

Encoder 107 sets a phase rotation amount corresponding to coding (or a code sequence). Encoder 107 calculates phase rotation amounts for phase rotators 108 based on, for example, the phase rotation amounts inputted from Doppler shift setter 106 and the phase rotation amount corresponding to coding, and outputs the phase rotation amounts to phase rotators 108. Further, encoder 107 outputs, for example, information on the code sequence used for coding (for example, elements of orthogonal code sequences) to radar receiver 200 (for example, output switch 209).

Phase rotators 108 apply the phase rotation amounts inputted from encoder 107 to the chirp signals inputted from VCO 104 and outputs the signals subjected to phase rotation to transmission antennas 109. For example, each of phase rotators 108 includes a phase shifter and a phase modulator (not illustrated). The output signals of phase rotators 108 are amplified to a defined transmission power and are radiated respectively from transmission antennas 109 to space. In other words, radar transmission signals are multiplexed by application of the phase rotation amounts corresponding to the Doppler shift amounts and the orthogonal code sequences and are transmitted from a plurality of transmission antennas 109.

Next, an example method for phase rotation amount setter 105 to set the phase rotation amounts will be described.

Doppler shift setter 106 sets phase rotation amount $\varphi_{ndm}$ for applying Doppler shift amount $DOP_{ndm}$ and outputs phase rotation amount $\varphi_{ndm}$ to encoder 107. Here, ndm= 1, … $N_{DM}$. $N_{DM}$ denotes the set number of different Doppler shift amounts and is hereinafter referred to as the "number of Doppler multiplexing."

In radar apparatus 10, since coding performed by encoder 107 is used for some purposes, number $N_{DM}$ of Doppler multiplexing may be set smaller than number Nt of transmission antennas 109 used for multiplexing transmission. Note that, number $N_{DM}$ of Doppler multiplexing is greater than or equal to 2.

Doppler shift amounts at equal intervals, or Doppler shift amounts at unequal intervals may, for example, be set as Doppler shift amounts $DOP_1, DOP_2, \ldots,$ and $DOP_{N\_DM}$ (where "N_DM" corresponds to "$N_{DM}$"). Doppler shift amounts $DOP_1, DOP_2, \ldots,$ and $DOP_{N\_DM}$ may be set so as to satisfy, for example, $0 \leq DOP_1, DOP_2, \ldots, DOP_{N\_DM} < (1/TrL_{oc})$ since the coding by encoder 107 described later is used for purposes. Alternatively, Doppler shift amounts $DOP_1, DOP_2, \ldots,$ and $DOP_{N\_DM}$, for example, may be set to satisfy Expression 1:

[1]

$$\frac{-1}{2T_r L_{oc}} \leq DOP_1, DOP_2, \ldots, DOP_{DM} < \frac{1}{2T_r L_{oc}}. \quad \text{(Expression 1)}$$

Further, for example, minimum Doppler shift interval $\Delta f_{MinInterval}$ between Doppler shift amounts $DOP_1$, $DOP_2, \ldots,$ and $DOP_{N\_DM}$ may satisfy following Expression 2. Note that, the Doppler shift interval is defined as an absolute value of a difference between any two of Doppler shift amounts $DOP_1, DOP_2, \ldots,$ and $DOP_{DM}$. Here, —Loc represents the number of code elements (here, Loc represents the code length of the code used in encoder 107, which will be described later in detail in the description of the operation of encoder 107).

[2]

$$\Delta f_{MinInterval} \leq \frac{1}{T_r N_{DM} L_{oc}} \quad \text{(Expression 2)}$$

Further, phase rotation amount $\varphi_{ndm}$ for applying each of Doppler shift amounts $DOP_1, DOP_2, \ldots,$ and $DOP_{DM}$ is, for example, assigned as given in following Expression 3:

[3]

$$\phi_{ndm} = 2\pi DOP_{ndm} / \left(\frac{1}{T_r L_{oc}}\right). \quad \text{(Expression 3)}$$

Note that, when the Doppler shift amounts at the equal interval of $\Delta f_{MinInterval}$ are set, phase rotation amounts $\varphi_{ndm}$ for applying Doppler shift amounts $DOP_{ndm}$ are assigned, for example, as given in following Expression 4:

[4]

$$\phi_{ndm} = 2\pi(ndm-1)\Delta f_{MinInterval} / \left(\frac{1}{T_r L_{oc}}\right). \quad \text{(Expression 4)}$$

Note that, as minimum Doppler shift interval $\Delta f_{MinInterval}$ is made narrower, the interference between Doppler multiplexed signals is more likely to occur, and the target detection accuracy is more likely to be reduced (e.g., degraded). Thus, it is preferable that the intervals between the Doppler shift amounts be widened as much as possible within the range satisfying the constraints of Expression 2. For example, when the equal sign holds true in Expression 2 (e.g., $\Delta f_{MinInterval}=1/(T_r N_{DM} L_{OC})$), the intervals between the Doppler multiplexed signals in the Doppler domain can be maximized. In this case, Doppler shift amounts $DOP_1$, $DOP_2, \ldots,$ and $DOP_{N\_DM}$ are assigned respective different phase rotation amounts by, for example, equally dividing a phase rotation range greater than or equal to 0 and less than $2\pi$ into $N_{DM}$ subdivisions. For example, phase rotation amount $\varphi_{ndm}$ for applying Doppler shift amount $DOP_{ndm}$ is assigned as given in following Expression 5. Note that, in the following, the angle is expressed in radian.

[5]

$$\phi_{ndm} = \frac{2\pi(ndm-1)}{N_{DM}} \quad \text{(Equation 5)}$$

In Expression 5, for example, when number $N_{DM}$ of Doppler multiplexing is 2, phase rotation amount $\varphi_1$ for applying Doppler shift amount $DOP_1$ is 0, and phase rotation amount $\varphi_2$ for applying Doppler shift amount $DOP_2$ is $\pi$. Likewise, in Expression 5, for example, when number $N_{DM}$ of Doppler multiplexing is 4, phase rotation amount $\varphi_1$ for applying Doppler shift amount $DOP_1$ is 0, phase rotation amount $\varphi_2$ for applying Doppler shift amount $DOP_2$ is $\pi/2$, phase rotation amount $\varphi_3$ for applying Doppler shift amount DOP3 is $\pi$, and phase rotation amount $\varphi_4$ for applying Doppler shift amount $DOP_4$ is $3\pi/2$. In other words, intervals between phase rotation amounts $\varphi_{ndm}$ for applying Doppler shift amounts $DOP_{ndm}$ are equal intervals.

Note that, the assignment of the phase rotation amounts for applying Doppler shift amounts $DOP_1, DOP_2, \ldots,$ and $DOP_{N\_DM}$ is not limited to this assignment method. For example, the assignment of the phase rotation amounts given by Expression 5 may be shifted. For example, the phase rotation amounts may be assigned such that $\varphi_{ndm}=2\pi(ndm)/N_{DM}$. Alternatively, phase rotation amounts $\varphi_1$, $\varphi_2, \ldots,$ and $\varphi_{N\_DM}$ may be randomly assigned for Doppler shift amounts $DOP_1, DOP_2, \ldots,$ and $DOP_{N\_DM}$ (where "N_DM" corresponds to $N_{DM}$) using an assignment table of the phase rotation amounts.

Regarding phase rotation amounts $\varphi_1, \ldots,$ and $\varphi_{NDM}$ to which $N_{DM}$ Doppler shift amounts outputted from Doppler shift setter 106 are applied, encoder 107 sets the phase rotation amounts based on one or a plurality (equal to or less than $N_{CM}$) of orthogonal code sequences. Further, encoder 107 sets the phase rotation amounts based on both the Doppler shift amounts and the orthogonal code sequences, for example, the "coded Doppler phase rotation amounts" for generating coded Doppler multiplexed signals, and outputs the coded Doppler phase rotation amounts to phase rotators 108.

An example of the operation of encoder 107 will be described below.

For example, encoder 107 uses orthogonal code sequences with number $N_{CM}$ of codes (in other words, the number of code multiplexing) and with code length Loc.

In the following, $N_{CM}$ orthogonal code sequences with code length Loc are denoted as $Code_{ncm}=\{OC_{ncm}(1), OC_{ncm}(2), \ldots, OC_{ncm}(Loc)\}$. $OC_{ncm}(noc)$ represents the noc-th code element in ncm-th orthogonal code sequence $Code_{ncm}$. Here, noc denotes the index of a code element, and noc=1, ..., Loc.

The orthogonal code sequences used in encoder 107 are, for example, codes that are orthogonal (uncorrelated) to one another. For example, the orthogonal code sequences may be Walsh-Hadamard codes. In this case, code length Loc used to generate orthogonal code sequences with number $N_{CM}$ of codes is given by following Expression 6:

$$Loc = 2^{ceil\,[log2(NCM)]} \quad \text{(Expression 6)}.$$

Here, ceil[x] is an operator (ceiling function) that outputs the smallest integer greater than or equal to real number x.

For example, in a case where $N_{CM}=2$, code length Loc of Walsh-Hadamard codes is 2, and the orthogonal code sequences are represented by $Code_1=\{1, 1\}$ and $Code_2=\{1, -1\}$. Note that, when a code element constituting the orthogonal code sequences is 1, 1=exp(j0) holds true and, thus, the phase thereof is 0. In addition, when a code element constituting the orthogonal code sequences is −1, −1=exp(j) holds true and, thus, the phase thereof is $\pi$.

Further, for example, in a case where $N_{CM}=4$, code length Loc is 4, and the orthogonal code sequences are represented by $Code_1=\{1, 1, 1, 1\}$, $Code_2=\{1, -1, 1, -1\}$, $Code_3=\{1, 1, -1, -1\}$, and $Code_4=\{1, -1, -1, 1\}$.

Note that, code elements constituting an orthogonal code sequence are not limited to real numbers and may include complex number values. For example, orthogonal code sequence $Code_{ncm}$ given by following Expression 7 may be used. Here, ncm=1, ..., $N_{CM}$. In this case, the code length used to generate orthogonal code sequences with number $N_{CM}$ of codes is represented by $Loc=N_{CM}$.

[7]

$$Code_{ncm} = \left\{1, \exp\left[j\frac{2\pi}{N_{CM}}(ncm-1)\right], \exp\left[j\frac{2\pi}{N_{CM}}2(ncm-1)\right], \ldots \exp\left[j\frac{2\pi}{N_{CM}}(N_{CM}-1)(ncm-1)\right]\right\}$$ (Expression 7)

For example, in a case where $N_{CM}=3$, code length Loc is 3 ($=N_{CM}$), and encoder 107 generates orthogonal code sequences represented by $Code_1=\{1, 1, 1\}$, $Code_2=\{1, \exp(j2\pi/3), \exp(j4\pi/3)\}$, and $Code_3=\{1, \exp(-j2\pi/3), \exp(-j4\pi/3)\}$.

Further, for example, in a case where $N_{CM}=4$, code length Loc is 4 ($=N_{CM}$), and encoder 107 generates orthogonal code sequences represented by $Code_1=\{1, 1, 1, 1\}$, $Code_2=\{1, j, -1, -j\}$, $Code_3=\{1, -1, 1, -1\}$, and $Code_4=\{1, -j, -1, j\}$. Here, j is the imaginary unit.

In encoder 107, the number of code multiplexing (hereinafter referred to as the number of coded Doppler multiplexing) for encoding a Doppler multiplexed signal using ndm-th Doppler shift amount $DOP_{ndm}$ outputted from Doppler shift setter 106 is represented by "$N_{DOP\_CODE(ndm)}$." Here, ndm=1, . . . , $N_{DM}$.

Encoder 107 sets number $N_{DOP\_CODE(ndm)}$ of coded Doppler multiplexing so that, for example, the sum of numbers $N_{DOP\_CODE}(1)$, $N_{DOP\_CODE}(2)$, . . . , and $N_{DOP\_CODE}(N_{DM})$ of coded Doppler multiplexing for encoding Doppler multiplexed signals is equal to number Nt of transmission antennas 109 used for multiplexing transmission. In other words, encoder 107 sets number $N_{DOP\_CODE(ndm)}$ of coded Doppler multiplexing so as to satisfy following Expression 8. This allows radar apparatus 10 to perform multiplexing transmission in the Doppler domain and in the code domain (hereinafter referred to as the coded Doppler multiplexing transmission) using Nt transmission antennas 109.

[8]

$$\sum_{ndm=1}^{N_{DM}} N_{DOP\_CODE}(ndm) = Nt$$ (Expression 8)

Here, encoder 107 sets, for example, numbers $N_{DOP\_CODE}(1)$, $N_{DOP\_CODE}(2)$, . . . , and $N_{DOP\_CODE}(N_{DM})$ of coded Doppler multiplexing so as to include different numbers of coded Doppler multiplexing ranging from 1 through $N_{CM}$. For example, encoder 107 sets the numbers of coded Doppler multiplexing such that not all of the numbers of coded Doppler multiplexing are set to number $N_{CM}$ of codes, but at least one of the numbers of coded Doppler multiplexing is set smaller than $N_{CM}$. In other words, encoder 107 sets the numbers of coded Doppler multiplexing for the Doppler multiplexed signals non-uniformly. With this setting, radar apparatus 10 can individually separate and receive coded Doppler multiplexed signals transmitted from a plurality of transmission antennas 109, for example, through reception processing described below.

With respect to phase rotation amount $\varphi_{ndm}$ for applying ndm-th Doppler shift amount $DOP_{ndm}$, encoder 107 sets coded Doppler phase rotation amount $\psi_{ndop\_code(ndm), ndm}(m)$ for m-th transmission period Tr that is given by following Expression 9, and outputs coded Doppler phase rotation amount $\psi_{ndop\_code(ndm), ndm}(m)$ to phase rotator 108:

[9]

$$\psi_{ndop\_code(ndm),ndm}(m) = \text{floor}\left[\frac{(m-1)}{Loc}\right] \times \phi_{ndm} + \text{angle}[OC_{ndop\_code(ndm)}(OC\_INDEX)].$$ (Expression 9)

Here, the subscript "ndop_code(ndm)" represents an index less than or equal to number $N_{DOP\_CODE(ndm)}$ of coded Doppler multiplexing for phase rotation amount $\varphi_{ndm}$ for applying Doppler shift amount $DOP_{ndm}$. For example, ndop_ code(ndm)=1, . . . , $N_{DOP\_CODE(ndm)}$. Here, angle[x] is an operator outputting the radian phase of real number x, and for example, angle[1]=0, angle[-1]=π, angle[j]=π/2, and angle[-j]=-π/2. In addition, floor[x] is an operator that outputs the largest integer that does not exceed real number x. The character "j" is an imaginary unit.

For example, as given by Expression 9, coded Doppler phase rotation amount $\psi_{ndop\_code(ndm), ndm}(m)$ provides a constant phase rotation amount for applying Doppler shift amount $DOP_{ndm}$ (for example, the first term in Expression 9) in the duration of Loc transmission periods ("Loc" is the code length used for coding), and applies a phase rotation amount corresponding to each of Loc code elements $OC_{ndop\_code(ndm)}(1)$, . . . , and $OC_{ndop\_code(ndm)}(Loc)$ of code $Code_{ndop\_code(ndm)}$ used for coding (the second term in Expression 9).

Further, encoder 107 outputs, in each transmission period (Tr), orthogonal code element index OC_INDEX to radar receiver 200 (output switch 209 described below). OC_INDEX represents an orthogonal code element index indicating an element of orthogonal code sequence $Code_{ndop\_code(ndm)}$, and cyclically varies in the range of from 1 to Loc in each transmission period (Tr), as given by following Expression 10:

$$OC\_INDEX = \text{mod}(m-1, Loc) + 1$$ (Expression 10).

Here, mod(x, y) denotes a modulo operator and is a function that outputs the remainder after x is divided by y. Further, m=1, . . . , Nc. Nc denotes the number of transmission periods used for radar positioning (hereinafter referred to as "radar-transmission-signal transmission times"). In addition, radar-transmission-signal transmission times Nc is set to an integer multiple of Loc (by a factor of Ncode). For example, Nc=Loc×Ncode.

Next, an example method by encoder 107 for setting numbers $N_{DOP\_CODE(ndm)}$ of coded Doppler multiplexing for Doppler multiplexed signals non-uniformly will be described.

For example, encoder 107 sets number $N_{CM}$ of orthogonal code sequences (in other words, the number of code multiplexing or the number of codes) satisfying the condition below. For example, number $N_{CM}$ of orthogonal code sequences and number $N_{DM}$ of Doppler multiplexing satisfy the following relationship for number Nt of transmission antennas 109 used for multiplexing transmission:

(Number $N_{CM}$ of orthogonal code sequences)×(Number $N_{DM}$ of Doppler multiplexing)>Number Nt of transmission antennas used for multiplexing transmission.

For example, among numbers $N_{CM}$ of orthogonal code sequences and numbers $N_{DM}$ of Doppler multiplexing satisfying the above-described condition, the use of a combination yielding a smaller product ($N_{CM} \times N_{DM}$) is desirable in terms of both characteristics and complexity of circuit configuration. Note that among numbers $N_{CM}$ of orthogonal code sequences and numbers $N_{DM}$ of Doppler multiplexing satisfying the above-described condition, a combination having a smaller value of the product ($N_{CM} \times N_{DM}$) is not limitative, and any other combination may be applied.

For example, in a case where Nt=3, the combination of $N_{DM}$=2 and $N_{CM}$=2 is desirable.

Figure 3:
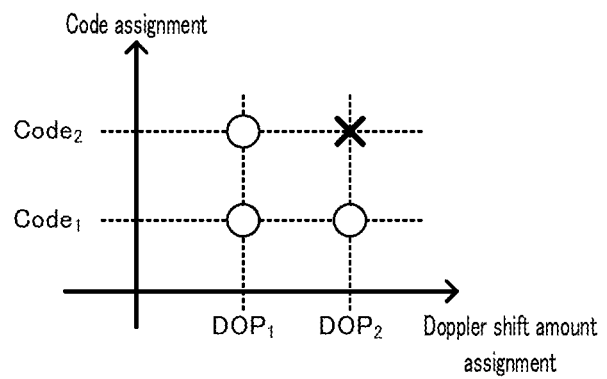
FIG. 3 illustrates examples of assignment of Doppler shift amounts and orthogonal codes.
Figure 3:
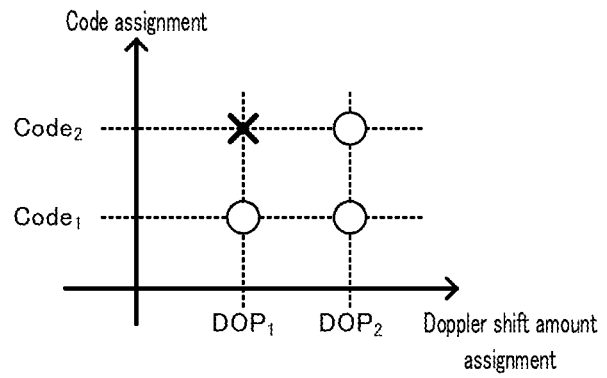

In this case, the assignment of Doppler shift amounts $DOP_1$ and $DOP_2$ and orthogonal codes $Code_1$ and $Code_2$ is determined in accordance with the setting of $N_{DOP\_CODE}(1)$ and $N_{DOP\_CODE}(2)$, for example, as illustrated at (a) and (b) in FIG. 3. In FIG. 3, white circles ("○") represent Doppler shift amounts and orthogonal codes used, and crosses ("x") represent Doppler shift amounts and orthogonal codes not used (the same applies to the following description).

For example, (a) in FIG. 3 illustrates an example of $N_{DOP\_CODE}(1)$=2 and $N_{DOP\_CODE}(2)$=1, and (b) in FIG. 3 illustrates an example of $N_{DOP\_CODE}(1)$=1 and $N_{DOP\_CODE}(2)$=2.

Figure 4:
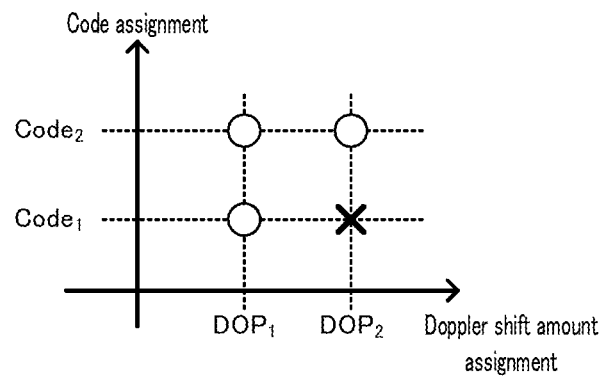
FIG. 4 illustrates examples of assignment of Doppler shift amounts and orthogonal codes.
Figure 4:
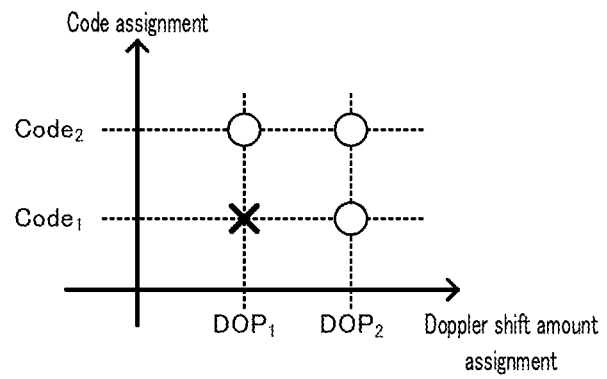

Note that, in FIG. 3, $Code_1$ is used for the Doppler shift amount (e.g., $DOP_2$ at (a) in FIG. 3 and $DOP_1$ at (b) in FIG. 3) corresponding to number $N_{DOP\_CODE(ndm)}$=1 of coded Doppler multiplexing, but the present disclosure is not limited thereto. For example, in the case of $N_{DOP\_CODE}(1)$<$N_{CM}$, or $N_{DOP\_CODE}(2)$<$N_{CM}$, $Code_2$ instead of $Code_1$ may be used for the Doppler shift amount (e.g., $DOP_2$ at (a) in FIG. 4 and $DOP_1$ at (b) in FIG. 4) corresponding to $N_{DOP\_CODE(ndm)}$=1 as illustrated in FIG. 4.

Further, for example, in a case where Nt=4 or 5, the combination of $N_{DM}$=3 and $N_{CM}$=2 or the combination of $N_{DM}$=2 and $N_{CM}$=3 is desirable.

Figure 5:
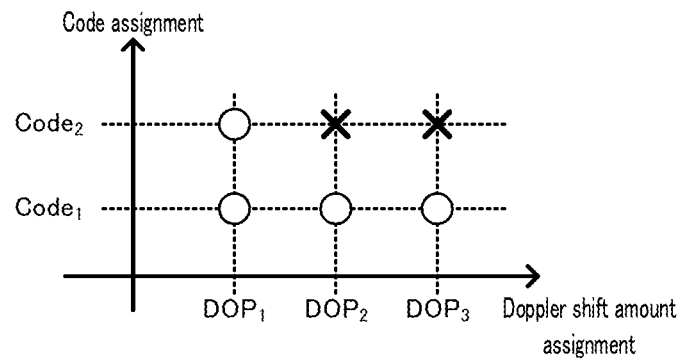
FIG. 5 illustrates examples of assignment of Doppler shift amounts and orthogonal codes.
Figure 5:
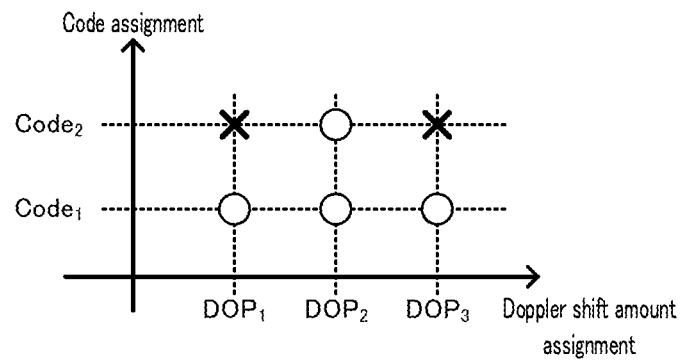
Figure 5:
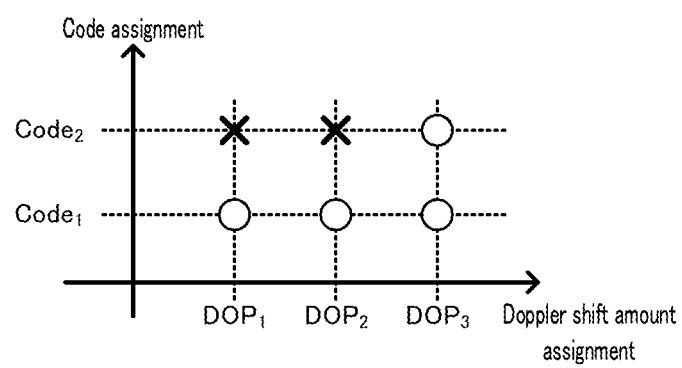

By way of example, FIG. 5 illustrate a case where Nt=4, $N_{DM}$=3, and $N_{CM}$=2. For example, the assignment of Doppler shift amounts $DOP_1$, $DOP_2$, and $DOP_3$ and orthogonal codes $Code_1$ and $Code_2$ is determined in accordance with the setting of $N_{DOP\_CODE}(1)$, $N_{DOP\_CODE}(2)$, and $N_{DOP\_CODE}(3)$ as illustrated in FIG. 5.

For example, (a) in FIG. 5 illustrates an example where $N_{DOP\_CODE}(1)$=2, $N_{DOP\_CODE}(2)$=1, and $N_{DOP\_CODE}(3)$=1, (b) in FIG. 5 illustrates an example where $N_{DOP\_CODE}(1)$=1, $N_{DOP\_CODE}(2)$=2, and $N_{DOP\_CODE}(3)$=1, and (c) in FIG. 5 illustrates an example where $N_{DOP\_CODE}(1)$=1, $N_{DOP\_CODE}(2)$=1, and $N_{DOP\_CODE}(3)$=2.

Figure 6:
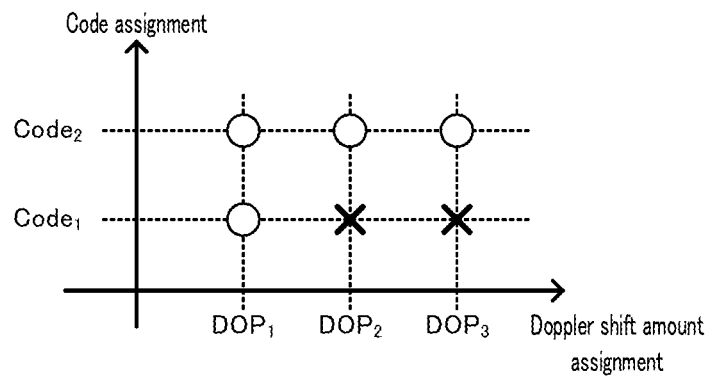
FIG. 6 illustrates examples of assignment of Doppler shift amounts and orthogonal codes.
Figure 6:
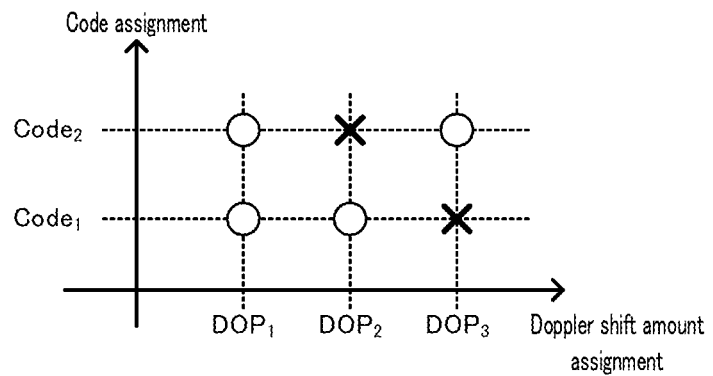
Figure 6:
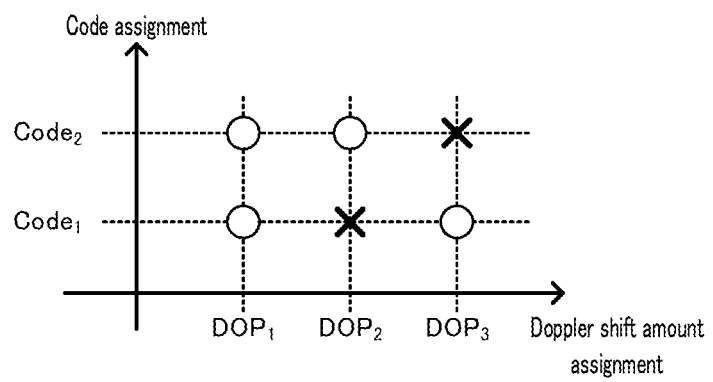

Note that, in FIG. 5, $Code_1$ is used for the Doppler shift amounts corresponding to number $N_{DOP\_CODE(ndm)}$=1 of coded Doppler multiplexing, but the present disclosure is not limited thereto. For example, for settings in which the numbers of coded Doppler multiplexing are each smaller than $N_{CM}$, $Code_2$ may be used in place of $Code_1$ as illustrated at (a) in FIG. 6, or both $Code_1$ and $Code_2$ may be used as illustrated at (b) or (c) in FIG. 6.

Figure 7:
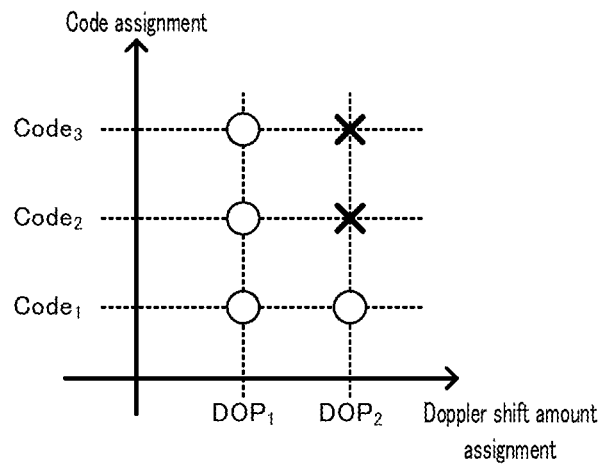
FIG. 7 illustrates examples of assignment of Doppler shift amounts and orthogonal codes.
Figure 7:
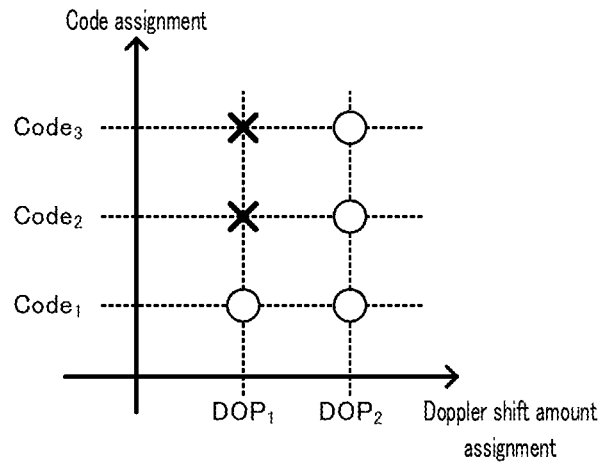

By way of another example, FIG. 7 illustrates a case where Nt=4, $N_{DM}$=2, and $N_{CM}$=3. For example, the assignment of Doppler shift amounts $DOP_1$ and $DOP_2$ and orthogonal codes $Code_1$, $Code_2$, and $Code_3$ is determined in accordance with the setting of $N_{DOP\_CODE}(1)$ and $N_{DOP\_CODE}(2)$ as illustrated in FIG. 7.

For example, (a) in FIG. 7 illustrates an example where $N_{DOP\_CODE}(1)$=3 and $N_{DOP\_CODE}(2)$=1, and (b) in FIG. 7 illustrates an example where $N_{DOP\_CODE}(1)$=1 and $N_{DOP\_CODE}(2)$=3.

Figure 8:
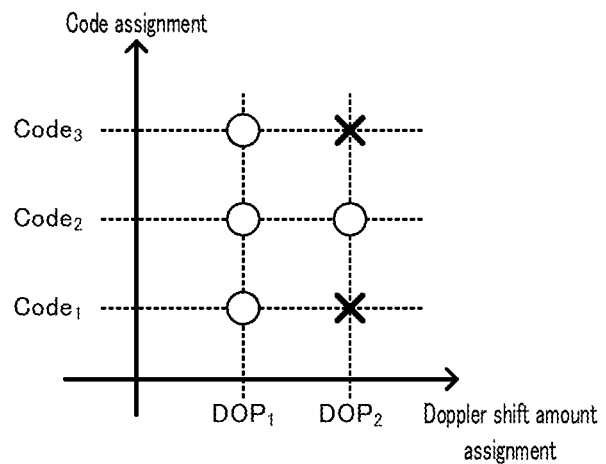
FIG. 8 illustrates examples of assignment of Doppler shift amounts and orthogonal codes.
Figure 8:
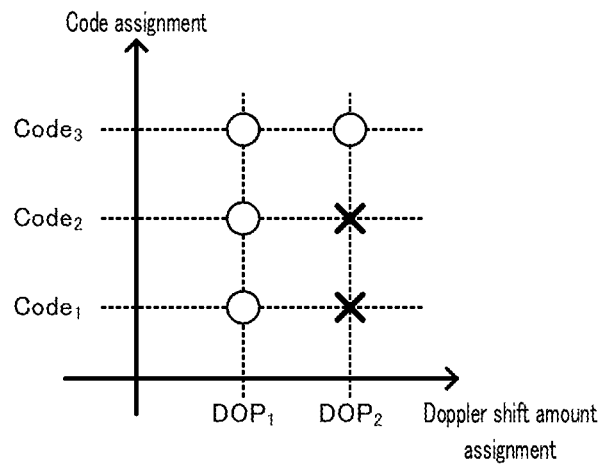

Note that, in FIG. 7, $Code_1$ is used for the Doppler shift amounts corresponding to number $N_{DOP\_CODE(ndm)}$=1 of coded Doppler multiplexing, but the present disclosure is not limited thereto. For example, when $N_{DOP\_CODE}(1)$<$N_{CM}$ or $N_{DOP\_CODE}(2)$<$N_{CM}$, $Code_2$ may be used in place of $Code_1$ as illustrated at (a) in FIG. 8, and $Code_3$ may be used in place of $Code_1$ as illustrated at (b) in FIG. 8.

Figure 9:
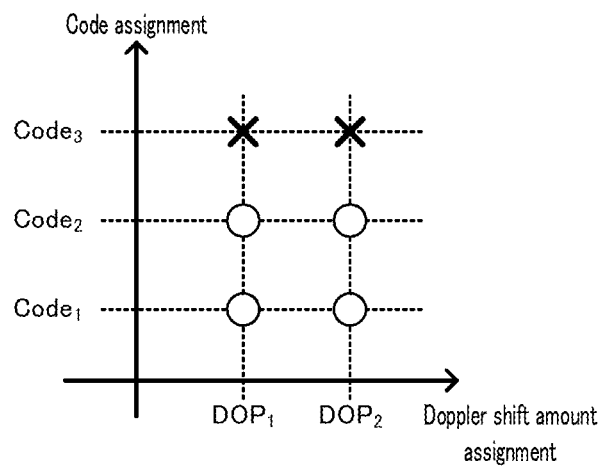
FIG. 9 illustrates examples of assignment of Doppler shift amounts and orthogonal codes.
Figure 9:
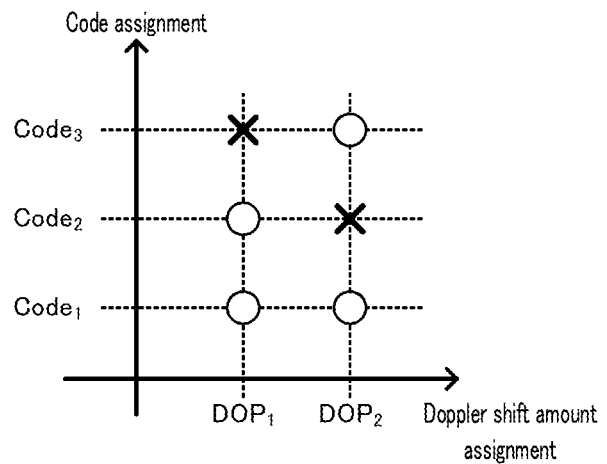

For example, in a case where Nt=4, $N_{DM}$=2, and $N_{CM}$=3, if $N_{DOP\_CODE}(1)$=2 and $N_{DOP\_CODE}(2)$=2 are set as illustrated in FIG. 9, numbers $N_{DOP\_CODE}$ of coded Doppler multiplexing are uniformly set for Doppler shift amounts $DOP_1$ and $DOP_2$. In this setting, for example, it is assumed that the same set of codes (for example, $Code_1$ and $Code_2$) is assigned for Doppler shift amounts $DOP_1$ and $DOP_2$ as illustrated at (a) in FIG. 9, or different sets of codes are assigned for Doppler shift amounts $DOP_1$ and $DOP_2$ as illustrated at (b) in FIG. 9. At both (a) and (b) in FIG. 9, radar apparatus 10 is capable of identifying coded Doppler multiplexed signals transmitted from a plurality of transmission antennas 109 if the Doppler frequency range is a Doppler frequency range within the range of $1/N_{CM}$ as compared with the maximum Doppler velocity at the time of single-antenna transmission.

Meanwhile, for example, when Nt=4, $N_{DM}$=2, and $N_{CM}$=3 in the present embodiment, numbers $N_{DOP\_CODE}$ of coded Doppler multiplexing are set non-uniformly for Doppler shift amounts $DOP_1$ and $DOP_2$ as in the case of $N_{DOP\_CODE}(1)$=3 and $N_{DOP\_CODE}(2)$=1, or the case of $N_{DOP\_CODE}(1)$=1 and $N_{DOP\_CODE}(2)$=3 as illustrated in FIG. 7. In such settings, the Doppler frequency range can be equivalent to, for example, the maximum Doppler velocity at the time of single-antenna transmission (the details will be described below).

Further, for example, in a case where Nt=6 or 7, the combination of $N_{DM}$=4 and $N_{CM}$=2 or the combination of $N_{DM}$=2 and $N_{CM}$=4 is desirable.

Figure 10:
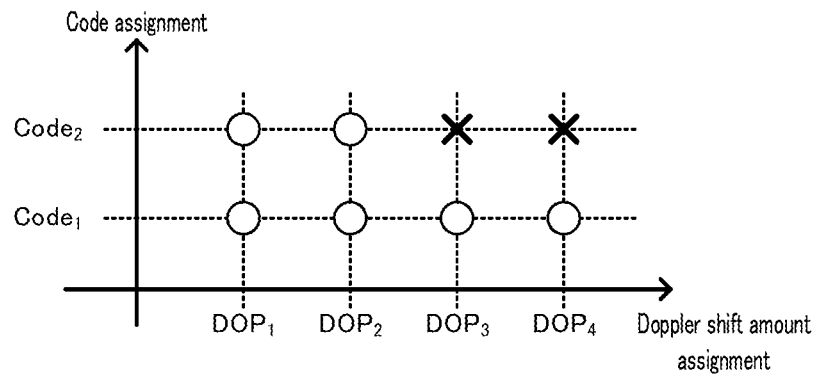
FIG. 10 illustrates examples of assignment of Doppler shift amounts and orthogonal codes.
Figure 10:
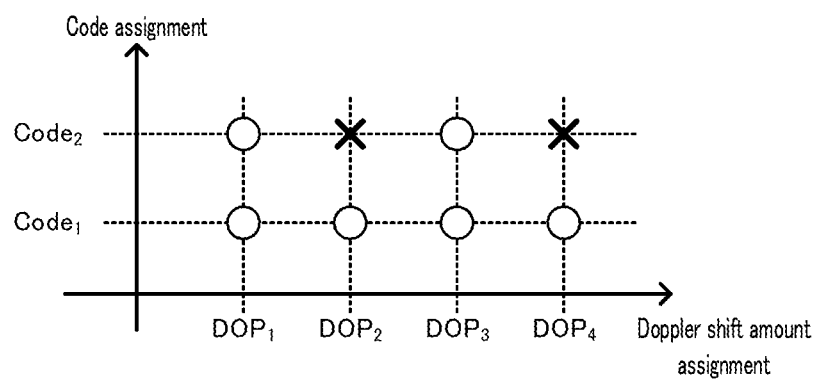

By way of example, FIG. 10 illustrates a case where Nt=6, $N_{DM}$=4, and $N_{CM}$=2. For example, the assignment of Doppler shift amounts $DOP_1$, $DOP_2$, $DOP_3$, and $DOP_4$ and orthogonal codes $Code_1$ and $Code_2$ is determined in accordance with the setting of $N_{DOP\_CODE}(1)$, $N_{DOP\_CODE}(2)$, $N_{DOP\_CODE}(3)$, and $N_{DOP\_CODE}(4)$ as illustrated in FIG. 10.

For example, (a) in FIG. 10 illustrates an example where $N_{DOP\_CODE}(1)$=$N_{DOP\_CODE}(2)$=2 and $N_{DOP\_CODE}(3)$=$N_{DOP\_CODE}(4)$=1, and (b) in FIG. 10 illustrates an example where $N_{DOP\_CODE}(1)$=$N_{DOP\_CODE}(3)$=2 and $N_{DOP\_CODE}(2)$=$N_{DOP\_CODE}(4)$=1.

Figure 11:
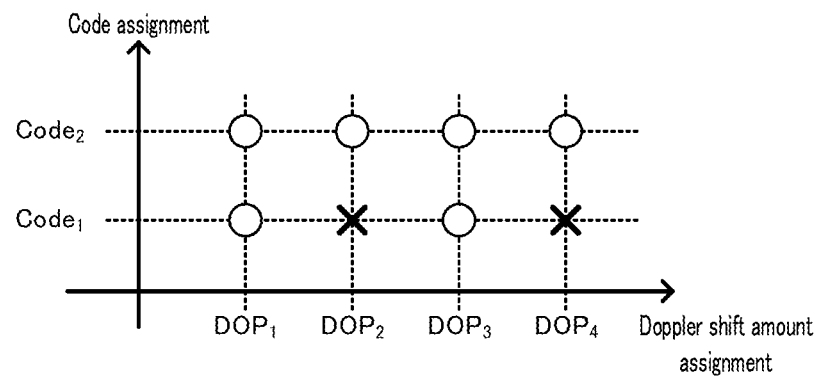
FIG. 11 illustrates examples of assignment of Doppler shift amounts and orthogonal codes.
Figure 11:
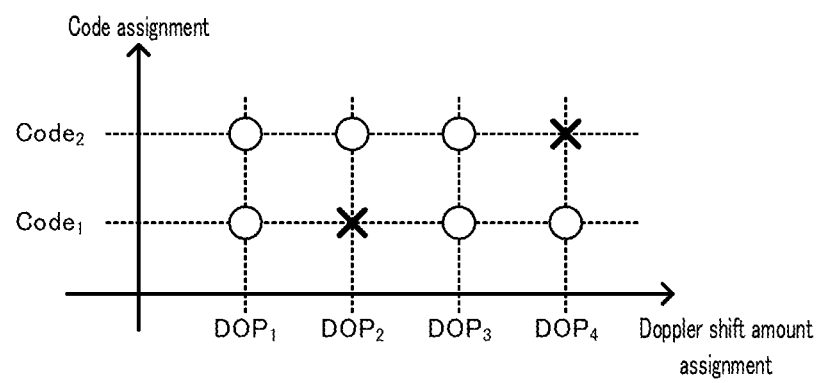

Note that, in FIG. 10, $Code_1$ is used for the Doppler shift amounts corresponding to number $N_{DOP\_CODE(ndm)}$=1 of coded Doppler multiplexing, but the present disclosure is not limited thereto. For example, for settings in which the numbers of coded Doppler multiplexing are each smaller than $N_{CM}$, $Code_2$ may be used in place of $Code_1$ as illustrated at (a) in FIG. 11, or both $Code_1$ and $Code_2$ may be used as illustrated at (b) in FIG. 11.

Further, for example, as illustrated in FIG. 10, in a case where Nt=6, $N_{DM}$=4, and $N_{CM}$=2, there are two Doppler shift amounts that do not use all the codes. Further, for example, in the case of $N_{DM}$=4, in respect of the combinations of Doppler shift amounts that do not use all the codes, there are six combinations (=$_4C_2$) of two Doppler shift amounts selected from four Doppler shift amounts, and in each of the six combinations, there are four combinations (=$N_{CM} \times N_{CM}$) of codes used. Accordingly, in a case where Nt=6, $N_{DM}$=4, and $N_{CM}$=2, there is a total of 24 combinations of Doppler shift amounts DOP and orthogonal codes Code assigned.

Likewise, for example, in a case where Nt=8, the combination of $N_{DM}$=3 and $N_{CM}$=3 or the combination of $N_{DM}$=5 and $N_{CM}$=2 is desirable. For example, in a case where Nt=9, the combination of $N_{DM}$=5 and $N_{CM}$=2 is desirable. For example, in a case where Nt=10, the combination of $N_{DM}$=6 and $N_{CM}$=2 or the combination of $N_{DM}$=4 and $N_{CM}$=3 is desirable. For example, in a case where Nt=12, the combination of $N_{DM}=5$ and $N_{CM}=3$ or the combination of $N_{DM}=4$ and $N_{CM}=4$ is desirable. Note that, number Nt of transmission antennas 109 is not limited to those in the examples described above, and the exemplary embodiment of the present disclosure is applicable to other numbers.

Next, an example of setting of coded Doppler phase rotation amount $\psi_{ndop\_code(ndm), ndm}(m)$ will be described.

For example, a description will be given of a case where in encoder 107, number Nt of transmission antennas used for multiplexing transmission is 3, number $N_{DM}$ of Doppler multiplexing is 2, and $N_{CM}$ is 2, and orthogonal code sequences $Code_1=\{1, 1\}$ and $Code_2=\{1, -1\}$ with code length Loc=2 are used. In this case, for example, when numbers $N_{DOP\_CODE}(1)$ and $N_{DOP\_CODE}(2)$ of coded Doppler multiplexing are 1 and 2, encoder 107 sets coded Doppler phase rotation amounts $\psi_{1,1}(m)$, $\psi_{1,2}(m)$, and $\psi_{2,2}(m)$ given by following Expressions 11 to 13 and outputs coded Doppler phase rotation amounts $\psi_{1,1}(m)$, $\psi_{1,2}(m)$, and $\psi_{2,2}(m)$ to phase rotators 108:

[11]

$$\{\psi_{1,1}(1),\psi_{1,1}(2),\psi_{1,1}(3),\psi_{1,1}(4),\psi_{1,1}(5),\psi_{1,1}(6),\psi_{1,1}(7),\psi_{1,1}(8),\ldots\}\{0,0,\phi_1,\phi_1,2\phi_1,2\phi_1,3\phi_1,3\phi_1,\ldots\} \quad \text{(Expression 11)};$$

[12]

$$\{\psi_{1,2}(1),\psi_{1,2}(2),\psi_{1,2}(3),\psi_{1,2}(4),\psi_{1,2}(5),\psi_{1,2}(6),\psi_{1,2}(7),\psi_{1,2}(8),\ldots\}\{0,0,\phi_2,\phi_2,2\phi_2,2\phi_2,3\phi_2,3\phi_2,\ldots\} \quad \text{(Expression 12)};$$

[13]

$$\{\psi_{2,2}(1),\psi_{2,2}(2),\psi_{2,2}(3),\psi_{2,2}(4),\psi_{2,2}(5),\psi_{2,2}(6),\psi_{2,2}(7),\psi_{2,2}(8),\ldots\}\{0,\pi,\phi_2,\phi_2+\pi,2\phi_2,2\phi_2+\pi,3\phi_2,3\phi_2+\pi,\ldots\} \quad \text{(Expression 13)}.$$

Here, as an example, $\varphi_{ndm}=2\pi(ndm-1)/N_{DM}$ in Expression 5 is used as the phase rotation amount for applying Doppler shift amount $DOP_{ndm}$, and phase rotation amount $\varphi_1=0$ for applying Doppler shift amount $DOP_1$ and phase rotation amount $\varphi_2=\pi$ for applying Doppler shift amount $DOP_2$ are used. In this case, encoder 107 sets coded Doppler phase rotation amounts $\psi_{1,1}(m)$, $\psi_{1,2}(m)$, and $\psi_{2,2}(m)$ given by following Expressions 14 to 16 and outputs coded Doppler phase rotation amounts $\psi_{1,1}(m)$, $\psi_{1,2}(m)$, and $\psi_{2,2}(m)$ to phase rotators 108. Here, m=1, ..., Nc. Here, a modulo operation for $2\pi$ is performed, and results are expressed in radians ranging from 0 to less than $2\pi$ (the same applies to the following description).

[14]

$$\{\psi_{1,1}(1),\psi_{1,1}(2),\psi_{1,1}(3),\psi_{1,1}(4),\psi_{1,1}(5),\psi_{1,1}(6),\psi_{1,1}(7),\psi_{1,1}(8),\ldots\}=\{0,0,0,0,0,0,0,0,\ldots\} \quad \text{(Expression 14)}$$

[15]

$$\{\psi_{1,2}(1),\psi_{1,2}(2),\psi_{1,2}(3),\psi_{1,2}(4),\psi_{1,2}(5),\psi_{1,2}(6),\psi_{1,2}(7),\psi_{1,2}(8),\ldots\}\{0,0,\pi,\pi,0,0,\pi,\pi,\ldots\} \quad \text{(Expression 15)}$$

[16]

$$\{\psi_{2,2}(1),\psi_{2,2}(2),\psi_{2,2}(3),\psi_{2,2}(4),\psi_{2,2}(5),\psi_{2,2}(6),\psi_{2,2}(7),\psi_{2,2}(8),\ldots\}\{0,\pi,\pi,0,0,\pi,\pi,0,\ldots\} \quad \text{(Expression 16)}$$

As given by Expressions 14 to 16, when the phase rotation amounts are set to $\varphi_{ndm}=2\pi(ndm-1)/N_{DM}$, into which $2\pi$ is equally divided, coded Doppler phase rotation amounts $\psi_{1,1}(m)$, $\psi_{1,2}(m)$, and $\psi_{2,2}(m)$ are changed in transmission periods given by $N_{DM} \times N_{CM}=2 \times 2=4$.

As another example, $\varphi_{ndm}=2\pi(ndm)/N_{DM}$ may be used as the phase rotation amount for applying Doppler shift amount $DOP_{ndm}$, and phase rotation amount $\varphi_1=\pi$ for applying Doppler shift amount $DOP_1$ and phase rotation amount $\varphi_2=0$ for applying Doppler shift amount $DOP_2$ may be set. In this case, encoder 107 sets coded Doppler phase rotation amounts $\psi_{1,1}(m)$, $\psi_{1,2}(m)$, and $\psi_{2,2}(m)$ as given by following Expressions 17 to 19 and outputs coded Doppler phase rotation amounts $\psi_{1,1}(m)$, $\psi_{1,2}(m)$, and $\psi_{2,2}(m)$ to phase rotators 108. Here, m=1, ..., Nc.

[17]

$$\{\psi_{1,1}(1),\psi_{1,1}(2),\psi_{1,1}(3),\psi_{1,1}(4),\psi_{1,1}(5),\psi_{1,1}(6),\psi_{1,1}(7),\psi_{1,1}(8),\ldots\}=\{0,0,\pi,\pi,0,0,\pi,\pi,\ldots\} \quad \text{(Expression 17)}$$

[18]

$$\{\psi_{1,2}(1),\psi_{1,2}(2),\psi_{1,2}(3),\psi_{1,2}(4),\psi_{1,2}(5),\psi_{1,2}(6),\psi_{1,2}(7),\psi_{1,2}(8),\ldots\}=\{0,0,0,0,0,0,0,0,\ldots\} \quad \text{(Expression 18)}$$

[19]

$$\{\psi_{2,2}(1),\psi_{2,2}(2),\psi_{2,2}(3),\psi_{2,2}(4),\psi_{2,2}(5),\psi_{2,2}(6),\psi_{2,2}(7),\psi_{2,2}(8),\ldots\}=\{0,\pi,0,\pi,0,\pi,0,\pi,\ldots\} \quad \text{(Expression 19)}$$

As given by Expressions 14 to 16 or Expressions 17 to 19, the number of phases (for example, two phases of 0 and $\pi$) used for the phase rotation amounts (for example, the phase rotation amounts for applying the Doppler shift amounts) is smaller than number Nt=3 of transmission antennas 109 used for multiplexing transmission. In other words, as given by Expressions 14 to 16 or Expressions 17 to 19, the number of phases (for example, two phases of 0 and $\pi$) used for the phase rotation amounts for applying the Doppler shift amounts is equal to number $N_{DM}=2$ of Doppler shift amounts used for multiplexing transmission (in other words, the number of Doppler multiplexing).

In addition, for example, a description will be given of a case where in encoder 107, number Nt of transmission antennas used for multiplexing transmission is 6, number $N_{DM}$ of Doppler multiplexing is 4, and $N_{CM}$ is 2, and orthogonal code sequences $Code_1=\{1, 1\}$ and $Code_2=\{1, -1\}$ with code length Loc=2 are used. In this case, for example, if numbers $N_{DOP\_CODE}(1)$, $N_{DOP\_CODE}(2)$, $N_{DOP\_CODE}(3)$, and $N_{DOP\_CODE}(4)$ of coded Doppler multiplexing are 1, 1, 2, and 2, respectively, encoder 107 sets coded Doppler phase rotation amounts $\psi_{1,1}(m)$, $\psi_{1,2}(m)$, $\psi1,3(m)$, $\psi2,3(m)$, $\psi1,4(m)$, and $\psi2,4(m)$ given by following Expressions 20 to 25 and outputs coded Doppler phase rotation amounts $\psi_{1,1}(m)$, $\psi_{1,2}(m)$, $\psi1,3(m)$, $\psi2,3(m)$, $\psi1,4(m)$, and $\psi2,4(m)$ to phase rotators 108. Here, m=1, ..., Nc.

[20]

$$\{\psi_{1,1}(1),\psi_{1,1}(2),\psi_{1,1}(3),\psi_{1,1}(4),\psi_{1,1}(5),\psi_{1,1}(6),\psi_{1,1}(7),\psi_{1,1}(8),\ldots\}=\{0,0,\phi_1,\phi_1,2\phi_1,2\phi_1,3\phi_1,3\phi_1,\ldots\} \quad \text{(Expression 20)}$$

[21]

$$\{\psi_{1,2}(1),\psi_{1,2}(2),\psi_{1,2}(3),\psi_{1,2}(4),\psi_{1,2}(5),\psi_{1,2}(6),\psi_{1,2}(7),\psi_{1,2}(8),\ldots\}=\{0,0,\phi_2,\phi_2,2\phi_2,2\phi_2,3\phi_2,3\phi_2,\ldots\} \quad \text{(Expression 21)}$$

[22]

$$\{\psi_{1,3}(1),\psi_{1,3}(2),\psi_{1,3}(3),\psi_{1,3}(4),\psi_{1,3}(5),\psi_{1,3}(6),\psi_{1,3}(7),\psi_{1,3}(8),\ldots\}=\{0,0,\phi_3,\phi_3,2\phi_3,2\phi_3,3\phi_3,3\phi_3,\ldots\} \quad \text{(Expression 22)}$$

[23]

$$\{\psi_{2,3}(1), \psi_{2,3}(2), \psi_{2,3}(3), \psi_{2,3}(4), \psi_{2,3}(5), \psi_{2,3}(6), \psi_{2,3}(7), \psi_{2,3}(8), \ldots\} = \{0, \pi, \phi_3, \phi_3, 2\phi_3, 2\phi_3 = \pi, 3\phi_3, 3\phi_3 + \pi, \ldots\}$$ (Expression 23)

[24]

$$\{\psi_{1,4}(1), \psi_{1,4}(2), \psi_{1,4}(3), \psi_{1,4}(4), \psi_{1,4}(5), \psi_{1,4}(6), \psi_{1,4}(7), \psi_{1,4}(8), \ldots\} = \{0, 0, \phi_4, \phi_4, 2\phi_4, 2\phi_4, 3\phi_4, 3\phi_4, \ldots\}$$ (Expression 24)

[25]

$$\{\psi_{2,4}(1), \psi_{2,4}(2), \psi_{2,4}(3), \psi_{2,4}(4), \psi_{2,4}(5), \psi_{2,4}(6), \psi_{2,4}(7), \psi_{2,4}(8), \ldots\} = \{0, \pi, \phi_4, \phi_4 + \pi, 2\phi_4, 2\phi_4 + \pi, 3\phi_4, 3\phi_4 + \pi, \ldots\}$$ (Expression 25)

Here, as an example, $\varphi_{ndm} = 2\pi(ndm-1)/N_{DM}$ is used as the phase rotation amount for applying Doppler shift amount $DOP_{ndm}$, and phase rotation amount $\varphi_1 = 0$ for applying Doppler shift amount $DOP_1$, phase rotation amount $\varphi_2 = \pi/2$ for applying Doppler shift amount $DOP_2$, phase rotation amount $\varphi_3 = \pi$ for applying Doppler shift amount $DOP_3$, and phase rotation amount $\varphi_4 = 3\pi/2$ for applying Doppler shift amount $DOP_4$ are used. In this case, encoder 107 sets coded Doppler phase rotation amounts $\psi_{1,1}(m)$, $\psi_{1,2}(m)$, $\psi1, 3(m)$, $\psi2, 3(m)$, $\psi1, 4(m)$, and $\psi2, 4(m)$ given by following Expressions 26 to 31 and outputs coded Doppler phase rotation amounts $\psi_{1,1}(m)$, $\psi_{1,2}(m)$, $\psi1, 3(m)$, $\psi2, 3(m)$, $\psi1, 4(m)$, and $\psi2, 4(m)$ to phase rotators 108. Here, m=1, ..., Nc.

[26]

$$\left\{ \begin{array}{l} \psi_{1,1}(1), \psi_{1,1}(2), \psi_{1,1}(3), \psi_{1,1}(4), \\ \psi_{1,1}(5), \psi_{1,1}(6), \psi_{1,1}(7), \psi_{1,1}(8), \ldots \end{array} \right\} =$$ (Expression 26)

$$\{0, 0, 0, 0, 0, 0, 0, 0, \ldots\}$$

[27]

$$\left\{ \begin{array}{l} \psi_{1,2}(1), \psi_{1,2}(2), \psi_{1,2}(3), \psi_{1,2}(4), \\ \psi_{1,2}(5), \psi_{1,2}(6), \psi_{1,2}(7), \psi_{1,2}(8), \ldots \end{array} \right\} =$$ (Expression 27)

$$\left\{0, 0, \frac{\pi}{2}, \frac{\pi}{2}, \pi, \pi, \frac{3\pi}{2}, \frac{3\pi}{2}, \ldots\right\}$$

[28]

$$\left\{ \begin{array}{l} \psi_{1,3}(1), \psi_{1,3}(2), \psi_{1,3}(3), \psi_{1,3}(4), \\ \psi_{1,3}(5), \psi_{1,3}(6), \psi_{1,3}(7), \psi_{1,3}(8), \ldots \end{array} \right\} =$$ (Expression 28)

$$\{0, 0, \pi, \pi, 0, 0, \pi, \pi, \ldots\}$$

[29]

$$\left\{ \begin{array}{l} \psi_{2,3}(1), \psi_{2,3}(2), \psi_{2,3}(3), \psi_{2,3}(4), \\ \psi_{2,3}(5), \psi_{2,3}(6), \psi_{2,3}(7), \psi_{2,3}(8), \ldots \end{array} \right\} =$$ (Expression 29)

$$\{0, \pi, \pi, 0, 0, \pi, \pi, 0, \ldots\}$$

[30]

$$\left\{ \begin{array}{l} \psi_{1,4}(1), \psi_{1,4}(2), \psi_{1,4}(3), \psi_{1,4}(4), \\ \psi_{1,4}(5), \psi_{1,4}(6), \psi_{1,4}(7), \psi_{1,4}(8), \ldots \end{array} \right\} =$$ (Expression 30)

$$\left\{0, 0, \frac{3\pi}{2}, \frac{3\pi}{2}, \pi, \pi, \frac{\pi}{2}, \frac{\pi}{2}, \ldots\right\}$$

[31]

$$\left\{ \begin{array}{l} \psi_{2,4}(1), \psi_{2,4}(2), \psi_{2,4}(3), \psi_{2,4}(4), \\ \psi_{2,4}(5), \psi_{2,4}(6), \psi_{2,4}(7), \psi_{2,4}(8), \ldots \end{array} \right\} =$$ (Expression 31)

$$\left\{0, \pi, \frac{3\pi}{2}, \frac{\pi}{2}, \pi, 0, \frac{\pi}{2}, \frac{3\pi}{2}, \ldots\right\}$$

As given by Expressions 26 to 31, when the phase rotation amounts are set to $\varphi_{ndm} = 2\pi(ndm-1)/N_{DM}$, into which $2\pi$ is equally divided, coded Doppler phase rotation amounts $\psi_{1,1}(m)$, $\psi_{1,2}(m)$, $\psi1, 3(m)$, $\psi2, 3(m)$, $\psi1, 4(m)$, and $\psi2, 4(m)$ are changed in transmission periods given by $N_{DM} \times N_{CM} = 4 \times 2 = 8$.

Further, as illustrated in Expressions 26 to 31, the number of phases used for the phase rotation amounts (e.g., the phase rotation amounts for applying the Doppler shift amounts) (e.g., four phases of 0, $\pi/2$, $\pi$, and $3\pi/2$) is less than number Nt=6 of transmission antenna 109 used for multiplexing transmission. In other words, as given by Expressions 26 to 31, the number of phases (for example, four phases of 0, $\pi/2$, $\pi$, and $3\pi/2$) used for the phase rotation amounts for applying the Doppler shift amounts is equal to number $N_{DM}=4$ of Doppler shift amounts used for multiplexing transmission (in other words, the number of Doppler multiplexing).

The description has been given of, as examples, the settings of phase rotation amounts in a case where number Nt of transmission antennas 109 is 3 and number $N_{DM}$ of Doppler multiplexing is 2 and in a case where number Nt of transmission antennas 109 is 6 and number $N_{DM}$ of Doppler multiplexing is 4. However, number Nt of transmission antennas 109 and number $N_{DM}$ of Doppler multiplexing are not limited to the values described above. For example, the number of phases used for the phase rotation amounts may be set smaller than number Nt of transmission antennas 109 used for multiplexing transmission, regardless of number Nt of transmission antennas 109. Further, the number of phases used for the phase rotation amounts for applying the Doppler shift amounts may be equal to number $N_{DM}$ of Doppler shift amounts used for multiplexing transmission.

The foregoing description has been given of the method for phase rotation amount setter 105 to set the phase rotation amounts.

In FIG. 1, phase rotators 108 apply the phase rotation amounts in each transmission period Tr to the chirp signals outputted from radar transmission signal generator 101, based on coded Doppler phase rotation amounts $\psi_{ndop\_code(ndm), ndm(m)}$ set by phase rotation amount setter 105. Here, ndm=1, ..., $N_{DM}$, and ndop_code(ndm)= 1, ..., $N_{DOP\_CODE(ndm)}$.

The sum of numbers $N_{DOP\_CODE}(1)$, $N_{DOP\_CODE}(2)$, ..., and $N_{DOP\_CODE}(N_{DM})$ of coded Doppler multiplexing is set to be equal to number Nt of transmission antennas 109, and Nt coded Doppler phase rotation amounts are respectively inputted to Nt phase rotators 108.

Each of Nt phase rotators 108 applies, in each transmission period Tr, inputted coded Doppler phase rotation amount $\psi_{ndop\_code(ndm), ndm(m)}$ to a chirp signal outputted from radar transmission signal generator 101. The outputs of Nt phase rotators 108 (referred to as, for example, coded Doppler multiplexed signals) are amplified to a defined transmission power and are then radiated into space from Nt transmission antennas 109 of a transmission array antenna section.

In the following, phase rotator 108 that applies coded Doppler phase rotation amount $\psi_{ndop\_code(ndm), ndm(m)}$ is represented by "phase rotator PROT #[ndop_code(ndm), ndm]." Likewise, transmission antenna 109 that radiates the output of phase rotator PROT #[ndop_code(ndm), ndm] into a space is represented by "transmission antenna Tx #[ndop_code(ndm), ndm]." Here, ndm=1, ..., $N_{DM}$, and ndop_code (ndm)=1, ..., $N_{DOP\_CODE}$(ndm).

For example, a description will be given of a case where number Nt of transmission antennas used for multiplexing transmission is 3, number $N_{DM}$ of Doppler multiplexing is 2, $N_{CM}$ is 2, orthogonal code sequences $Code_1=\{1, 1\}$ and $Code_2=\{1, -1\}$ with code length Loc=2 are set, and numbers $N_{DOP\_CODE}(1)$ and $N_{DOP\_CODE}(2)$ of coded Doppler multiplexing are 1 and 2, respectively. In this case, coded Doppler phase rotation amounts $\psi_{1,\ 1}(m)$, $\psi_{1,\ 2}(m)$, and $\psi_{2,\ 2}(m)$ are outputted from encoder 107 to phase rotators 108 in each transmission period.

For example, phase rotator PROT #[1, 1] applies, in each transmission period, phase rotation amount $\psi_{1,\ 1}(m)$ given by following Expression 32 to a chirp signal generated by radar transmission signal generator 101 in each transmission period. The output of phase rotator PROT #[1, 1] is outputted from transmission antenna Tx #[1, 1]. Here, cp(t) denotes a chirp signal for each transmission period.

$$\exp[j\psi_{1,1}(1)]cp(t), \exp[j\psi_{1,1}(2)]cp(t), \exp[j\psi_{1,1}(3)]cp(t), \ldots, \exp[j\psi_{1,1}(Nc)]cp(t) \quad \text{(Expression 32)}$$

Likewise, phase rotator PROT #[1, 2] applies, in each transmission period, phase rotation amount $\psi_{1,\ 2}(m)$ given by following Expression 33 to a chirp signal generated by radar transmission signal generator 101 in each transmission period. The output of phase rotator PROT #[1, 2] is outputted from transmission antenna Tx #[1, 2].

$$\exp[j\psi_{1,2}(1)]cp(t), \exp[j\psi_{1,2}(2)]cp(t), \exp[j\psi_{1,2}(3)]cp(t), \ldots, \exp[j\psi_{1,2}(Nc)]Cp(t) \quad \text{(Expression 33)}$$

Likewise, phase rotator PROT #[2, 2] applies, in each transmission period, phase rotation amount $\psi_{2,\ 2}(m)$ given by following Expression 34 to a chirp signal generated by radar transmission signal generator 101 in each transmission period. The output of phase rotator PROT #[2, 2] is outputted from transmission antenna Tx #[2, 2].

$$\exp[j\psi_{2,2}(1)]cp(t), \exp[j\psi_{2,2}(2)]cp(t), \exp[j\psi_{2,2}(3)]cp(t), \ldots, \exp[j\psi_{2,2}(Nc)]cp(t) \quad \text{(Expression 34)}$$

The foregoing description has been given of an example of setting of coded Doppler phase rotation amount $\psi_{ndop\_code(ndm),\ ndm}(m)$.

As is understood, in the present embodiment, each of a plurality of transmission antennas 109 is associated with the combination (in other words, assignment) of Doppler shift amount $DOP_{ndm}$ and orthogonal code sequence $Code_{ncm}$ such that at least one of Doppler shift amount $DOP_{ndm}$ and orthogonal code sequence $Code_{ncm}$ differs from combination to combination. Further, in the present embodiment, the numbers of multiplexing of orthogonal code sequences $Code_{ncm}$ (in other words, numbers $N_{DOP\_CODE}(ndm)$ of coded Doppler multiplexing) corresponding respectively to Doppler shift amounts $DOP_{ndm}$ in the combinations of Doppler shift amounts $DOP_{ndm}$ and orthogonal code sequences $Code_{ncm}$ are different from one another.

For example, in the present embodiment, Nt transmission antennas 109 at least include a plurality of transmission antennas 109 from which transmission signals that are code-multiplexed using different orthogonal code sequences are transmitted, and at least one transmission antenna 109 from which a transmission signal that is not code-multiplexed is transmitted, as illustrated in FIG. 3. In other words, radar transmission signals transmitted from radar transmitter 100 include at least a coded Doppler multiplexed signal for which number $N_{DOP\_CODE}(ndm)$ of coded Doppler multiplexing is set to number $N_{CM}$ of codes, and a coded Doppler multiplexed signal for which number $N_{DOP\_CODE}(ndm)$ of coded Doppler multiplexing is set smaller than number $N_{CM}$ of codes.

[Configuration of Radar Receiver 200]

In FIG. 1, radar receiver 200 includes Na reception antennas 202, which constitute an array antenna. Radar receiver 200 further includes Na antenna system processors 201-1 to 201-Na, constant false alarm rate (CFAR) section 211, coded Doppler demultiplexer 212, and direction estimator 213.

Each of reception antennas 202 receives a reflected wave signal that is a radar transmission signal reflected from a target object (target), and outputs the received reflected wave signal to the corresponding one of antenna system processors 201 as a reception signal.

Each of antenna system processors 201 includes reception radio 203 and signal processor 206.

Figure 12:
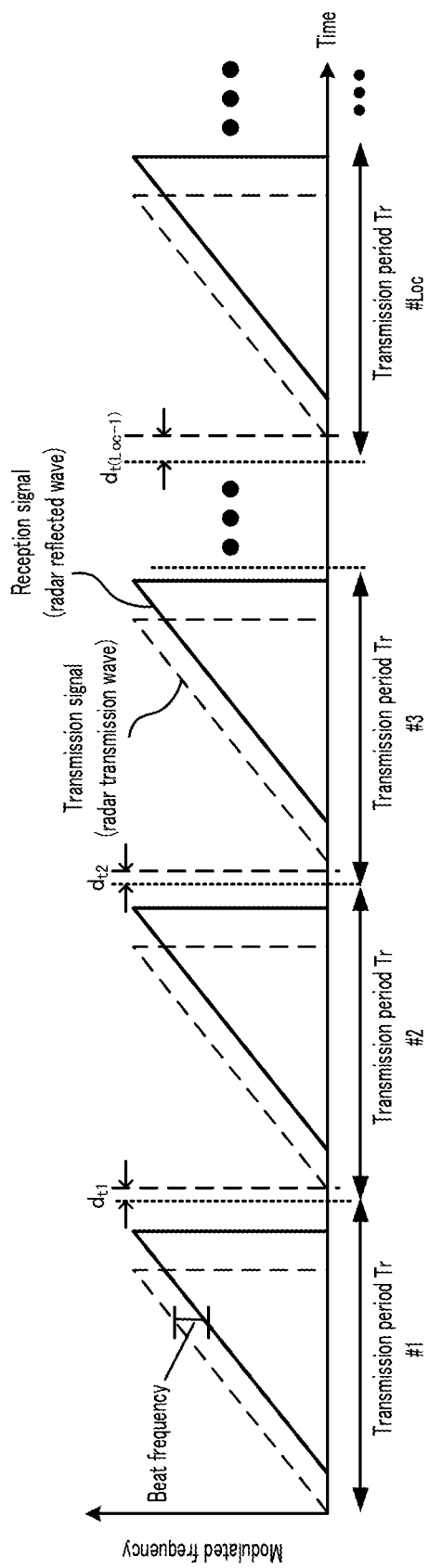
FIG. 12 illustrates an example of transmission signals and reception signals in a case where a chirp pulse is used.

Reception radio 203 includes mixer 204 and low pass filter (LPF) 205. Reception radio 203 mixes, at mixer 204, a chirp signal inputted from radar transmission signal generator 101, which is a transmission signal, with the received reflected wave signal, and passes the resulting mixed signal through LPF 205. As a result, a beat signal having a frequency corresponding to the delay time of the reflected wave signal is acquired. For example, as illustrated in FIG. 12, the difference frequency between the frequency of a transmission chirp signal (transmission frequency-modulated wave) and the frequency of a reception chirp signal (reception frequency-modulated wave) is obtained as a beat frequency.

In each antenna system processor 201-z (where z is any of 1 to Na), signal processor 206 includes analog-to-digital (AD) converter 207, beat frequency analyzer 208, output switch 209, and Doppler analyzers 210.

The signal (for example, beat signal) outputted from LPF 205 is converted into discretely sampled data by AD converter 207 in signal processor 206.

Beat frequency analyzer 208 performs, in each transmission period Tr, FFT processing on $N_{data}$ pieces of discretely sampled data obtained in a defined time range (range gate). Note that beat frequency analyzer 208 performs the FFT processing on $N_{data}$ pieces of discretely sampled data obtained in the range gate shifted by a transmission delay, for example, in a transmission period including the transmission delay. Signal processor 206 thus outputs a frequency spectrum in which a peak appears at a beat frequency dependent on the delay time of the reflected wave signal (radar reflected wave). In other words, the beat frequency corresponding to the distance of a reflector is detected regardless of the presence or absence of the transmission delay. Note that, in the FFT processing, for example, beat frequency analyzer 208 may perform multiplication by a window function coefficient such as the Han window or the Hamming window. The use of the window function coefficient can suppress sidelobes around the beat frequency peak.

Here, a beat frequency response obtained from the m-th chirp pulse transmission, which is outputted from beat frequency analyzer 208 in z-th signal processor 206, is represented by $RFT_z(f_b, m)$. Here, fb denotes the beat frequency index and corresponds to an FFT index (bin number). For example, $f_b=0, \ldots, (N_{data}/2)-1$, $z=1, \ldots, Na$, and $m=1, \ldots, N_C$. A beat frequency having smaller beat frequency index fb indicates a shorter delay time of the reflected wave signal (in other words, a shorter distance to the target object).

In addition, beat frequency index fb may be converted into distance information $R(f_b)$ using following Expression 35. Thus, in the following, beat frequency index $f_b$ is also referred to as "distance index $f_b$."

[35]

$$R(f_b) = \frac{C_0}{2B_w} f_b \quad \text{(Expression 35)}$$

Here, $B_w$ denotes a frequency-modulation bandwidth within the range gate for a chirp signal, and $C_0$ denotes the speed of light.

Output switch 209 performs selective switching to output the output of beat frequency analyzer 208 for each transmission period to OC_INDEX-th Doppler analyzer 210 among Loc Doppler analyzers 210 based on orthogonal code element index OC_INDEX outputted from encoder 107 of phase rotation amount setter 105. In other words, output switch 209 selects OC_INDEX-th Doppler analyzer 210 at m-th transmission period Tr.

Signal processor 206 includes Loc Doppler analyzers 210-1 to 210-Loc. For example, data is inputted by output switch 209 to noc-th Doppler analyzer 210 in each of Loc transmission periods (Loc×Tr). Accordingly, noc-th Doppler analyzer 210 performs Doppler analysis for each distance index $f_b$ using data of Ncode transmission periods among Nc transmission periods (for example, using beat frequency response $RFT_z(f_b, m)$ outputted from beat frequency analyzer 208). Here, noc denotes the index of a code element, and noc=1, ..., Loc.

For example, when Ncode is a power of 2, FFT processing is applicable in the Doppler analysis. In this case, the FFT size is Ncode, and a maximum Doppler frequency that is derived from the sampling theorem and in which no aliasing occurs is ±1/(2Loc×Tr). Further, the Doppler frequency interval of Doppler frequency index $f_s$ is 1/(Ncode×Loc×Tr), and the range of Doppler frequency index fs is given by $f_s = -Ncode/2, ..., 0, ..., Ncode/2-1$.

The following description will be given of a case where Ncode is a power of 2, as an example. Note that, when Ncode is not a power of 2, zero-padded data is included, for example, to allow FFT processing to be performed, with the data size (FFT size) being equal to a power of 2. In the FFT processing, Doppler analyzer 210 may perform multiplication by a window function coefficient such as the Han window or the Hamming window. The application of a window function can suppress sidelobes around the beat frequency peak.

For example, output $VFT_z^{noc}(f_b, f_s)$ of Doppler analyzer 210 of z-th signal processor 206 is given by following Expression 36. Here, j is the imaginary unit and z=1 to Na.

[36]

$$VFT_z^{noc}(f_b, f_s) = \quad \text{(Expression 36)}$$
$$\sum_{s=0}^{N_{code}-1} RFT_z(f_b, L_{OC} \times s + noc) \exp\left[-j \frac{2\pi s f_s}{N_{code}}\right]$$

The processing by the constituent sections of signal processor 206 has been described above.

In FIG. 1, CFAR section 211 performs CFAR processing (in other words, adaptive threshold judgement) using the outputs of Loc Doppler analyzers 210 in each of the first to Na-th signal processors 206 and extracts distance indices $f_{b\_cfar}$ and Doppler frequency indices $f_{s\_cfar}$ that provide peak signals.

For example, CFAR section 211 performs power addition of outputs $VFT_z^{noc}(f_b, f_s)$ of Doppler analyzers 210 in first to Na-th signal processors 206, for example, as given by following Expression 37, so as to two-dimensional CFAR processing in two dimensions formed by the distance axis and the Doppler frequency axis (corresponding to the relative velocity) or CFAR processing using one-dimensional CFAR processing in combination. For example, processing disclosed in NPL 2 may be applied as the two-dimensional CFAR processing or the CFAR processing using one-dimensional CFAR processing in combination.

(Expression 37)

$$PowerFT(f_b, f_s) = \sum_{z=1}^{N_a} \sum_{noc=1}^{L_{oc}} |VFT_z^{noc}(f_b, f_s)|^2 \quad [37]$$

CFAR section 211 adaptively sets a threshold and outputs, to coded Doppler demultiplexer 212, distance index $f_{b\_cfar}$ and Doppler frequency index $f_{s\_cfar}$ that provide received power greater than the threshold, and received-power information $PowerFT(f_{b\_cfar}, f_{s\_cfar})$.

For example, when phase rotation amount $\varphi_{ndm}$ for applying Doppler shift amount $DOP_{ndm}$ is determined using Expression 5, the intervals between the Doppler shift amounts in the Doppler frequency domain, which are outputted from Doppler analyzers 210, are equal intervals, and $\Delta FD = Ncode/N_{DM}$ when intervals $\Delta FD$ of the Doppler shift amounts are represented by the intervals of the Doppler frequency indices. Accordingly, in the outputs from Doppler analyzers 210, a peak is detected for each Doppler-shift multiplexed signal at an interval of $\Delta FD$ in the Doppler frequency domain. Note that, when phase rotation amount $\varphi_{ndm}$ is determined using Expression 5, $\Delta FD$ may sometimes not be an integer depending on Ncode and $N_{DM}$. In this case, Expression 61 described below may be used to obtain $\Delta FD$ having an integer value. The following describes a reception processing operation using $\Delta FD$ having an integer value.

Figure 13:
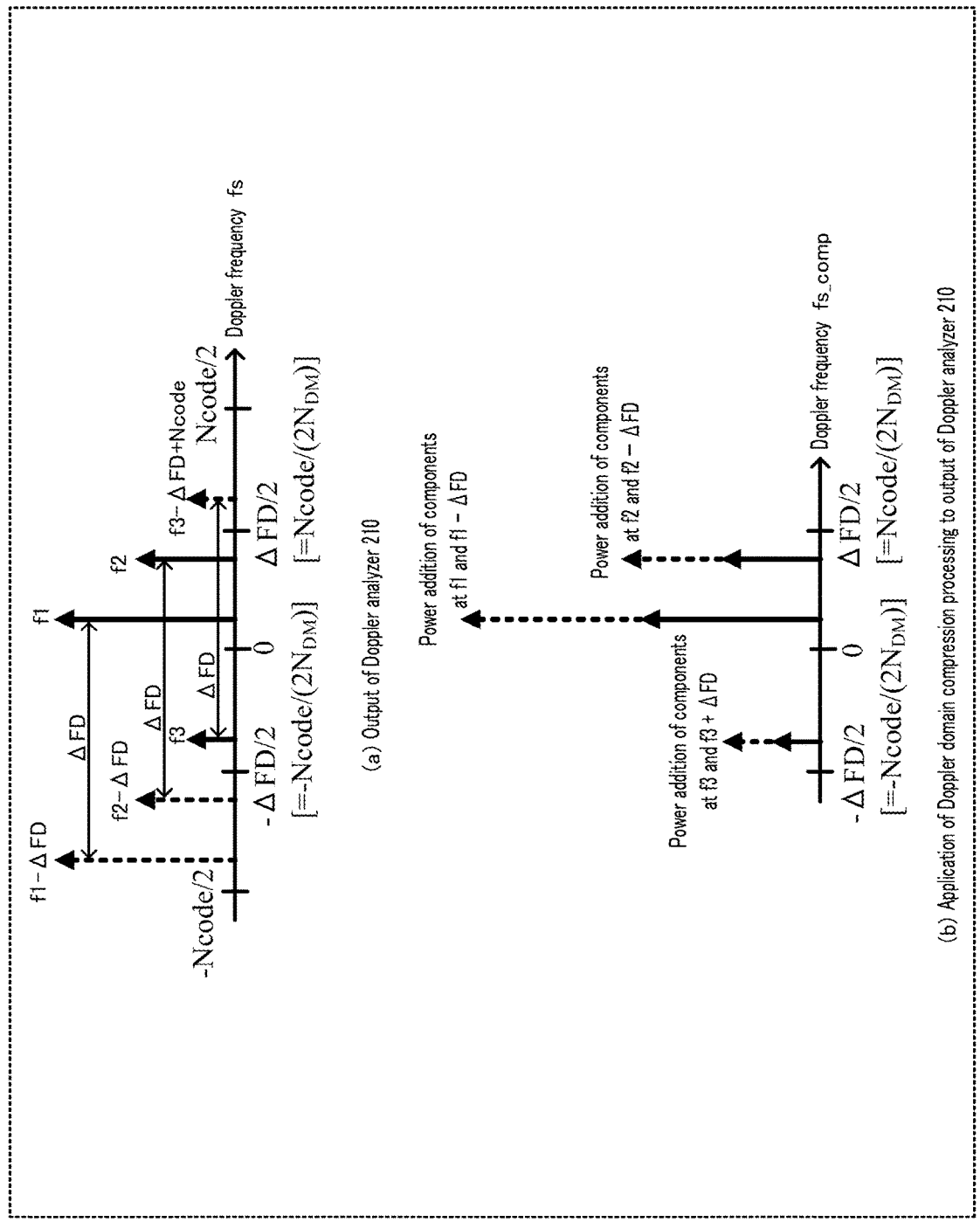
FIG. 13 illustrates an example of Doppler domain compression processing.

Part (a) in FIG. 13 illustrates an example of the outputs of Doppler analyzers 210 for the distances over which reflected waves from three targets exist in a case where $N_{DM}=2$. For example, as illustrated at (a) in FIG. 13, when reflected waves from the three targets are observed at Doppler frequency indices f1, f2, and f3, the reflected waves are also observed at respective Doppler frequency indices spaced from f1, f2 and f3 by the interval of $\Delta FD$ (for example, f1-$\Delta FD$, f2-$\Delta FD$, and f3-$\Delta FD$+Ncode).

Accordingly, CFAR section 211 may perform, as given by following Expression 38, power addition (referred to as, for example, "Doppler domain compression") with respect to the outputs of Doppler analyzers 210 while adjusting peak positions of Doppler-shift multiplexed signals to respective ranges resulting from division by the range of interval $\Delta FD$ of the Doppler shift amounts. Subsequently, CFAR section 211 may perform CFAR processing (referred to as, for example, "Doppler domain compression CFAR processing"). Here, $f_{s\_comp} = -\Delta FD/2, ..., \Delta FD/2-1 = Ncode/\{2(N_{DM})\}, ..., Ncode/\{2(N_{DM})\}-1$.

(Expression 38)

$$\text{PowerFT\_comp}(f_b, f_{s\_comp}) = \sum_{nfd=1}^{N_{DM}} \text{PowerFT}\left(f_b, f_{s\_comp} + \left(nfd - \text{ceil}\left(\frac{N_{DM}}{2}\right) - 1\right) \times \Delta FD\right)$$

[38]

However, in Expression 38, when $f_{s\_comp}+(nfd-\text{ceil}(N_{DM}/2)-1)\times\Delta FD < -N\text{code}/2$, the Doppler frequency index to which Ncode is added is used. Similarly, in Expression 38, when $f_{s\_comp}+(nfd-\text{ceil}(N_{DM}/2)-1)\times\Delta FD > (N\text{code}/2)-1$, the Doppler frequency index from which Ncode is subtracted is used.

It is thus possible to compress the Doppler frequency range for the CFAR processing to $1/N_{DM}$ to reduce the amount of CFAR processing and to simplify the circuit configuration. In addition, CFAR section 211 is capable of power addition for $N_{DM}$ Doppler-shift multiplexed signals, to improve a signal to noise ratio (SNR) by about $(N_{DM})^{1/2}$. As a result, the radar sensing performance of radar apparatus 10 can be improved.

Part (b) in FIG. 13 illustrates an example of outputs that are the outputs of Doppler analyzers 210 illustrated at (a) in FIG. 13 to which the Doppler domain compression processing given by Expression 38 is applied. As illustrated at (b) in FIG. 13, in a case where $N_{DM}=2$, CFAR section 211 adds together the power component for Doppler frequency index f1 and the power component for f1−ΔFD through the Doppler domain compression processing and outputs the result. Likewise, as illustrated at (b) in FIG. 13, CFAR section 211 adds together the power component of Doppler frequency index f2 and the power component of f2−ΔFD and outputs the result. Further, regarding the power component of Doppler frequency index f3, f3—ΔFD is smaller than—Ncode/2. Thus, CFAR section 211 adds together the power component of Doppler frequency index f3 and the power component of f3−ΔFD+Ncode (f3+ΔFD when $N_{DM}=2$, for example) and outputs the result.

As a result of the Doppler domain compression, the range of Doppler frequency indices $f_{s\_comp}$ in the Doppler frequency domain is reduced to the range of from −ΔFD/2 through ΔFD/2−1 (when ΔFD=Ncode/$N_{DM}$, the range is from −Ncode/($2N_{DM}$) through Ncode/($2N_{DM}$)−1) and the range of the CFAR processing is compressed, resulting in reduction of the computation amount of CFAR processing. In addition, in FIG. 13, for example, because of power addition for the reflected waves from the three targets, the SNR of the signal components is improved. Note that the power of noise components is also combined, and thus, improvement in SNR is, for example, about $(N_{DM})^{1/2}$.

For example, CFAR section 211, which uses the Doppler domain compression CFAR processing, adaptively sets a threshold and outputs, to coded Doppler demultiplexer 212, distance index $f_{b\_cfar}$ and Doppler frequency index $f_{s\_comp\_cfar}$ that provide a received power greater than the threshold, and received-power information PowerFT($f_{b\_cfar}$, $f_{s\_comp\_cfar}$+(nfd −ceil($N_{DM}/2$)−1)×ΔFD (where nfd=1, . . . , $N_{DM}$)) for Doppler frequency indices ($f_{s\_comp\_cfar}$+(nfd−ceil ($N_{DM}/2$)−1)×ΔFD) of $N_{DM}$ Doppler multiplexed signals.

Note that phase rotation amount $\varphi_{ndm}$ for applying Doppler shift amount $DOP_{ndm}$ is not limited to that given in Expression 5. CFAR processor 211 can apply the Doppler domain compression CFAR processing, for example, if phase rotation amounts $\varphi_{ndm}$ of Doppler-shift multiplexed signals are such that peaks are detected at constant intervals in the Doppler frequency domain in the outputs from Doppler analyzers 210.

Next, an example of the operation of coded Doppler demultiplexer 212 illustrated in FIG. 1 will be described. The following describes an example of processing performed by coded Doppler demultiplexer 212 when CFAR section 211 uses the Doppler domain compression CFAR processing.

Based on the outputs of CFAR section 211 (i.e., distance indices $f_{b\_cfar}$, Doppler frequency indices $f_{s\_comp\_cfar}$, and received-power information PowerFT($f_{b\_cfar}$, $f_{s\_comp\_cfar}$+ (nfd−ceil($N_{DM}/2$)−1)×ΔFD (where nfd=1, . . . , $N_{DM}$)) for Doppler frequency indices ($f_{s\_comp\_cfar}$+(nfd−ceil($N_{DM}/2$)−1)×ΔFD) of $N_{DM}$ Doppler multiplexed signals), coded Doppler demultiplexer 212 separates, using the outputs of Doppler analyzers 210, coded-Doppler multiplexed signals transmitted, and distinguishes (in other words, also referred to as "judges" or "identifies") transmission antennas 109 and Doppler frequencies (in other words, Doppler velocities or relative velocities).

As described above, encoder 107 in phase rotation amount setter 105 does not set all of $N_{DM}$ numbers $N_{DOP\_CODE}(1), N_{DOP\_CODE}(2), \ldots,$ and $N_{DOP\_CODE}(N_{DM})$ of coded Doppler multiplexing to $N_{CM}$, for example, but sets at least one of the numbers of coded Doppler multiplexing to a value smaller than $N_{CM}$. For example, coded Doppler demultiplexer 212 performs (1) code separation processing to detect a coded Doppler multiplexed signal for which the number of coded Doppler multiplexing is set smaller than $N_{CM}$ (in other words, detect an unused coded Doppler multiplexed signal that is not used for multiplexing transmission), to perform aliasing judgement. Thereafter, coded Doppler demultiplexer 212 performs (2) Doppler code separation processing on coded Doppler multiplexed signals used for multiplexing transmission based on an aliasing judgement result.

Processing (1) and processing (2) by coded Doppler demultiplexer 212 described above will be described below.

<(1) Aliasing Judgement Processing (Detection Processing of Detecting Unused Coded Doppler Multiplexed Signal)>

Coded Doppler demultiplexer 212 performs the Doppler aliasing judgement processing, for example, on the assumption that the Doppler range of a target is ±1/Tr.

Here, each of Doppler analyzers 210 applies the FFT processing to each code element, for example, when Ncode is a power value of 2, and thus performs the FFT processing in periods of (Loc×Tr) using the output from beat frequency analyzer 208. Thus, for Doppler analyzer 210, the Doppler range in which no aliasing occurs according to the sampling theorem is ±1/(2Loc×Tr). Since Doppler multiplexing is further performed on this Doppler range of ±1/(2Loc×Tr) by using number $N_{DM}$ of Doppler multiplexing, coded Doppler demultiplexer 212 performs the aliasing judgement processing, assuming the Doppler range of up to ±1/Tr resulting from multiplication, by $2\text{Loc}\times N_{DM}$, of the Doppler range of $1/(2\text{Loc}\times N_{DM}\times\text{Tr})$ in which aliasing due to Doppler multiplexing does not occur.

Here, by way of example, a description will be given of a case where Nt is 3, number $N_{DM}$ of Doppler multiplexing is 2, and number $N_{CM}$ of code multiplexing is 2. Here, by way of example, phase rotation amount $\varphi_{ndm}$ for applying Doppler shift amount $DOP_{ndm}$ is assigned as given in Expression 5. In this case, phase rotation amount $\varphi_1$ for applying Doppler shift amount $DOP_1$ is 0, and, phase rotation amount $\varphi_2$ for applying Doppler shift amount $DOP_2$ is π. In addition, encoder 107 uses two orthogonal codes Code$_1$={1, 1} and Code$_2$={1, −1} among Walsh-Hadamard codes having code length Loc=2. Further, as illustrated at (a) in FIG. 3, $N_{DOP\_CODE}(1)=2$ and $N_{DOP\_CODE}(2)=1$ are used.

In this case, with respect to the Doppler range of $\pm 1/(2Loc \times N_{DM} \times Tr) = \pm 1/(8Tr)$ in which no aliasing due to the coded Doppler multiplexing occurs, coded Doppler demultiplexer 212 performs the aliasing judgement processing assuming the Doppler range of up to $\pm 1/(Tr)$ resulting from multiplication of the Doppler range of $\pm 1/(2Loc \times N_{DM} \times Tr) = \pm 1/(8Tr)$ by 8 ($=2Loc \times N_{DM}$).

Figure 14:
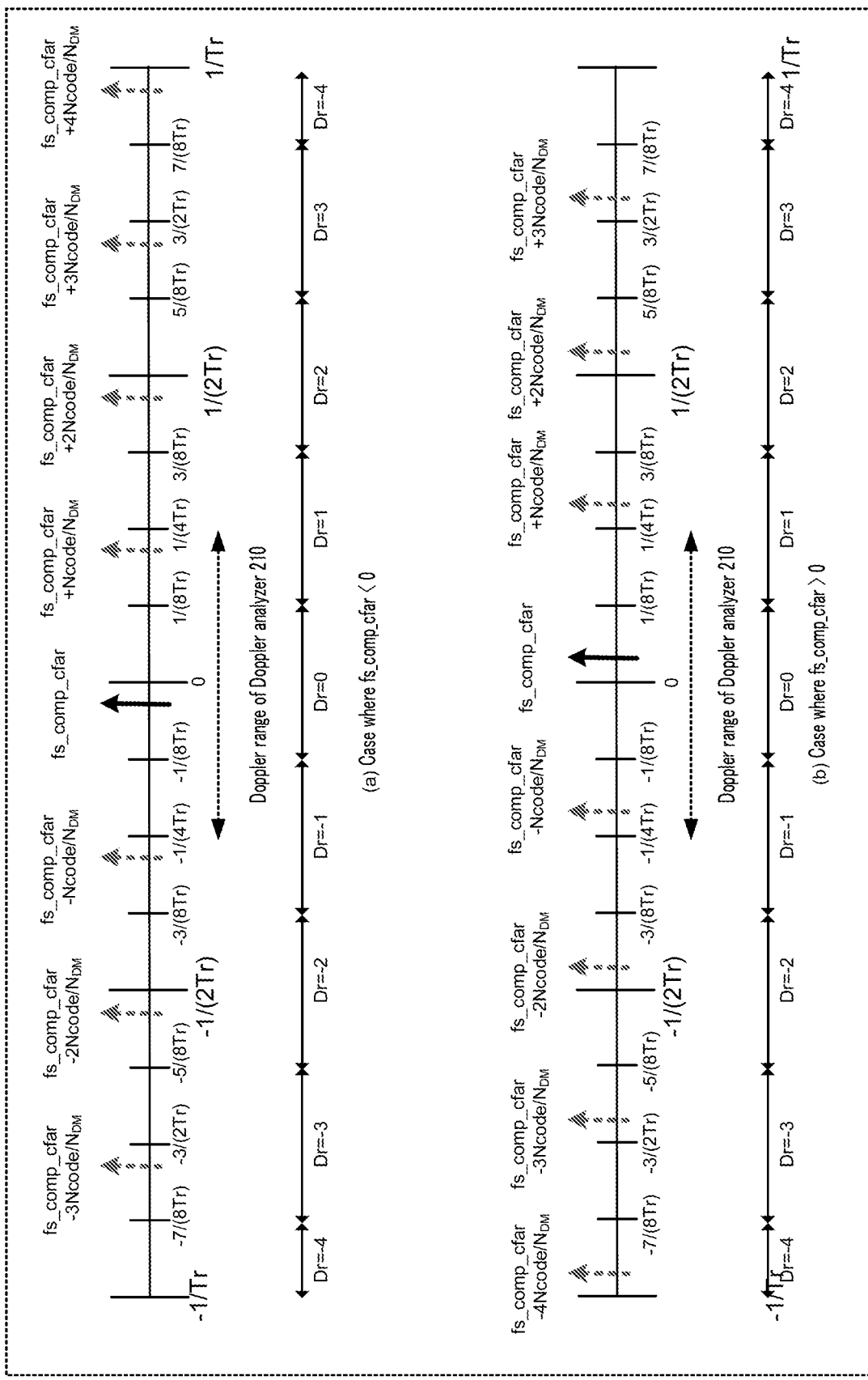
FIG. 14 illustrates an example of Doppler aliasing judgement.

Here, Doppler component $VFT_z^{noc}(f_{b\_cfar}, f_{s\_comp\_cfar})$, which is the output of Doppler analyzer 210 corresponding to distance index $f_{b\_cfar}$ and Doppler frequency index $f_{s\_comp\_cfar}$ extracted in CFAR section 211, may contain a Doppler component including aliasing as illustrated at (a) and (b) in FIG. 14, for example, in the Doppler Range of 1/Tr.

For example, as illustrated at (a) in FIG. 14, there is a possibility of eight ($=2Loc \times N_{DM}$) Doppler components of $f_{s\_comp\_cfar}-3Ncode/N_{DM}$, $f_{s\_comp\_cfar}-2Ncode/N_{DM}$, $f_{s\_comp\_cfar}-Ncode/N_{DM}$, $f_{s\_comp\_cfar}$, $f_{s\_comp\_cfar}+Ncode/N_{DM}$, $f_{s\_comp\_cfar}+2Ncode/N_{DM}$, $f_{s\_comp\_cfar}+3Ncode/N_{DM}$, and $f_{s\_comp\_cfar}+4Ncode/N_{DM}$ in the case of $f_{s\_comp\_cfar}<0$ within the Doppler range of 1/Tr.

Further, for example, as illustrated at (b) in FIG. 14, there is a possibility of eight ($=2Loc \times N_{DM}$) Doppler components of $f_{s\_comp\_cfar}-4Ncode/N_{DM}$, $f_{s\_comp\_cfar}-3Ncode/N_{DM}$, $f_{s\_comp\_cfar}-2Ncode/N_{DM}$, $f_{s\_comp\_cfar}-Ncode/N_{DM}$, $f_{s\_comp\_cfar}$, $f_{s\_comp\_cfar}+Ncode/N_{DM}$, $f_{s\_comp\_cfar}+2Ncode/N_{DM}$, and $f_{s\_comp\_cfar}+3Ncode/N_{DM}$ in the case of $f_{s\_cfar}>0$ within the Doppler range of $\pm 1/Tr$. These possible Doppler components (eight ($=2Loc \times N_{DM}$) components) with respect to $f_{s\_comp\_cfar}$ are called "Doppler component candidates" with respect to $f_{s\_comp\_cfar}$. In the following, Doppler regions in which such eight ($=2Loc \times N_{DM}$) Doppler component candidates are present are represented using index "Dr" indicating the Doppler aliasing range as illustrated in FIG. 14. Dr is an index indicating the Doppler aliasing range, and for example, an integer value in a range of $D_r \in \{-L_{OC}N_{DM}, \ldots, L_{OC}N_{DM}-1\}$ is used. In FIG. 14, $D_r=-4, \ldots, 3$. Note that, $D_r=0$ indicates the region where no Doppler aliasing occurs, and the regions where $D_r \neq 0$ indicate the regions where Doppler aliasing occurs. The greater the absolute value of $D_r$, the more distant the Doppler region is from the Doppler region indicated by $D_r=0$.

Coded Doppler demultiplexer 212 corrects phase changes corresponding to the eight ($=2Loc \times N_{DM}$) Doppler components including aliasing within the Doppler range of $\pm 1/Tr$ as illustrated in FIG. 14, and performs the coded Doppler demultiplexing processing on the coded Doppler multiplexed signal for which the number of coded Doppler multiplexing is set smaller than $N_{CM}$ (in other words, the unused coded Doppler multiplexed signal).

Then, based on the received power of components obtained by the coded Doppler demultiplexing processing on the unused coded Doppler multiplexed signal, coded Doppler demultiplexer 212 judges whether or not each of the Doppler component candidates is a true Doppler component.

For example, coded Doppler demultiplexer 212 may detect, among the Doppler component candidates with respect to $f_{s\_comp\_cfar}$, a Doppler component having the minimum received power obtained by the coded Doppler demultiplexing processing on the unused coded Doppler multiplexed signal, to judge that the detected Doppler component is the true Doppler component. In other words, coded Doppler demultiplexer 212 may judge that those of the Doppler component candidates with respect to $f_{s\_comp\_cfar}$ which have received powers different from the minimum received power are false Doppler components.

This aliasing judgement processing can resolve the ambiguity in the Doppler range of $\pm 1/Tr$. In addition, by this aliasing judgement processing, the range in which a Doppler frequency can be detected without ambiguity can be extended to a range of from $-1/(Tr)$ to less than $1/(Tr)$ as compared with the Doppler range of $\pm 1/(2Loc \times N_{DM} \times Tr) = \pm 1/(8Tr)$ in which aliasing due to Doppler multiplexing does not occur.

By the coded Doppler demultiplexing based on the unused coded Doppler multiplexed signal, for example, the phase change of the true Doppler component is correctly corrected and the orthogonality between the coded Doppler multiplexed signals used for multiplexing transmission and the unused coded Doppler multiplexed signal is maintained. Therefore, the coded Doppler multiplexed signal codes used for multiplexing transmission and the unused coded Doppler multiplexed signal become uncorrelated, and the received power becomes as low as a noise level.

On the other hand, the phase changes of false Doppler components are, for example, erroneously corrected and the orthogonality between the coded Doppler multiplexed signals used for multiplexing transmission and the unused coded Doppler multiplexed signal is not maintained. Thus, a correlated component (interference component) is caused between the coded Doppler multiplexed signal codes used for the multiplexing transmission and the unused coded Doppler multiplexed signal, and, for example, a received power greater than a noise level may be detected. Therefore, as described above, coded Doppler demultiplexer 212 may judge that the Doppler component having the minimum received power among the Doppler component candidates with respect to $f_{s\_comp\_cfar}$ resulting from the coded Doppler demultiplexing based on the unused coded Doppler multiplexed signal is the true Doppler component, and judge that the other Doppler components having the received powers different from the minimum received power are the false Doppler components.

For example, coded Doppler demultiplexer 212 corrects the phase changes corresponding to the Doppler components of the Doppler component candidates with respect to $f_{s\_comp\_cfar}$ based on the outputs of Doppler analyzers 210 in each antenna system processor 201, and calculates, according to Expression 39, received power $P_{DAR}(f_{b\_cfar}, f_{s\_comp\_cfar}, D_r, \text{nuc}, \text{nud})$ after the code separation using the unused coded Doppler multiplexed signal.

Here, nuc and nud represent an index of an orthogonal code serving as the unused coded Doppler multiplexed signal and an index of the Doppler multiplexed signal, respectively. For example, in the case of (b) of FIG. 3, the unused coded Doppler multiplexed signal is indicated by a cross mark in the figure, is assigned the code of Code$_2$, and is assigned the Doppler shift amount of Dop$_1$. Accordingly, indices nuc and nud of the orthogonal code to which the unused coded Doppler multiplexed signal is assigned are 2 and 2, respectively.

In the following, a pair of the index of the orthogonal code and the index of the Doppler multiplexed signal that are used for the coded Doppler multiplexed signal is described as "DCI (index of orthogonal code, index of Doppler multiplexed signal)." In the case of (b) of FIG. 3, DCI (nuc, nud) represents the index of an orthogonal code to which an unused coded Doppler multiplexed signal is assigned and the index of a Doppler multiplexed signal. Similarly, for example, in the case of (a) in FIG. 5, the unused coded Doppler multiplexed signal is assigned to DCI (2, 2) and DCI (2, 3). Further, for example, in the case of (c) in FIG. 6, the unused coded Doppler multiplexed signal is assigned to DCI (1, 3) and DCI (2, 3).

(Expression 39)

$$P_{DAR}(f_{b\_cfar}, f_{s\_comp\_cfar}, D_r, nuc, nud) = \sum_{z=1}^{N_a} |Y_z(f_{b\_cfar}, f_{s\_comp\_cfar}, D_r, nuc, nud)|^2 \quad [39]$$

Here, $Y_z(f_{b\_cfar}, f_{s\_comp\_cfar}, D_r, nuc, nud)$ is a received signal obtained by correction of the phase changes corresponding to the Doppler components of Doppler component candidates with respect to $f_{s\_comp\_cfar}$ and separation of the unused coded Doppler multiplexed signal to which DCI (nuc, nud) is assigned. The correction and separation are based on the outputs of Doppler analyzers 210 in z-th antenna system processor 201 as given in following Expression 40:

$$Y_z(f_{b\_cfar}, f_{s\_comp\_cfar}, D_r, nuc, nud) = \text{Code}^*_{nuc}\{\beta(D_r) \otimes \alpha(f_{s\_comp\_cfar}, D_r) \otimes \text{VFTALL}_z(f_{b\_cfar}, f_{s\_comp\_cfar}, D_r, nud)\} \quad \text{(Expression 40)}.$$

In Expressions 39 and 40, in order to separate the unused coded Doppler multiplexed signal to which DCI (nuc, nud) is assigned, the received powers after code separation using unused orthogonal code $\text{Code}_{nuc}$ are calculated with respect to outputs $\text{VFTALL}_z(f_{b\_cfar}, f_{s\_comp\_cfar}, D_r, nud)$ of Doppler analyzers 210 in z-th antenna system processor 201, and the sum of such powers is calculated with respect to all the antenna system processors. Thus, it is possible to increase the aliasing judgement accuracy even when the received signal level is low. However, instead of Expression 39, the received powers after code separation using the unused coded Doppler multiplexed signal may be calculated with respect to the outputs of Doppler analyzers 210 in some of antenna system processors 201. Even in this case, it is possible to reduce the arithmetic processing amount while maintaining the aliasing judgement accuracy, for example, in a range where the received signal level is sufficiently high.

Note that, in Expressions 39 and 40, $D_r$ is an index indicating the Doppler aliasing range, and takes an integer value in a range of $D_r \in \{-L_{OC}N_{DM}, \ldots, L_{OC}N_{DM}-1\}$, for example.

Further, in Expression 40, operator "$\otimes$" represents a product between each pair of elements of vectors having the same number of elements. For example, for n-th order vectors $A=[a_1, \ldots, a_n]$ and $B=[b_1, \ldots, b_n]$, the product between each pair of elements is expressed by following Expression 41:

$$A \otimes B = [a_1, \ldots, a_n] \otimes [b_1, \ldots, b_n] = [a_1 b_1, \ldots, a_n b_n] \quad \text{(Expression 41)}.$$

Moreover, in Expression 40, superscript T represents vector transposition, and superscript * (asterisk) represents a complex conjugate operator.

In Expression 40, $\alpha(f_{s\_comp\_cfar}, D_r)$ represents "Doppler phase correction vector." Doppler phase correction vector $\alpha(f_{s\_comp\_cfar}, D_r)$ corrects the Doppler phase rotation caused by a time difference between Doppler analyses of Loc Doppler analyzers 210 within Doppler aliasing range $D_r$ when Doppler frequency index $f_{s\_comp\_cfar}$ extracted in CFAR section 211 is in an output range (in other words, Doppler range) of Doppler analyzers 210 that does not include Doppler aliasing, for example.

For example, Doppler phase correction vector $\alpha(f_{s\_comp\_cfar}, D_r)$ is expressed by following Expression 42. For example, Doppler phase correction vector $\alpha(f_{s\_comp\_cfar}, D_r)$ as given by Expression 42 is a vector having, as an element, a Doppler phase correction coefficient. The Doppler phase correction coefficient corrects phase rotations of Doppler components having Doppler frequency indices $f_{s\_comp\_cfar}$ and being within Doppler aliasing range $D_r$. The phase rotations are caused by the time lags of $Tr+d_{t1}$, $2Tr+d_{t2}, \ldots, (Loc-1)Tr+d_{t(Loc-1)}$ of the outputs of from output $\text{VFT}_z^2(f_{b\_cfar}, f_{s\_comp\_cfar})$ of second Doppler analyzer 210 to output $\text{VFT}_z^{Loc}(f_{b\_cfar}, f_{s\_comp\_cfar})$ of Loc-th Doppler analyzer 210, for example, with reference to the Doppler analysis time for analysis on output $\text{VFT}_z^1(f_{b\_cfar}, f_{s\_comp\_cfar})$ of first Doppler analyzer 210.

(Expression 42)

$$\alpha(f_{s\_comp\_cfar}, D_r) = \left[1, \exp\left(-\frac{j2\pi\left(f_{s\_comp\_cfar} + \frac{D_r N_{code}}{N_{DM}}\right)}{N_{code}} \times \frac{T_r + dt_1}{L_{oc}T_r}\right), \ldots, \exp\left(-\frac{j2\pi\left(f_{s\_comp\_cfar} + \frac{D_r N_{code}}{N_{DM}}\right)}{N_{code}} \times \frac{(L_{oc}-1)T_r + dt_{Loc-1}}{L_{oc}T_r}\right)\right]^T \quad [43]$$

Further, in Expression 40, $\beta(D_r)$ represents an "aliasing phase correction vector." Aliasing phase correction vector $\beta(D_r)$ corrects the Doppler phase rotation of an integer multiple of $2\pi$ considering the case where, for example, the Doppler phase rotations caused by the time differences between the Doppler analyses of Loc Doppler analyzers 210 include a Doppler phase rotation of an integer multiple of $2\pi$ in Doppler aliasing range $D_r$.

For example, aliasing phase correction vector $\beta(D_r)$ is expressed by following Expression 43:

(Expression 43)

$$\beta(D_r) = \left[1, \exp\left(-j2\pi\left\lfloor\frac{D_r + N_{DM}/2}{N_{DM}}\right\rfloor \times \frac{T_r + dt_1}{L_{oc}T_r}\right), \ldots, \exp\left(-j2\pi\left\lfloor\frac{D_r + N_{DM}/2}{N_{DM}}\right\rfloor \times \frac{(L_{oc}-1)T_r + dt_{Loc-1}}{L_{oc}T_r}\right)\right]^T. \quad [44]$$

In Expression 43, $D_r$ is an index indicating the Doppler aliasing range and takes an integer value in the range of $D_r = -L_{OC}N_{DM}, \ldots, L_{OC}N_{DM}-1$. Further, aliasing phase correction vector $\beta(D_r)$ given by Expression 43 is a vector having, as an element, a Doppler phase correction coefficient for correcting a phase rotation being an integer multiple of $2\pi$ considering the time lags of $Tr+d_{t1}$, $2Tr+d_{t2}, \ldots, (Loc-1)Tr+d_{t(Loc-1)}$ of the outputs of from output $\text{VFT}_z^2(f_{b\_cfar}, f_{s\_cfar})$ of second Doppler analyzer 210 to output $\text{VFT}_z^{Loc}(f_{b\_cfar}, f_{s\_cfar})$ of Loc-th Doppler analyzer 210, for example, with reference to the Doppler analysis time for analysis on output $\text{VFT}_z^1(f_{b\_cfar}, f_{s\_cfar})$ of first Doppler analyzer 210.

Such phase correction by Doppler phase correction vector $\alpha(f_{s\_comp\_cfar}, D_r)$ and aliasing phase correction vector $\beta(D_r)$ corresponds to correction of phase changes corresponding to Doppler components of the Doppler component candidates with respect to $f_{s\_comp\_cfar}$.

Further, for example, as given by following Expression 44, $VFTALL_z(f_{b\_cfar}, f_{s\_comp\_cfar}, D_r, \text{nud})$ in Expression 40 represents, in a vector format, components of an unused coded Doppler multiplexed signal to which DCI (nuc, nud) is assigned. The components are extracted within Doppler aliasing range $D_r$. The unused coded Doppler multiplexed signal corresponds to distance index $f_{b\_cfar}$ and Doppler frequency index $f_{s\_comp\_cfar}$ extracted in CFAR section 211 among outputs $VFT_z^{noc}(f_b, f_s)$ of Loc Doppler analyzers 210 in z-th antenna system processor 201. Here, noc=1, ..., Loc, and noc takes an integer value in the range of $D_r = -L_{OC}N_{DM}, \ldots, L_{OC}N_{DM}-1$.

(Expression 44)

$$VFTALL_z(f_{b\_cfar}, f_{s\_comp\_cfar}, D_r, \text{nud}) = \qquad [45]$$

$$\left[ VFT_z^1\left(f_{b\_cfar}, f_{s\_comp\_cfar} + \frac{N_{code}F_R(D_r, \text{nud})}{N_{DM}}\right) \ldots \right.$$

$$\left. VFT_z^{Loc}\left(f_{b\_cfar}, f_{s\_comp\_cfar} + \frac{N_{code}F_R(D_r, \text{nud})}{N_{DM}}\right) \right]^T$$

In Expression 44, $N_{code}F_R(D_r, \text{nud})/N_{DM}$ represents an offset value of the Doppler index of the nud-th Doppler multiplexed signal with respect to $f_{s\_comp\_cfar}$ within Doppler aliasing range $D_r$.

$F_R(D_r, \text{nud})$ can be set in advance when Doppler aliasing range $D_r$ and phase rotation amounts $\varphi_1, \varphi_2, \ldots,$ and $\varphi_{N\_DM}$ for applying Doppler shift amounts $DOP_1, DOP_2, \ldots,$ and $DOP_{N\_DM}$ are fixed. Therefore, for example, coded Doppler demultiplexer 212 may tabulate the correspondence between, on one hand, Doppler aliasing range $D_r$ and the phase rotation amounts and, on the other hand, $F_R(D_r, \text{nud})$, and may read $F_R(D_r, \text{nud})$ based on Doppler aliasing range $D_r$ and a phase rotation amount. Further, for example, when phase rotation amounts $\varphi_1, \varphi_2, \ldots,$ and $\varphi_{N\_DM}$ for applying Doppler shift amounts $DOP_1, DOP_2, \ldots,$ and $DOP_{N\_DM}$ satisfy $-\pi \leq \varphi_1(1) < \varphi_2(1) < \ldots < \varphi_{NDM} < \pi$, $F_R(D_r, \text{nud})$ can be expressed as in following Expression 45:

(Expression 45)

$$F_R(D_r, \text{nud}) = \text{mod}(\text{nud} - 1 - D_r, N_{DM}) - \text{ceil}\left(\frac{N_{DM}}{2}\right). \qquad [46]$$

Here, in the present embodiment, transmission delays $d_{t1}, d_{t2}, \ldots, d_{t(Loc-1)}$ are cyclically set, for example, for respective code transmission periods. Thus, it may be possible to obtain different values of phase correction coefficients (e.g., $\alpha(f_{s\_comp\_cfar}, D_r)$ and $\beta(D_r)$) in the range of $D_r = -Loc \times N_{DM}, -Loc \times N_{DM}+1, \ldots, 0, \ldots, Loc \times N_{DM}-1$. This enables aliasing judgement in a wider Doppler range.

For example, when Loc=$N_{DM}$=2, integer values of $D_r$=−4, −3, −2, −1, 0, 1, 2, 3 are taken, and when transmission delays $d_{t1}, d_{t2}, \ldots, d_{t(Loc-1)}$ are not cyclically set for respective code transmission periods (for example, when all of $d_{t1}, d_{t2}, \ldots, d_{t(Loc-1)}$ are set to 0), $\beta(D_r)$ may be overlapping phase correction values as indicated by following Expressions 46:

$\beta(-4)\beta(0),\beta(-3)\beta(1),\beta(2)\beta(-2),\beta(3)=\beta(-1)$ (Expression 46).

On the other hand, when transmission delays $d_{t1}, d_{t2}, \ldots, d_{t(Loc-1)}$ are cyclically set for respective code transmission periods, $\beta(D_r)$ is expressed by following Expression 47:

$\beta(-4) \neq \beta(0), \beta(-3) \neq \beta(1), \beta(2) \neq \beta(-2), \beta(3) \neq (-1)$ (Expression 47).

For example, with respect to $\beta(D_r)$, when the absolute value of each of transmission delays $d_{t1}, d_{t2}, \ldots, d_{t(Loc-1)}$ in the range of $D_r$ is greater than 0 and is set to a value less than or equal to 0.5Tr, a different phase rotation of up to $2\pi$ is applied for each $\beta(D_r)$ in the variable range of $D_r$. Thus, $\beta(D_r)$ can be set to a different phase correction value. Thus, in the aliasing judgement processing, it is possible to perform aliasing judgement in the range of $D_r$ (in other words, in the range of $-1/(Tr)$ or above and less than $1/(Tr)$).

Note that, for example, the smaller the setting values of transmission delays $d_{t1}, d_{t2}, \ldots d_{t(Loc-1)}$, the smaller the phase differences between the phase correction values. Accordingly, the aliasing judgement accuracy may decrease. On the other hand, for example, the larger the setting values of transmission delays $d_{t1}, d_{t2}, \ldots, d_{t(Loc-1)}$, the longer the transmission time of a radar transmission signal may be. Byway of example, the absolute values of the setting values of transmission delays $d_{t1}, d_{t2}, \ldots, d_{t(Loc-1)}$ may be set to values of about 0.1Tr to 0.25Tr.

For example, in accordance with Expressions 39 and 40, coded Doppler demultiplexer 212 calculates, within each range of $D_r \in \{-L_{OC}N_{DM}, \ldots, L_{OC}N_{DM}-1\}$, received power $P_{DAR}(f_{b\_cfar}, f_{s\_comp\_cfar}, D_r, \text{nuc}, \text{nud})$ after code separation using the unused coded Doppler multiplexed signal to which DCI (nuc, nud) is assigned.

Then, coded Doppler demultiplexer 212 detects a $D_r$ in which received power $P_{DAR}(f_{b\_cfar}, f_{s\_comp\_cfar}, D_r, \text{nuc}, \text{nud})$ is minimized among the ranges of $D_r$. In the following, $D_r$ in which received power $P_{DAR}(f_{b\_cfar}, f_{s\_comp\_cfar}, D_r, \text{nuc}, \text{nud})$ is minimized among the ranges of $D_r$ is referred to as "$D_{r\ min}$" as given in following Expression 48:

(Expression 48)

$$D_{r_{min}} = \left\{\arg D_r \Big| \min_{D_r} P_{DAR}(f_{b\_cfar}, f_{s\_comp\_cfar}, D_r, \text{nuc}, \text{nud})\right\}. \qquad [49]$$

Note that when there are a plurality of unused coded Doppler multiplexed signals, coded Doppler demultiplexer 212 may use received power $Pall_{DAR}(f_{b\_cfar}, f_{s\_comp\_cfar}, D_r)$ after code separation using all unused orthogonal codes as given by following Expression 49, instead of received power $P_{DAR}(f_{b\_cfar}, f_{s\_comp\_cfar}, D_r, \text{nuc}, \text{nud})$:

$Pall_{DAR}(f_{b\_cfar}, f_{s\_comp\_cfar}, D_r) = \Sigma_{nuc, nud} P_{DAR}(f_{b\_cfar}, f_{s\_comp\_cfar}, D_r, nuc, nud)$ (Expression 49).

Obtaining the received power after code separation using all the unused orthogonal codes makes it possible to increase the accuracy of the aliasing judgement by the aliasing processing even when the reception signal level is low.

For example, coded Doppler demultiplexer 212 calculates $Pall_{DAR}(f_{b\_cfar}, f_{s\_comp\_cfar}, D_r)$ in each range of $D_r \in \{-L_{OC}N_{DM}, \ldots, L_{OC}N_{DM}-1\}$, and detects $D_r$ (in other words, $D_{r\ min}$) in which $Pall_{DAR}(f_{b\_cfar}, f_{s\_comp\_cfar}, D_r)$ is minimized. For example, when Expression 49 is used, $D_r$ which provides the minimum received power among the ranges of $D_r$ is represented as "$D_{r\ min}$" as given by following Expression 50:

(Expression 50)

$$D_{r_{min}} = \left\{\arg D_r \Big| \min_{D_r} Pall_{DAR}(f_{b\_cfar}, f_{s\_comp\_cfar}, D_r)\right\}. \qquad [51]$$

Further, coded Doppler demultiplexer 212 may perform processing for judging (in other words, measuring) the accuracy of the aliasing judgement, for example, by comparing minimum received power $\text{Pall}_{DAR}(f_{b\_cfar}, f_{s\_comp\_cfar}, D_r \text{ min})$ after code separation using the unused coded Doppler multiplexed signal to which DCI (nuc, nud) is assigned, on the one hand, and received power $\text{PowerFT\_comp}(f_{b\_cfar}, f_{s\_comp\_cfar})$ of Expression 38 obtained in CFAR section 211 by performing power addition while adjusting peak positions of Doppler-shift multiplexed signals, on the other hand. In this case, coded Doppler demultiplexer 212 may judge the accuracy of the aliasing judgement in accordance with following Expressions 51 and 52, for example:

$$\text{Pall}_{DAR}(f_{b\_cfar}, f_{s\_comp\_cfar}, D_{rmin}) < \text{Threshold}_{DR} \times \text{PowerFT\_comp}(f_b, f_{s\_comp\_cfar}) \quad \text{(Expression 51)};$$

$$\text{Pall}_{DAR}(f_{b\_cfar}, f_{s\_comp\_cfar}, D_{rmin}) \geq \text{Threshold}_{DR} \times \text{PowerFT\_comp}(f_b, f_{s\_comp\_cfar}) \quad \text{(Expression 52)}.$$

For example, when minimum received power $\text{Pall}_{DAR}(f_{b\_cfar}, f_{s\_comp\_cfar}, D_{rmin})$ after code separation using the unused coded Doppler multiplexed signal to which DCI (nuc, nud) is assigned is smaller than the value obtained by multiplying, by predetermined value $\text{Threshold}_{DR}$, $\text{PowerFT\_comp}(f_b, \text{ and } f_{s\_comp\_cfar})$ for distance index $f_{b\_cfar}$ and Doppler frequency index $f_{s\_comp\_cfar}$ extracted in CFAR section 211 (for example, Expression 51), coded Doppler demultiplexer 212 judges that the aliasing judgement is sufficiently accurate. In this case, radar apparatus 10 may perform, for example, subsequent processing (e.g., code separation processing).

On the other hand, for example, when minimum received power $\text{Pall}_{DAR}(f_{b\_cfar}, f_{s\_comp\_cfar}, D_{rmin})$ after code separation using the unused coded Doppler multiplexed signal to which DCI (nuc, nud) is assigned is equal to or larger than the value obtained by multiplying $\text{PowerFT\_comp}(f_b, f_{s\_comp\_cfar})$ by $\text{Threshold}_{DR}$ (for example, Expression 52), coded Doppler demultiplexer 212 judges that the accuracy of the aliasing judgement is not sufficient and the reliability of the aliasing judgement is low (for example, noise component). In this case, for example, radar apparatus 10 may omit to perform subsequent processing (e.g., code separation processing).

Such processing makes it possible to reduce a judgement error in aliasing judgement and to remove a noise component. Note that, predetermined value $\text{Threshold}_{DR}$ may, for example, be set to a range of from 0 to less than 1. By way of example, considering inclusion of a noise component, $\text{Threshold}_{DR}$ may be set in a range of approximately from 0.1 to 0.5.

Note that the calculation formula for received power $Y_z(f_{b\_cfar}, f_{s\_comp\_cfar}, D_r, \text{nuc}, \text{nud})$ after code separation using unused orthogonal code $\text{UnCode}_{nuc}$ may be, for example, following Expression 53 instead of Expression 40:

$$Y_z(f_{b\_cfar}, f_{s\_comp\_cfar}, D_r, nuc, nud) = \{\beta(D_r)^T \otimes \text{Code}_{nuc}\}^* \{\alpha(f_{s\_comp\_cfar}, D_r) \otimes \text{VFTALL}_z(f_{b\_cfar}, f_{s\_comp\_cfar}, D_r, nud)\} \quad \text{(Expression 53)}.$$

In Expression 53, the term
$\beta(D_r) \otimes \text{Code}_{nuc}$
does not depend on index (Doppler frequency index) $f_{s\_comp\_cfar}$ of the Doppler component, and it is thus possible to reduce the arithmetic amount of the aliasing judgement processing, for example, by pre-tabulation.

The operation example of the aliasing processing has been described above.

<(2) Doppler Code Separation Processing on Coded Doppler Multiplexed Signal Used for Multiplexing Transmission>

Coded Doppler demultiplexer 212 performs coded Doppler demultiplexing processing on a coded Doppler multiplexed signal used for multiplexing transmission based on an aliasing judgement result.

For example, as given by following Expression 54, coded Doppler demultiplexer 212 applies Expression 40 based on $D_{rmin}$ that is a result of aliasing judgement in aliasing judgement processing, so as to separate and receive the coded Doppler multiplexed signal to which DCI (ncm, nfd) used for multiplexing transmission is assigned. For example, coded Doppler demultiplexer 212 can perform the separation processing using Expression 54 to separate and receive the coded Doppler multiplexed signal to which DCI (ncm, nfd) used for the multiplexing transmission is assigned. Since by the aliasing judgement processing it is possible to judge an index ($D_{rtrue}$) that is a true Doppler aliasing range within the Doppler range of from $-1/Tr$ to less than $1/Tr$ (in other words, it is possible to judge an index such that $D_{rmin} = D_{rtrue}$), it becomes possible for coded Doppler demultiplexer 212 to set, to zero, the correlation value between the orthogonal codes used for code multiplexing in the Doppler range of from $-1/Tr$ to less than $1/Tr$, so as to perform the separation processing in which the interference between the code multiplexed signals is suppressed.

$$Y_z(f_{b\_cfar}, f_{s\_comp\_cfar}, D_{rmin}, ncm, nfd) = \text{Code}^*_{ncm}\{\beta(D_{rmin}) \otimes \alpha(f_{s\_comp\_cfar}, D_{rmin}) \otimes \text{VFTALL}_z(f_{b\_cfar}, f_{s\_comp\_cfar}, D_{rmin}, nfd)\} \quad \text{(Expression 54)}$$

Here, $Y_z(f_{b\_cfar}, f_{s\_comp\_cfar}, D_{rmin}, \text{ncm}, \text{nfd})$ is an output (for example, coded Doppler demultiplexing result) resulting from code separation of the code multiplexed signal using orthogonal code $\text{Code}_{ncm}$ with respect to nfd-th coded Doppler multiplexed signal $\text{VFTALL}_z(f_{b\_cfar}, f_{s\_comp\_cfar}, D_{rmin}, \text{nfd})$ in Doppler range $D_{rmin}$ among the outputs of distance indices $f_{b\_cfar}$ and Doppler frequency indices $f_{s\_comp\_cfar}$ of Doppler analyzers 210 in z-th antenna system processor 201. It is possible to separate the coded Doppler multiplexed signal to which DCI (ncm, nfd) used for the multiplexing transmission is assigned. Note that, $z=1, \ldots, Na$ and $ncm=1, \ldots, N_{CM}$.

Note that, coded Doppler demultiplexer 212 may use following Expression 55 instead of Expression 54:

$$Y_z(f_{b\_cfar}, f_{s\_comp\_cfar}, D_{rmin}, ncm, nfd) = \{\beta(D_{rmin})^T \otimes \text{Code}_{ncm}\}^* \{\alpha(f_{s\_comp\_cfar}, D_{rmin}) \otimes \text{VFTALL}_z(f_{b\_cfar}, f_{s\_comp\_cfar}, D_{rmin}, nfd)\} \quad \text{(Expression 55)}.$$

In Expression 55, the term
$\beta(D_{rmin})^T \otimes \text{Code}_{ncm}$
(where $D_r = D_{rmin}$ in Expression 55) does not depend on index (e.g., Doppler frequency index) $f_s$ of the Doppler component, and it is thus possible to reduce the arithmetic amount in coded Doppler demultiplexer 212, for example, by pre-tabulation.

Through the code separation processing as described above, in coded Doppler demultiplexer 212, radar apparatus 10 can separate and receive the coded Doppler multiplexed signal to which DCI (ncm, nfd) used for the multiplexing transmission is assigned. The separation and reception are based on the result of the aliasing judgement performed by Doppler analyzers 210 assuming a Doppler range of up to $\pm 1/Tr$ that is greater by a factor of 2Loc than the Doppler range of $\pm 1/(2\text{Loc} \times Tr)$ in which no aliasing occurs.

Further, since the coded Doppler multiplexed signal to which DCI (ncm, nfd) is assigned is transmitted from transmission antenna Tx #[ncm, nfd], it is also possible to judge the transmission antenna. In other words, radar apparatus 10 can separate and receive the coded Doppler multiplexed signal which is transmitted from transmission antenna Tx #[ncm, nfd] and to which DCI (ncm, nfd) is assigned.

In addition, for example, during the coded Doppler demultiplexing processing, radar apparatus 10 performs, on the outputs of Doppler analyzer 210 for each code element, phase correction based on Doppler phase correction taking into account Doppler aliasing (for example, Doppler phase correction vector $\alpha(f_{s\_comp\_cfar}, D_r)$ and aliasing phase correction vector $\beta(D_r)$). Such phase correction corresponds to correcting phase changes corresponding to Doppler components among the Doppler component candidates with respect to $f_{s\_comp\_cfar}$. Mutual interference between code multiplexed signals can thus be reduced, for example, as low as a noise level. In other words, radar apparatus 10 can reduce inter-code interference to suppress an effect on degradation of the detection performance of radar apparatus 10.

Further, in the present embodiment, radar apparatus 10 cyclically sets transmission delays $d_{t1}, d_{t2}, \ldots, d_{t(Loc-1)}$ for respective code transmission periods (Loc×Tr), for example, with respect to the transmission periods of the chirp signals that are coded Doppler multiplexed and transmitted, and performs code multiplexing transmission.

It is thus possible for radar apparatus 10, for example, to perform the Doppler aliasing judgement by performing, on received signals (for example, the outputs of Doppler analyzer 210 for each code element of the code multiplexed signals), separation and reception of the coded Doppler multiplexed signal that is not used for the coded Doppler multiplexing transmission and to which the DCI (nuc, nud) is assigned. Cyclically setting transmission delays $d_{t1}, d_{t2}, \ldots, d_{t(Loc-1)}$, for example, for respective code transmission periods (Loc×Tr) makes it possible to extend, to ±1/Tr, the Doppler range in which detection is possible in the aliasing judgement processing.

Further, radar apparatus 10 performs the Doppler phase correction taking into consideration aliasing during code separation, for example, based on the aliasing judgement result. It is thus possible to use the Doppler frequency range of ±1/Tr in which detection is possible without ambiguity, so as to suppress mutual interference between coded Doppler multiplexed signals as low as a noise level. Accordingly, it is possible to perform the code multiplexing transmission of the MIMO radar while suppressing degradation of radar detection performance.

The foregoing description has been given of an example of the operation of coded Doppler demultiplexer 212.

In FIG. 1, direction estimator 213 performs direction estimation processing for estimation of the direction of a target using separated received signal $Y_z(f_{b\_cfar}, f_{s\_comp\_cfar}, D_{rmin}, \text{ncm}, \text{nfd})$ of the coded Doppler multiplexed signal to which DCI (ncm, nfd) is assigned and which is transmitted from transmission antenna Tx #[ncm, nfd]. Signal $Y_z(f_{b\_cfar}, f_{s\_comp\_cfar}, D_{rmin}, \text{ncm}, \text{nfd})$ is separated and received based on aliasing judgement result $D_{rmin}$ for distance index $f_{b\_cfar}$ and Doppler frequency index $f_{s\_comp\_cfar}$ inputted from coded Doppler demultiplexer 212 and.

For example, direction estimator 213 generates, based on the output of coded Doppler demultiplexer 212, virtual reception array correlation vector $h(f_{b\_cfar}, f_{s\_comp\_cfar})$ given by following Expression 56 and performs the direction estimation processing.

Virtual reception array correlation vector $h(f_{b\_cfar}, f_{s\_comp\_cfar})$ includes Nt×Na elements, the number of which is the product of number Nt of transmission antennas and number Na of reception antennas. Virtual reception array correlation vector $h(f_{b\_cfar}, f_{s\_comp\_cfar})$ is used in processing for performing, on reflected wave signals from a target, direction estimation based on phase differences between reception antennas 202. Here, $z=1, \ldots, \text{Na}$.

(Expression 56)

$$h(f_{b\_cfar}, f_{s\_comp\_cfar}) = \begin{bmatrix} Y_1(f_{b\_cfar}, f_{s\_comp\_cfar}, D_{rmin}, 1, 1) \\ Y_2(f_{b\_cfar}, f_{s\_comp\_cfar}, D_{rmin}, 1, 1) \\ \vdots \\ Y_{Na}(f_{b\_cfar}, f_{s\_comp\_cfar}, D_{rmin}, 1, 1) \\ \vdots \\ Y_1(f_{b\_cfar}, f_{s\_comp\_cfar}, D_{rmin}, N_{DOP\_CODE(1)}, 1) \\ Y_2(f_{b\_cfar}, f_{s\_comp\_cfar}, D_{rmin}, N_{DOP\_CODE(1)}, 1) \\ \vdots \\ Y_{Na}(f_{b\_cfar}, f_{s\_comp\_cfar}, D_{rmin}, N_{DOP\_CODE(1)}, 1) \\ \vdots \\ Y_1(f_{b\_cfar}, f_{s\_comp\_cfar}, D_{rmin}, 1, N_{DM}) \\ Y_2(f_{b\_cfar}, f_{s\_comp\_cfar}, D_{rmin}, 1, N_{DM}) \\ \vdots \\ Y_{Na}(f_{b\_cfar}, f_{s\_comp\_cfar}, D_{rmin}, 1, N_{DM}) \\ \vdots \\ Y_1(f_{b\_cfar}, f_{s\_comp\_cfar}, D_{rmin}, N_{DOP\_CODE(N_{DM})}, N_{DM}) \\ Y_2(f_{b\_cfar}, f_{s\_comp\_cfar}, D_{rmin}, N_{DOP\_CODE(N_{DM})}, N_{DM}) \\ \vdots \\ Y_{Na}(f_{b\_cfar}, f_{s\_comp\_cfar}, D_{rmin}, N_{DOP\_CODE(N_{DM})}, N_{DM}) \end{bmatrix} \quad [59]$$

For example, direction estimator 213 calculates a spatial profile, with azimuth direction θ in direction estimation evaluation function value $P_H(\theta, f_{b\_cfar}, f_{s\_comp\_cfar})$ being variable within a defined angular range. Direction estimator 213 extracts a predetermined number of local maximum peaks in the calculated spatial profile in descending order and outputs the azimuth directions of the local maximum peaks as direction-of-arrival estimation values (for example, positioning outputs).

Note that, there are various methods with direction estimation evaluation function value $P_H(\theta, f_{b\_cfar}, f_{s\_comp\_cfar})$ depending on direction-of-arrival estimation algorithms. For example, an estimation method using an array antenna, as disclosed in NPL 3, may be used.

For example, when Nt×Na virtual reception array antennas are linearly arranged at equal intervals $d_H$, a beamformer method can be given by following Expressions 57 and 58. In addition, a technique such as Capon or MUSIC is also applicable.

(Expression 57)

$$P_H(\theta_u, f_{b\_cfar}, f_{s\_comp\_cfar}) = |a^H(\theta_u) D_{cal} h(f_{b\_cfar}, f_{s\_comp\_cfar})|^2 \quad [60]$$

(Expression 58)

$$a(\theta_u) = \begin{bmatrix} 1 \\ \exp\{-j2\pi d_H \sin \theta_u/\lambda\} \\ \vdots \\ \exp\{-j2\pi(N_t N_a - 1)d_H \sin \theta_u/\lambda\} \end{bmatrix} \quad [61]$$

Here, in Expression 57, superscript H denotes the Hermitian transpose operator. Further, $a(\theta_u)$ denotes the direction vector of the virtual reception array relative to an incoming wave in azimuth direction $\theta_u$.

Azimuth direction $\theta_u$ is a vector that is changed at azimuth interval $\beta_1$ in an azimuth range over which direction-of-arrival estimation is performed. For example, $\theta_u$ is set as follows:

$\theta_u = \theta\min + u\beta_1, u = 0, \ldots, NU$ $NU = \text{floor}[(\theta\max - \theta\min)/\beta_1] + 1.$ Here, floor(x) is a function that returns the largest integer value not greater than real number x.

Further, in Expression 57, Dcal is an (Nt×Na)-th order matrix including an array correction coefficient for correcting phase deviations and amplitude deviations between the transmission array antennas and between the reception array antennas, and a coefficient for reducing the influence of coupling of elements between the antennas. If the coupling between antennas in the virtual reception array is negligible, Dcal is a diagonal matrix with diagonal components including an array correction coefficient for correcting phase deviations and amplitude deviations between the transmission array antennas and between the reception array antennas.

For example, direction estimator 213 may output, as positioning results, distance information based on distance index $f_{b\_cfar}$ and Doppler velocity information of the target based on the Doppler frequency judgement result for the target, together with the direction estimation result. Direction estimator 213 may output the positioning result, for example, to a vehicle control apparatus (not illustrated) when the radar apparatus is used as an in-vehicle radar, or to an infrastructure control apparatus (not illustrated) when the radar apparatus is used as an infrastructure radar.

Note that, the Doppler frequency information can be calculated in the extended range as given by following Expression 59 using $D_{min}$ that is the result of the Doppler aliasing judgement processing:

(Expression 59)

$$f_{out} = f_{s\_comp\_cfar} + \frac{D_{rmin}N_{code}}{N_{DM}}. \quad [62]$$

Further, the Doppler frequency information may be converted into the relative velocity component and then outputted. Following Expression 60 may be used to convert Doppler frequency index $f_{out}$ to relative velocity component $v_d(f_{out})$ using $D_{min}$ that is the result of the Doppler aliasing judgement for a target. Here, $\lambda$ is the wavelength of the carrier frequency of an RF signal outputted from a transmission radio (not illustrated). Further, $\Delta_f$ denotes the Doppler frequency interval in FFT processing performed in Doppler analyzer 210. For example, in the present embodiment, $\Delta_f = 1/\{N_{code} \times Loc \times Tr\}$.

(Expression 60)

$$v_d(f_{out}) = \frac{\lambda}{2} f_{out}\Delta_f \quad [63]$$

As described above, in the present embodiment, radar apparatus 10 applies phase rotation amounts corresponding to Doppler shift amounts and orthogonal code sequences to radar transmission signals to multiplex and transmit the radar transmission signals (in other words, coded Doppler multiplexed signals) from a plurality of transmission antennas 109. In the present embodiment, each of a plurality of transmission antennas 109 is associated with a combination of the Doppler shift amount ($DOP_{ndm}$) and the orthogonal code sequence ($DOP_{ncm}$) such that at least one of the Doppler shift amount ($DOP_{ndm}$) and the orthogonal code sequence ($DOP_{ncm}$) differs from combination to combination. In addition, in the present embodiment, the numbers of multiplexing of orthogonal code sequences corresponding respectively to the Doppler shift amounts (in other words, the numbers of codes) are different from one another. In other words, the numbers of coded Doppler multiplexing for the respective Doppler multiplexed transmission signals are set non-uniformly.

Radar apparatus 10 can judge, based on, for example, the received power of a code-separated signal for each coded Doppler multiplexed signal, transmission antenna 109 associated with the coded Doppler multiplexed signal (in other words, the combination of the Doppler shift amount and the orthogonal code sequence) and the presence or absence of Doppler aliasing. It is thus possible for radar apparatus 10 to appropriately judge a Doppler frequency of a target even in the presence of Doppler aliasing.

Further, radar apparatus 10 sets the transmission delays respectively for the transmission periods of a radar transmission signal, for example. By setting each of the transmission delays, a phase correction value (e.g., $\beta$) for each $D_r$ applies a different phase rotation of up to $2\pi$, for example, in the range of $D_r$ (e.g., from $-1/(Tr)$ to less than $1/(Tr)$). Accordingly, it is possible for radar apparatus 10 to perform aliasing judgement in the range of $D_r$.

Thus, according to the present embodiment, radar apparatus 10 can extend the effective Doppler frequency bandwidth to 2/Tr to extend the detection range for detecting a Doppler frequency (relative velocity) without ambiguity. Accordingly, radar apparatus 10 can improve the target-object sensing accuracy over a wider Doppler frequency range.

Further, in the present embodiment, the coded Doppler multiplexing, which is performed using both Doppler multiplexing and coding, can reduce the number of Doppler multiplexing as compared with a case where the Doppler multiplexing is used without the coding in multiplexing transmission. It is thus possible to increase the intervals of phase rotation amounts for applying Doppler shifts, so as to relieve the accuracy requirements (phase modulation accuracy) for the phase shifters, for example, and achieve the cost reduction effect of an RF section, including reduction of the man-hours required for adjustment of the phase shifters.

Further, in the present embodiment, since coded Doppler multiplexing is performed using both Doppler multiplexing and coding, radar apparatus 10 performs, for each code element, Fourier frequency analysis (FFT processing) for Doppler frequency detection (relative velocity detection). Accordingly, for example, in comparison to the Fourier frequency analysis (FFT processing) for the Doppler frequency detection (relative velocity detection) using the Doppler multiplexing without the coding in multiplexing transmission, the FFT size is (1/code length) and the number of times of FFT processing is increased by (code length) times. For example, when the amount of FFT operation for FFT size Nc is roughly estimated to be Nc×log₂(Nc), the coded Doppler multiplexing according to the present embodiment has an operation amount ratio of about {Loc× Nc/Loc×log₂(Nc/Loc)}/{Nc×log₂(Nc)}=1−log₂(Loc)/log₂ (Nc) relative to the FFT operation with Doppler multiplexing without the coding. For example, in a case where Loc=2 and Nc=1024, the operation amount ratio is 0.9. The operation reduction effect on FFT processing can be achieved, and the effect of simplification of the circuit configuration and cost reduction can also be achieved.

Variation 1 of Embodiment 1

Phase rotation amount $\varphi_{ndm}$ for applying Doppler shift amount $DOP_{ndm}$ is not limited to, for example, the value given in Expression 5 and the like. For example, phase rotation amount $\varphi_{ndm}$ may be a value given by following Expression 61. Here, round(x) represents the round function that outputs a rounded integer value for real number x. Note that, the term "round($N_{code}/N_{DM}$)" is introduced so that the phase rotation amount is an integer multiple of the Doppler frequency interval in Doppler analyzer 210. In addition, in Expression 61, the angle is expressed in radian. Here, z=1, . . . , Na.

(Expression 61)

$$\phi_{ndm} = \frac{2\pi}{N_{code}} \text{round}\left(\frac{N_{code}}{N_{DM}}\right)(ndm - 1) \quad [64]$$

Variation 2 of Embodiment 1

In Embodiment 1, transmission delays $d_{t1}, d_{t2}, \ldots, d_{t(Loc-1)}$ are set respectively for transmission periods Tr. Accordingly, the effect of extending the Doppler detection range to 2/Tr can be obtained. Here, the longer the set transmission delays, the longer a no-signal time section in which no radar transmission wave is transmitted. In such a case, in the no-signal time section, the radar apparatus may, for example, transmit another radar transmission wave (hereinafter referred to as a "variant radar transmission wave") for detection in a different sensing range.

Figure 15:
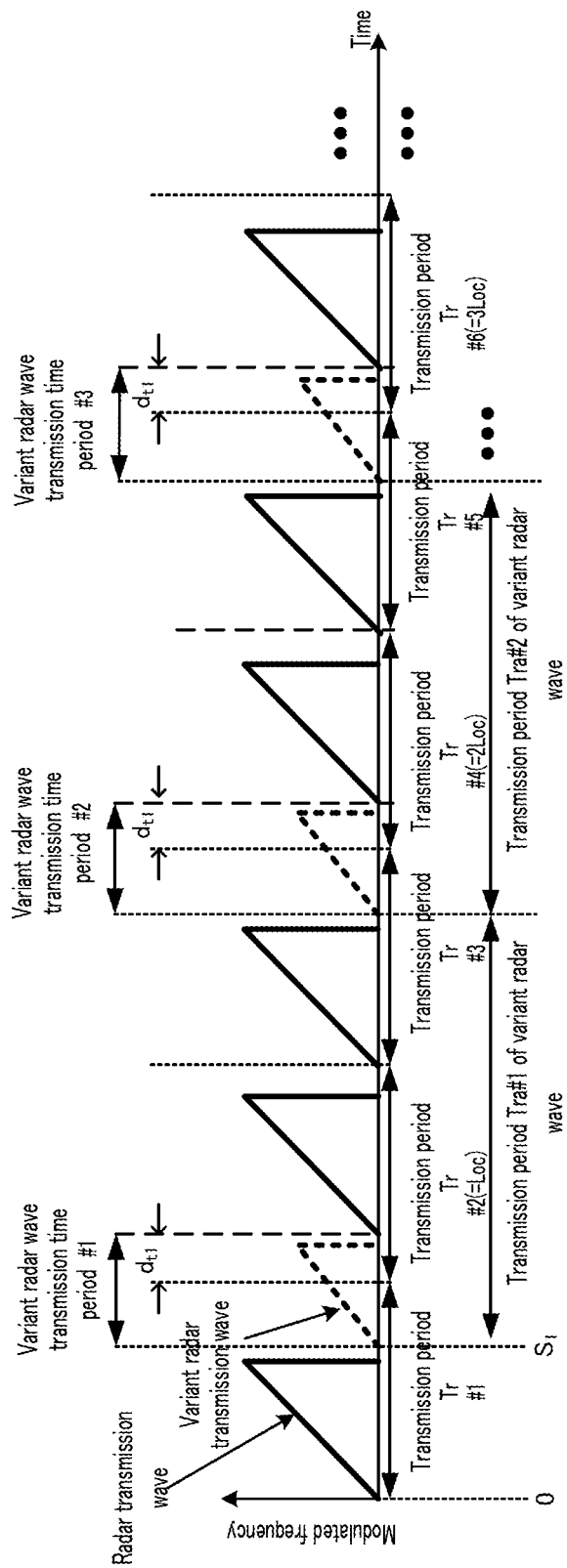
FIG. 15 illustrates an example of transmission signals in a case where the chirp pulse is used.

FIG. 15 illustrates an example of radar transmission signals (for example, radar transmission waves) outputted from radar apparatus 10a according to Variation 2.

For example, while periodically transmitting the radar transmission waves to which Embodiment 1 is applied, radar apparatus 10a may transmit the variant radar transmission wave during a time section for which at least one transmission delay (for example, in FIG. 15, transmission delay $d_{t1}$) is set among time sections for which transmission delays $d_{t1}, d_{t2}, \ldots, d_{t(Loc-1)}$ are set.

Alternatively, radar apparatus 10a may transmit the same variant radar transmission waves respectively during the time sections (e.g., transmission delays $d_{t1}$ and $d_{t2}$) for which a plurality of transmission delays are set among the time sections for which transmission delays $d_{t1}, d_{t2}, \ldots, d_{t(Loc-1)}$ are set. For example, radar apparatus 10a may transmit the same variant radar transmission waves respectively during the time sections for which transmission delay $d_{t1}$ and transmission delay $d_{t2}$ are set.

Alternatively, radar apparatus 10a may transmit different variant radar transmission waves respectively during the time sections (e.g., transmission delays $d_{t1}$ and $d_{t2}$) for which a plurality of transmission delays are set among the time sections for which transmission delays $d_{t1}, d_{t2}, \ldots, d_{t(Loc-1)}$ are set. For example, radar apparatus 10a may transmit variant radar transmission wave A during the time section for which transmission delay $d_{t1}$ is set, and may transmit variant radar transmission wave B during the time section for which transmission delay $d_{t2}$ is set.

Here, when a chirp signal is used for the radar transmission wave according to Embodiment 1, a chirp signal different from the chirp signal being the radar transmission wave according to Embodiment 1 (e.g., a chirp signal different in at least one of the frequency modulation bandwidth, the sweep time, and the frequency modulation change rate) may be used as the variant radar transmission wave.

For example, FIG. 15 illustrates a case where the chirp signal is used as the radar transmission wave described in Embodiment 1, the transmission periods are transmission periods Tr, Loc is 2, and a chirp signal is used as the variant radar transmission wave transmitted in a no-signal time section including a time section for which transmission delay $d_{t1}$ is set. As illustrated in FIG. 15, when Loc=2, radar apparatus 10a may start transmitting the variant radar transmission wave after the elapse of time t0 after transmission of the radar transmission wave started at a transmission start time of first transmission period Tr, and may periodically transmit the variant radar transmission wave in transmission periods Tra=2Tr (=Loc×Tr).

Note that, when Loc>2, radar apparatus 10a may transmit the variant radar transmission wave or a plurality of variant radar transmission waves using all or a part of the no-signal time sections including the time sections for which transmission delays $d_{t1}, d_{t2}, \ldots, d_{t(Loc-1)}$ are set.

Further, for example, when Loc=3, radar apparatus 10a may transmit the same variant radar transmission wave using all transmission delays $d_{t1}$ and $d_{t2}$ among the no-signal time sections including the time sections for which transmission delays $d_{t1}$ and $d_{t2}$ are set. Alternatively, radar apparatus 10a may transmit a plurality of variant radar transmission waves A and B using all transmission delays $d_{t1}$ and do. Alternatively, radar apparatus 10a may transmit the variant radar transmission wave using a part of the transmission delays (transmission delay $d_{t1}$ or $d_{t2}$).

Note that, the variant radar transmission wave is not limited to the chirp signal, and may be an unmodulated continuous wave (CW), a pulse signal, a coded pulse signal, or a transmission wave different from the radar transmission wave according to Embodiment 1.

Figure 16:
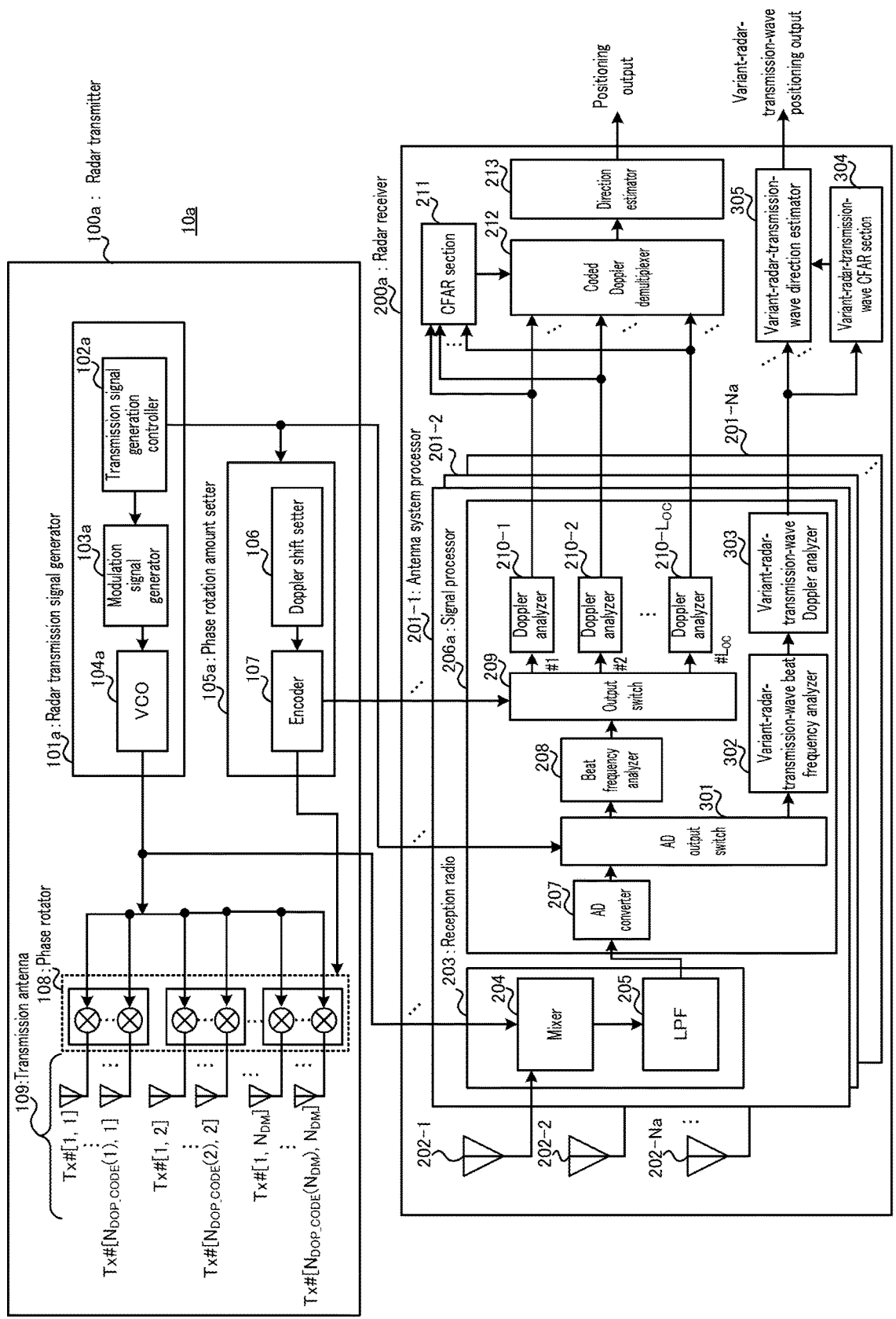
FIG. 16 is a block diagram illustrating an example of a configuration of a radar apparatus.

FIG. 16 is a block diagram illustrating an example configuration of radar apparatus 10a according to Variation 2. Radar apparatus 10a not only transmits, for example, the radar transmission wave described in Embodiment 1 (e.g., corresponding to a first transmission signal), but also transmits a variant radar transmission wave (e.g., corresponding to a second transmission signal). For example, radar apparatus 10a may transmit the variant radar transmission wave in a no-signal time section (e.g., a no-transmission time section) spanning between the transmissions of the radar transmission waves, the no-signal time section including a time section for which a transmission delay is set. Note that, in FIG. 16, a configuration in which a chirp signal is used as the variant radar transmission wave is described, but the configuration is not limited thereto.

Hereinafter, an operation different from the operation of radar apparatus 10 according to Embodiment 1 will be mainly described.

In addition to the radar transmission wave generation operation described in Embodiment 1, radar transmission signal generator 101a in radar transmitter 100a generates the variant radar transmission wave in at least a part of the no-signal time section including the time section for which the transmission delay is set.

For example, when the variant radar transmission wave is generated in the no-signal time section including the time section for which transmission delay $d_{tX}$ is set (where X=1, . . . , Loc−1), transmission signal generation controller 102a not only performs the operation described in Embodiment 1 but also determines predetermined time Sx as a modulation signal generation start timing for the variant radar transmission wave. Predetermined time Sx is in the no-signal time section including the time section for which transmission delay $d_{tX}$ is set. Transmission delay $d_{tX}$ is a transmission delay after the X-th transmission of the radar transmission wave described in Embodiment 1 that is started at the transmission start time of X-th transmission period Tr. Transmission signal generation controller 102a outputs, to modulation signal generator 103a, a signal for controlling modulation signal generator 103a (information on the determined modulation signal generation start timing for the variant radar transmission wave).

Further, transmission signal generation controller 102a may output the signal for controlling the modulation signal generation timing for the variant radar transmission wave to modulation signal generator 103a in each transmission period Tra (=Loc×Tr) of the variant radar transmission wave based on time Sx.

In addition, transmission signal generation controller 102a sets, as the transmission period of the variant radar transmission wave, a period from the start timing of transmission period Tra (=Loc×Tr) of the variant radar transmission wave to the end timing of the no-signal period including the time period for which transmission delay $d_{tX}$ is set, and outputs information on the set transmission period to phase rotation amount setter 105a and radar receiver 200a (for example, AD output switch 301).

In the case where a plurality of variant radar transmission waves are generated, transmission signal generation controller 102a similarly outputs, for each of the variant radar transmission waves, the information on the modulation signal generation start timing and the modulation signal generation timing for the variant radar transmission wave to modulation signal generator 103a, and outputs the transmission period of the variant radar transmission waves to phase rotation amount setter 105a and radar receiver 200a.

For example, when Loc=2 and the variant radar transmission wave is generated in the no-signal time section including the time section for which transmission delay $d_{t1}$ is set, transmission signal generation controller 102a determines predetermined time $S_1$ as the modulation signal generation start timing for the variant radar transmission wave. Predetermined time $S_1$ is in the no-signal time section that succeeds the first transmission of the radar transmission wave described in Embodiment 1 starting at the transmission start time of first transmission period Tr and that includes the time section for which transmission delay $d_{t1}$ is set as illustrated in FIG. 15. Transmission signal generation controller 102a then outputs a signal for controlling modulation signal generator 103a. Further, transmission signal generation controller 102a determines the transmission period of the variant radar transmission wave. The transmission period spans from the start timing of transmission period Tra (=Loc×Tr) of the variant radar transmission wave to the end timing of the no-signal time section including the time section for which transmission delay $d_{t1}$ is set. Transmission signal generation controller 102a outputs the information on the determined transmission period to phase rotation amount setter 105a and radar receiver 200a.

Modulation signal generator 103a not only performs the operation described in Embodiment 1 but also generates a modulation signal for generating a predetermined chirp signal, for example, as illustrated in FIG. 15, based on the control signal inputted from transmission signal generation controller 102a (for example, the information on the modulation signal generation start timing for the variant radar transmission wave and the generation timing for the variant radar transmission wave).

Note that, the variant radar transmission wave may be, for example, a chirp signal in which at least one of the frequency modulation bandwidth, the sweep time, and the frequency modulation change rate is different from that of the radar transmission wave described in Embodiment 1. In addition, when a plurality of variant radar transmission waves are generated, modulation signal generator 103a may generate the modulation signal for generating a predetermined chirp signal based on the modulation signal generation start timing for each of the variant radar transmission waves and the generation timing for the variant radar transmission wave.

VCO 104a outputs frequency-modulated signals of the radar transmission wave described in Embodiment 1 and of the variant radar transmission wave (hereinafter, for example, referred to as "frequency chirp signals" or "chirp signals") to phase rotators 108 and radar receiver 200a based on the modulation signal outputted from modulation signal generator 103a.

Phase rotation amount setter 105a not only performs the operation described in Embodiment 1 but also changes a setting of a phase rotation amount for transmitting the variant radar transmission wave based on the control information indicating the transmission period of the variant radar transmission wave outputted from transmission signal generation controller 102a. For example, in the case of the transmission period of the variant radar transmission wave, phase rotation amount setter 105a may set a phase rotation amount different from a phase rotation amount for transmission of the radar transmission wave described in Embodiment 1 in order to transmit the variant radar transmission wave. For example, the setting of the phase rotation amount for transmitting the variant radar transmission wave may be a constant phase rotation amount for directing the directivity of the transmission antennas in a specific direction, and a plurality (e.g., all) of phase rotation amounts may be set to the same phase rotation. When a plurality (e.g., all) of phase rotation amounts are set to the same phase rotation, a plurality of transmission antennas 109 operate as sub-array antenna elements of a single transmission antenna, and thus are considered as a single antenna transmission rather than a MIMO transmission.

Alternatively, phase rotation amount setter 105a may set a phase rotation amount for applying coding for code multiplexing to a plurality of transmission antennas 109, or may set a phase rotation amount for applying a Doppler shift for Doppler multiplexing. Further, phase rotation amount setter 105a may set a phase rotation amount for performing multiplexing by code multiplexing and Doppler multiplexing in combination.

Note that, in radar apparatus 10a, for example, a transmission antenna controller (not illustrated) may be provided in radar transmitter 100a. The transmission antenna controller may control transmission antennas 109 during the transmission period of the variant radar transmission wave based on, for example, the control information indicating the transmission period of the variant radar transmission wave outputted from transmission signal generation controller 102a. For example, the transmission antenna controller may transmit a radar wave by controlling transmission antennas 109 individually to switch the directivity directions and directivity gains of transmission antennas 109 during the transmission period of the variant radar transmission wave to a different variant radar transmission wave.

Further, the transmission antenna controller may change the number of transmission antennas used for transmission of the variant radar transmission wave, for example, in the transmission period of the variant radar transmission wave. For example, the transmission antenna controller may use one transmission antenna 109 without using MIMO transmission when transmitting the variant radar transmission wave.

As is understood, not only the effect of the operation according to Embodiment 1 is achieved, but also the transmission of the variant radar transmission wave in the no-signal time section of the radar transmission wave makes it possible for radar transmitter 100a to perform detection in a different sensing range by using the variant radar transmission wave, or to perform detection in a different distance range and/or Doppler range.

Next, an operation example of radar receiver 200a will be described mainly with respect to a portion of the operation different from that in Embodiment 1.

Note that, by way of example, FIG. 16 illustrates a configuration example of reception processing performed when a phase rotation amount for transmitting the variant radar transmission wave is set to a constant phase rotation amount for directing the directivity of the transmission antennas in a specific direction. The operation of such a configuration will be described. Therefore, in this case, a plurality of transmission antennas 109 operate as sub-array antenna elements of a single transmission antenna, to implement the single antenna transmission rather than the MIMO transmission. In this case, radar receiver 200a may omit to perform the demultiplexing processing on multiplexed signals to be performed at the time of MIMO transmission.

The operation of reception radio 203 is the same as that of Embodiment 1. Note that, based on the control information (not illustrated) from transmission signal generation controller 102a indicating the transmission period of the variant radar transmission wave, LPF 205 in reception radio 203 may change LPF characteristics (for example, a cutoff frequency or passband characteristics) in the transmission period of the variant radar transmission wave to LPF characteristics suitable for the characteristics of a beat signal obtained from a chirp signal of the variant radar transmission wave.

Signal processor 206a in radar receiver 200a differs from that of Embodiment 1 in that signal processor 206a includes, for example, AD output switch 301 that switches an output destination of an output of AD converter 207, variant-radar-transmission-wave beat frequency analyzer 302 that performs beat frequency analysis on the variant radar transmission wave, and variant-radar-transmission-wave Doppler analyzer 303 that analyzes the Doppler frequency of the variant radar transmission wave. Hereinafter, the part different from Embodiment 1 will be described.

AD output switch 301 switches the output destination of AD converter 207 between beat frequency analyzer 208 and variant-radar-transmission-wave beat frequency analyzer 302 based on the control information indicating the transmission period of the variant radar transmission wave inputted from transmission signal generation controller 102a. For example, in the case of a transmission period different from the transmission period of the variant radar transmission wave, AD output switch 301 outputs the output from AD converter 207 to beat frequency analyzer 208, and radar receiver 200a performs the same operation as in Embodiment 1. On the other hand, in the case of the transmission period of the variant radar transmission wave, AD output switch 301 outputs the output from AD converter 207 to variant-radar-transmission-wave beat frequency analyzer 302.

Variant-radar-transmission-wave beat frequency analyzer 302 performs, in each transmission period Tra, FFT processing on $N_{dataA}$ pieces of discretely sampled data obtained in a defined time range (range gate). Accordingly, in signal processor 206a, variant-radar-transmission-wave beat frequency response $RFTA_z(f_{bA}, \text{floor}((m-1)/Loc)+1)$ in which a peak appears at a beat frequency dependent on the delay time of the reflected wave signal (radar reflected wave) of the variant radar transmission wave. For example, $f_{bA}=0, \ldots, N_{dataA}/2-1, z=1, \ldots, Na$, and $m=1, \ldots, Nc$.

In addition, beat frequency index $f_{bA}$ of the variant radar transmission wave can be converted to distance information $RA(f_{bA})$ using following Expression 62. Thus, in the following description, beat frequency index $f_{bA}$ of the variant radar transmission wave is referred to as "distance index $f_{bA}$ of the variant radar transmission wave."

(Expression 62)

$$RA(f_{bA}) = \frac{C_o}{2B_{wA}} f_{bA} \qquad [65]$$

Here, $B_{wA}$ represents the frequency modulation bandwidth in the range gate for the chirp signal transmitted as the variant radar transmission wave and $C_0$ represents the speed of light. For example, by using frequency modulation bandwidth $B_{wA}$ of the variant radar transmission wave different from frequency modulation bandwidth $B_w$ of the radar transmission wave described in Embodiment 1, radar apparatus 10a can detect a target using the variant radar transmission wave with a distance resolution different from that of the radar transmission wave described in Embodiment 1. Further, radar apparatus 10a is capable of detection in up to distance range RA ($N_{dataA}/2-1$).

Variant-radar-transmission-wave Doppler analyzer 303 performs Doppler analysis for each distance index $f_{bA}$ using the output data of variant-radar-transmission-wave beat frequency analyzer 302 (for example, variant-radar-transmission-wave beat frequency response $RFTA_z(f_{bA}, \text{floor}((m-1)/Loc)+1)$ outputted from variant-radar-transmission-wave beat frequency analyzer 302) for Ncode transmission periods of the variant radar transmission waves among Nc transmission periods, and outputs variant-radar-transmission-wave Doppler analysis result $VFTA_z(f_{bA}, f_{sA})$. Here, the Doppler frequency interval of variant-radar-transmission-wave Doppler frequency indices $f_{sA}$ is $1/(Ncode \times Loc \times Tr)$, and the range of variant-radar-transmission-wave Doppler frequency indices $f_{sA}$ is $f_{sA}=-Ncode/2, \ldots, 0, \ldots, Ncode/2-1$.

Variant-radar-transmission-wave CFAR section 304 performs, for example, power addition of output $VFTA_z(f_{bA}, f_{sA})$ of variant-radar-transmission-wave Doppler analyzer 303 of each antenna system processor 201 for variant-radar-transmission-wave distance index $f_{bA}$ and variant-radar-transmission-wave Doppler frequency index $f_{sA}$, so as to perform two-dimensional CFAR processing in two dimensions formed by the distance axis and the Doppler frequency axis (corresponding to the relative velocity) or CFAR processing using one-dimensional CFAR processing in combination. Here, $z=1, \ldots, Na$. For example, processing disclosed in NPL 2 may be applied as the two-dimensional CFAR processing or the CFAR processing using one-dimensional CFAR processing in combination.

Variant-radar-transmission-wave direction estimator 305 performs direction estimation processing for estimation of the direction of a target using output data $VFTA_z(f_{bA\_cfar}, f_{sA\_cfar})$ of variant-radar-transmission-wave Doppler analyzer 303 for variant-radar-transmission-wave distance index $f_{bA\_cfar}$ and variant-radar-transmission-wave Doppler frequency index $f_{sA\_cfar}$ inputted from variant-radar-transmission-wave CFAR section 304. Variant-radar-transmission-wave direction estimator 305 outputs a direction estimation result (positioning result) as a variant-radar-transmission-wave positioning output.

Note that, variant-radar-transmission-wave direction estimator 305 may output, as the variant-radar-transmission-wave positioning output, distance information that is based on variant-radar-transmission-wave distance index $f_{bA\_cfar}$ and Doppler velocity information of the target that is based on variant-radar-transmission-wave Doppler frequency index $f_{sA\_cfar}$. The distance information and the Doppler velocity information may be outputted together with the direction estimation result, for example.

As is understood, in radar apparatus 10a in Variation 2, radar transmitter 100a transmits the variant radar transmission wave in addition to the radar transmission wave described in Embodiment 1, and radar receiver 200a performs the positioning processing on the variant radar transmission wave in addition to the positioning processing using the radar transmission wave.

Thus, in Variation 2, it is possible to not only achieve the effect according to Embodiment 1, but also to perform detection in a different sensing range, and detection in a different distance range or Doppler range by the use of the variant radar transmission wave. Further, radar apparatus 10a transmits the variant radar transmission wave in the no-transmission time section in which the radar transmission wave described in Embodiment 1 is not transmitted. It is thus possible to obtain the above-described effect without increasing the positioning time.

Note that radar transmitter 100a may perform MIMO multiplexing transmission of the variant radar transmission wave using a plurality of transmission antennas 109. In such a case, radar transmitter 100a may set a phase rotation amount for multiplexing transmission performed by either code multiplexing or Doppler multiplexing, or by code multiplexing and Doppler multiplexing in combination. Further, in radar receiver 200a, a multiplexed signal separator (not illustrated) may be provided on the downstream or upstream side of variant-radar-transmission-wave Doppler analyzer 303, and the multiplexed signal separator may perform the direction estimation processing. For example, an existing method may be applied to the processing performed by the multiplexed signal separator and the direction estimation processor, and a detailed description thereof is omitted.

Variation 3 of Embodiment 1

In Embodiment 1, one radar transmission wave is transmitted and transmission delays $d_{t1}, d_{t2}, \ldots, d_{t(Loc-1)}$ are set for each transmission period Tr. Accordingly, the effect of extending the Doppler detection range to 2/Tr can be obtained. Here, the number of radar transmission waves transmitted in each transmission period Tr is not limited to one, and a plurality of radar transmission waves may be transmitted, and transmission delays $d_{t1}, d_{t2}, \ldots, d_{t(Loc-1)}$ may be set for each transmission period Tr. In this case, for a plurality of radar transmission waves, the effect of extending the Doppler detection range to 2/Tr can be obtained.

Figure 17:
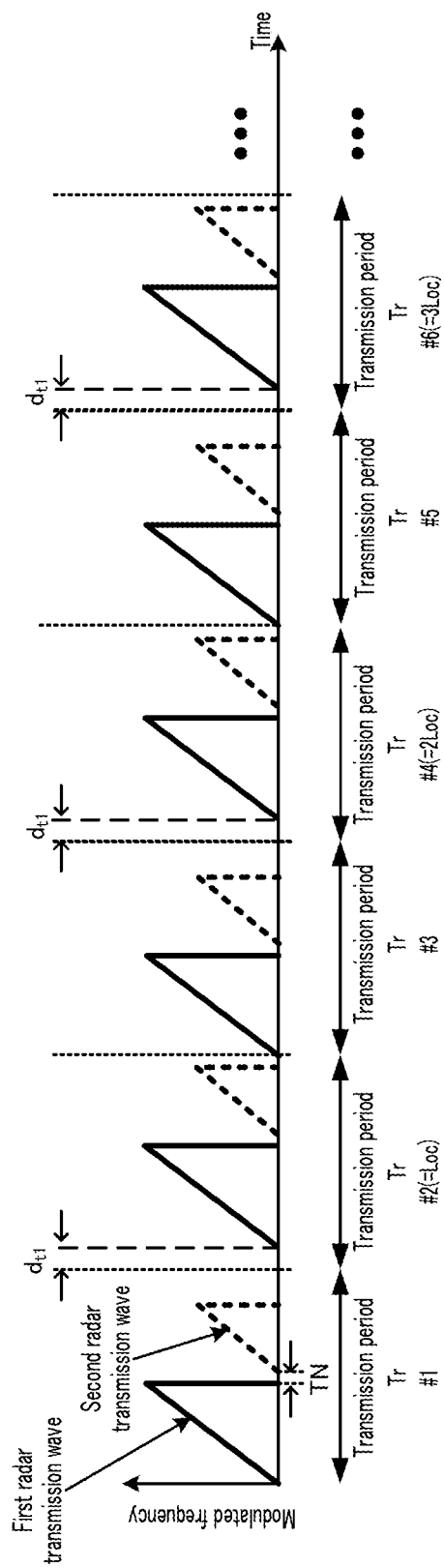
FIG. 17 illustrates an example of transmission signals in a case where the chirp pulse is used.

FIG. 17 illustrates an example of radar transmission signals (for example, radar transmission waves) outputted from radar apparatus 10b according to Variation 3.

FIG. 17 illustrates an example of the radar transmission signals in a case where radar apparatus 10b transmits not only the radar transmission waves (hereinafter, referred to as "first radar transmission waves") described in Embodiment 1 (for example, in the case of Loc=2) but also "second radar transmission waves" for detection in a different sensing range during transmission period Tr.

Each of the second radar transmission waves (e.g., corresponding to the second transmission signal) may be, for example, a radar transmission wave generated by the operation described in Embodiment 1 like the first radar transmission wave (e.g., corresponding to the first transmission signal). For example, the second radar transmission wave may use the same number of code multiplexing and the same number of Doppler multiplexing as those for the first radar transmission wave. Further, a chirp signal of the second radar transmission wave may be, for example, a chirp signal in which at least one of the frequency modulation bandwidth, the sweep time, and the frequency modulation change rate is different from that of the first radar transmission wave.

For example, radar apparatus 10b may set a wider frequency modulation bandwidth for the chirp signal of the first radar transmission wave as compared to the chirp signal of the second radar transmission wave in order to perform detection in a relatively short range with a high distance resolution as illustrated in FIG. 17. In other words, for example, radar apparatus 10b may set a narrower frequency modulation bandwidth for the chirp signal of the second radar transmission wave as compared to the chirp signal of the first radar transmission wave in order to perform detection in a relatively long range with a coarse distance resolution as illustrated in FIG. 17. In this case, it is possible to obtain not only the effect of Embodiment 1 but also the effect of detectability in different sensing ranges with different distance resolutions.

Further, since a plurality of radar transmission waves are transmitted in each transmission period Tr, one transmission delay $d_{t1}$ is set per Loc×Tr periods. Thus, the transmission delay is valid for both of the first and the second radar transmission waves. It is thus possible to obtain the effect of extending the Doppler detection range of detection by each of the radar transmission waves to 2/Tr.

Figure 18:
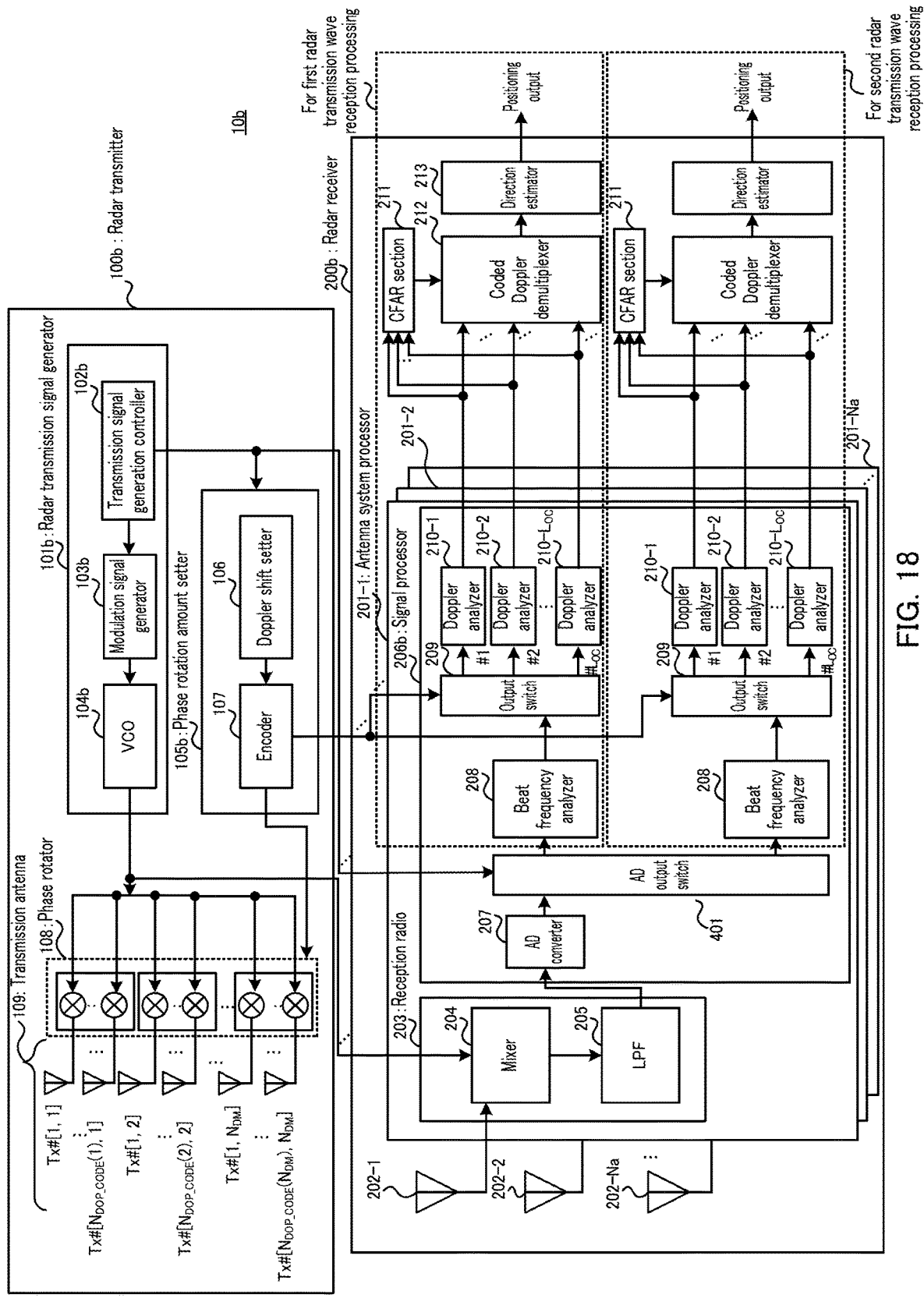
FIG. 18 is a block diagram illustrating an example of a configuration of a radar apparatus.

FIG. 18 is a block diagram illustrating an example configuration of radar apparatus 10b according to Variation 3. For example, radar apparatus 10b transmits not only the first radar transmission wave described in Embodiment 1 but also the second radar transmission wave for detection in a detection range different from that of the first radar transmission wave during transmission period Tr.

Hereinafter, an operation different from the operation of radar apparatus 10 according to Embodiment 1 will be mainly described.

Radar transmission signal generator 101b in radar transmitter 100b generates a plurality of radar transmission waves described in Embodiment 1. For example, radar transmission signal generator 101b performs an operation of generating the second radar transmission wave after predetermined time TN elapses after the generation of the first radar transmission wave for each transmission period Tr.

Transmission signal generation controller 102b not only performs the operation of Embodiment 1 but also controls, for each of a plurality of radar transmission waves, the generation timing for generation of a modulation signal by modulation signal generator 103b with respect to a reference timing for each transmission period Tr. For example, transmission signal generation controller 102b controls the generation timing for the first radar transmission wave and controls the generation timing for the second radar transmission wave. Further, transmission signal generation controller 102b may control the generation timing for the second radar transmission wave after predetermined time TN elapses after the end of the generation timing for the first radar transmission wave.

Further, transmission signal generation controller 102b outputs a first radar transmission wave generation timing signal relevant to the generation timing for the first radar transmission wave and a second radar transmission wave generation timing signal relevant to the generation timing for the second radar transmission wave to phase rotation amount setter 105b and radar receiver 200b (e.g., AD output switch 401).

Modulation signal generator 103b generates a modulation signal for generating the first chirp signal for the first radar transmission wave, and generates a modulation signal for generating the second chirp signal for the second radar transmission wave, for example, as illustrated in FIG. 17, based on the first radar transmission wave generation timing and the second radar transmission wave generation timing from transmission signal generation controller 102b. For example, modulation signal generator 103b may generate, as the second chirp signal, a chirp signal in which at least one of the frequency modulation bandwidth, the sweep time, and the frequency modulation change rate is different from that of the first chirp signal.

VCO 104b outputs the chirp signals of the first and the second radar transmission waves to phase rotators 108 and radar receiver 200b (e.g., mixer 204) based on the modulation signals outputted from modulation signal generator 103b.

Phase rotation amount setter 105b sets the phase rotation amounts for transmitting the first and the second radar transmission waves based on the first radar transmission wave generation timing signal and the second radar transmission wave generation timing signal from transmission signal generation controller 102b. For example, phase rotation amount setter 105b sets the phase rotation amount for transmission of the radar transmission wave described in Embodiment 1 at the first radar transmission wave generation timing in order to transmit the first radar transmission wave. Likewise, phase rotation amount setter 105b sets the phase rotation amount for transmission of the radar transmission wave described in Embodiment 1 at the second radar transmission wave generation timing in order to transmit the second radar transmission wave.

For example, the setting of the phase rotation amount for transmitting the second radar transmission wave may be the same as the setting of the phase rotation amount for transmitting the first radar transmission wave. In this case, since the settings of the phase rotation amounts are the same between the first radar transmission wave and the second radar transmission wave, a region for storing the settings of the phase rotation amounts can be reduced, and in addition, no switching operation between the settings is required.

Further, for example, the setting of the phase rotation amount for transmitting the second radar transmission wave may be different from the setting of the phase rotation amount for transmitting the first radar transmission wave. In this case, in the setting of the second radar transmission wave, the number of code multiplexing and the number of Doppler multiplexing may, for example, be set to the same as the setting of the first radar transmission wave, and the assignment of Doppler shift amount $DOP_{ndm}$ and orthogonal code sequence $Code_{ncm}$ may be changed among a plurality of transmission antennas 109.

Note that, in radar apparatus 10b, for example, a transmission antenna controller (not illustrated) may be provided in radar transmitter 100b. The transmission antenna controller may control transmission antennas 109, for example, based on the first radar transmission wave generation timing and the second radar transmission wave generation timing from transmission signal generation controller 102b. For example, at the second radar transmission wave generation timing, the transmission antenna controller may control transmission antennas 109 so as to perform switching to select, as a transmission antenna for transmission of the second radar transmission wave, a transmission antenna having a direction of directivity or a directivity gain different from that of a transmission antenna for transmission of the first radar transmission wave, and may then transmit the second radar transmission wave.

As is understood, by transmitting the second radar transmission wave in addition to the first radar transmission wave within transmission period Tr, radar transmitter 100b can not only obtain the effect of the operation according to Embodiment 1 but also perform detection in different sensing ranges or in different distance ranges and with different distance resolutions by using the second radar transmission wave.

Next, an operation example of radar receiver 200b will be described mainly with respect to a portion different from Embodiment 1.

The operation of reception radio 203 is the same as that of Embodiment 1. Note that, LPF 205 in reception radio 203 may change LPF characteristics (for example, a cutoff frequency or passband characteristics) to LPF characteristics suitable for the characteristics of a beat signal obtained from a chirp signal of each radar transmission wave based on information (not illustrated) on the first radar transmission wave generation timing and the second radar transmission wave generation timing from transmission signal generation controller 102b. For example, LPF 205 may set the LPF characteristics suitable for the characteristics of the beat signal obtained from the chirp signal of the first radar transmission wave based on the first radar transmission wave generation timing, and may set the LPF characteristics suitable for the characteristics of the beat signal obtained from the chirp signal of the second radar transmission wave based on the second radar transmission wave generation timing.

Signal processor 206b in radar receiver 200b is different from that in Embodiment 1, for example, in that signal processor 206b includes AD output switch 401 that switches the output destination of AD converter 207.

Further, regarding beat frequency analyzers 208, output switches 209, Doppler analyzers 210, CFAR sections 211, coded Doppler demultiplexers 212, direction estimators 213, and the positioning outputs, reception processing on the first radar transmission wave and reception processing on the second transmission wave may be performed in parallel in radar receiver 200b. Since the operations are the same as those described in Embodiment 1, description of such operations will be omitted.

Note that, in the configuration example illustrated in FIG. 18, beat frequency analyzers 208, output switches 209, Doppler analyzers 210, CFAR sections 211, coded Doppler demultiplexers 212, direction estimators 213, and the positioning outputs are respectively provided for the reception processing on the first radar transmission wave and the reception processing on the second radar transmission wave, and the reception processing is performed in parallel. However, the configuration is not limited thereto. For example, regarding beat frequency analyzers 208, output switches 209, Doppler analyzers 210, CFAR sections 211, coded Doppler demultiplexers 212, direction estimators 213, and the positioning outputs, the reception processing on the first radar transmission wave and the reception processing on the second radar transmission wave may be performed in time division. Also in this case, the same effect can be obtained as in the case of parallel processing. In other words, these constituent sections may be provided individually for a plurality of radar transmission waves or may be shared between a plurality of radar transmission waves.

AD output switch 401 switches the output destination of AD converter 207 between first beat frequency analyzer 208 (e.g., for the first radar transmission wave reception processing) and second beat frequency analyzer 208 (e.g., for the second radar transmission wave reception processing) based on the information on the first radar transmission wave generation timing and the second radar transmission wave generation timing inputted from transmission signal generation controller 102b. For example, in the case of the first radar transmission wave generation timing, AD output switch 401 outputs the output from AD converter 207 to first beat frequency analyzer 208, and radar receiver 200b performs the same operation as in Embodiment 1 thereafter. On the other hand, in the case of the second radar transmission wave generation timing, AD output switch 401 outputs the output from AD converter 207 to the second beat frequency analyzer, and radar receiver 200b performs the same operation as in Embodiment 1 thereafter.

As described above, radar apparatus 10b in Variation 3 transmits the second radar transmission wave in addition to the first radar transmission wave in radar transmitter 100b, and performs positioning processing using the first and the second radar transmission waves in radar receiver 200b.

Thus, in Variation 3, it is possible to not only achieve the effect according to Embodiment 1, but also to perform detection in different sensing ranges, and detection in different distance ranges or with distance resolutions by the use of the second radar transmission wave.

Further, since radar apparatus 10b transmits a plurality of radar transmission waves in each transmission period Tr, the setting of a transmission delay is valid for a plurality of radar transmission waves for each transmission period Tr. Thus, the effect of extending the Doppler detection range of each of a plurality of radar transmission waves for each transmission period Tr to 2/Tr can be obtained. Further, since the setting of the transmission delay may be omitted to be provided for each of a plurality of radar transmission waves, the transmission time can be reduced.

Variation 4 of Embodiment 1

Embodiment 1 has been described in relation to a case where the radar transmission waves periodically generated in the radar apparatus are the same chirp signals, but the periodically generated radar transmission waves are not limited thereto. For example, the radar apparatus may perform the coded Doppler multiplexing transmission using a plurality of types of chirp signals in which at least one of the frequency modulation change rate, the sweep time, and the frequency modulation band is different for each of a plurality of periods corresponding to the code length of a code sequence (e.g., for each of the periods of (Loc×Tr)).

For example, a plurality of different chirp signals having a relationship satisfying following conditions A1 (=A2) and B1 (=B2) may be used. Note that, conditions A1 and A2 may be collectively referred to as "conditions A" and conditions B1 and B2 may be collectively referred to as "conditions B."

Hereinafter, Loc chirp signals with code length Loc transmitted in the periods (Loc×Tr) are serially referred to as first, second, . . . , and Loc-th chirp signals.

Further, regarding the Loc chirp signals transmitted in the periods of (Loc×Tr), the frequency modulation change rate is denoted by $CPRATE_1, CPRATE_2, \ldots, CPRATE_{LOC}$ [Hz/s], the sweep time is denoted by $TSWP_1, TSWP_2, \ldots, TSWP_{LOC}$ [s], and the frequency modulation bandwidth is denoted by $Bw_1, Bw_2, \ldots, Bw_{LOC}$ [Hz].

(Condition A1)

The chirp signals transmitted in the periods of (Loc×Tr) satisfy the following relationship:

$$CPRATE_1 = CPRATE_2 = \ldots = CPRATE_{LOC} \text{ and } TSWP_{noc} \geq TSWP_{MIN}.$$

Here, $TSWP_{MIN}$ is the minimum value of $TSWP_1, TSWP_2, \ldots, TSWP_{LOC}$.

Note that, from $Bw_{noc} = TSWP_{noc} \times CPRATE_{noc}$, following condition A2 is also satisfied at the same time when condition A1 is satisfied.

(Conditions A2)

Loc chirp signals transmitted in the periods of (Loc×Tr) satisfy the following relationship:

$$CPRATE_1 = CPRATE_2 = \ldots = CPRATE_{LOC} \text{ and } Bw_{noc} \geq Bw_{MIN}.$$

Here, $Bw_{MIN}$ is the minimum value of $Bw_1, Bw_2, \ldots, Bw_{LOC}$.

Figure 19:
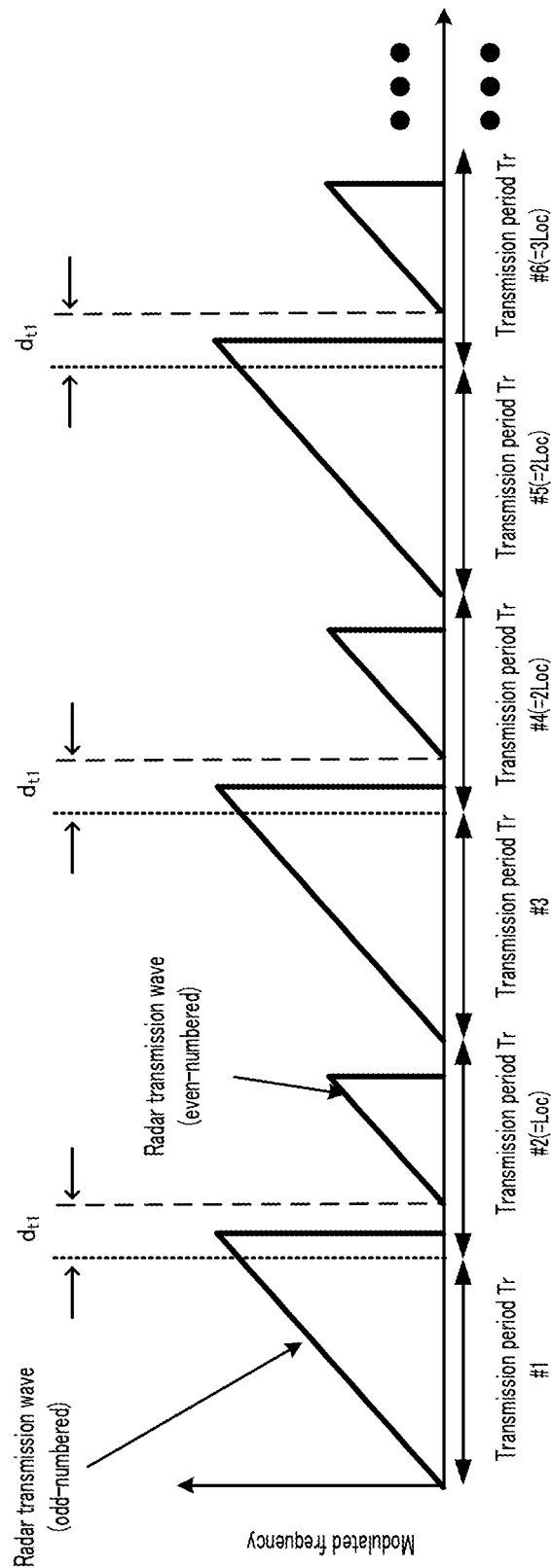
FIG. 19 illustrates an example of transmission signals in a case where the chirp pulse is used.

FIG. 19 illustrates an example of radar transmission signals (for example, radar transmission waves) outputted from radar apparatus 10c according to Variation 4. By way of example, FIG. 19 illustrates chirp signals that satisfy conditions A when Loc=2.

FIG. 19 illustrates, for example, radar transmission waves cyclically transmitting, per transmission periods 2Tr, two chirp signals (first and second chirp signals) transmitted in the periods of 2Tr.

For example, with respect to the first chirp signals transmitted in the odd-numbered transmission periods, the second chirp signals transmitted in the even-numbered transmission periods have the same frequency modulation change rate ($CPRATE_2 = CPRATE_1$), a ½ sweep time ($TSWP_2 = TSWP_1/2$), a ½ frequency modulation band ($BW_2 = BW_1/2$).

In this case, radar apparatus 10c may use a range gate of the second chirp signal with a minimum sweep time also for other chirp signals. It is thus possible to use the same range of distance indices, and different operations of the processing of the beat frequency analysis that are different from those in Embodiment 1 are performed (details will be described later).

Further, for example, when different chirp signals having the relationship satisfying conditions A are used and the range gate of the second chirp signal having the minimum sweep time is used also for the other chirp signals, the distance resolution is determined by frequency modulation bandwidth $Bw_{MIN}$ of the chirp signal having the minimum sweep time. In this case, the distance range is determined by minimum sweep time $TSWP_{MIN}$ (e.g., the sweep time of the chirp signal having the minimum frequency modulation bandwidth $Bw_{MIN}$).

Therefore, since frequency modulation bandwidth $Bw_{MIN}$ of the chirp signal having the minimum sweep time is used also for the other chirp signals, the different chirp signals having the relationship satisfying conditions A provide a relatively coarse distance resolution, and thus are suitable for performing detection in a relatively long distance range.

(Condition B1)

Loc chirp signals transmitted in the periods of (Loc×Tr) satisfy the following relationship:

$Bw_1 = Bw_2 = \ldots = Bw_{LOC}$ and
$TSWP_{noc} = COEFFB_{noc} \times TSWP_{MIN}$ Here, $COEFFB_{noc}$ is an integer value, and noc=1, ..., Loc. In addition, $TSWP_{MIN}$ is the minimum value of $TSWP_1$, $TSWP_2$, ..., $TSWP_{LOC}$. For example, $TSWP_{noc} \geq TSWP_{MIN}$.

Note that, from $Bw_{noc} = TSWP_{noc} \times CPRATE_{noc}$, following condition B2 is also satisfied at the same time when condition B1 is satisfied.

(Condition B2)

Loc chirp signals transmitted in the periods of (Loc×Tr) satisfy the following relationship:

$Bw_1 = Bw_2 = \ldots = Bw_{LOC}$ and
$CPRATE_{noc} = CPRATE_{MAX}/COEFFB_{noc}$ Here, $COEFFB_{noc}$ is an integer value, and noc=1, ..., Loc. In addition, $CPRATE_{MAX}$ is the maximum value of $CPRATE_1$, $CPRATE_2$, ..., $CPRATE_{LOC}$. For example, $CPRATE_{noc} \leq CPRATE_{MAX}$.

Figure 20:
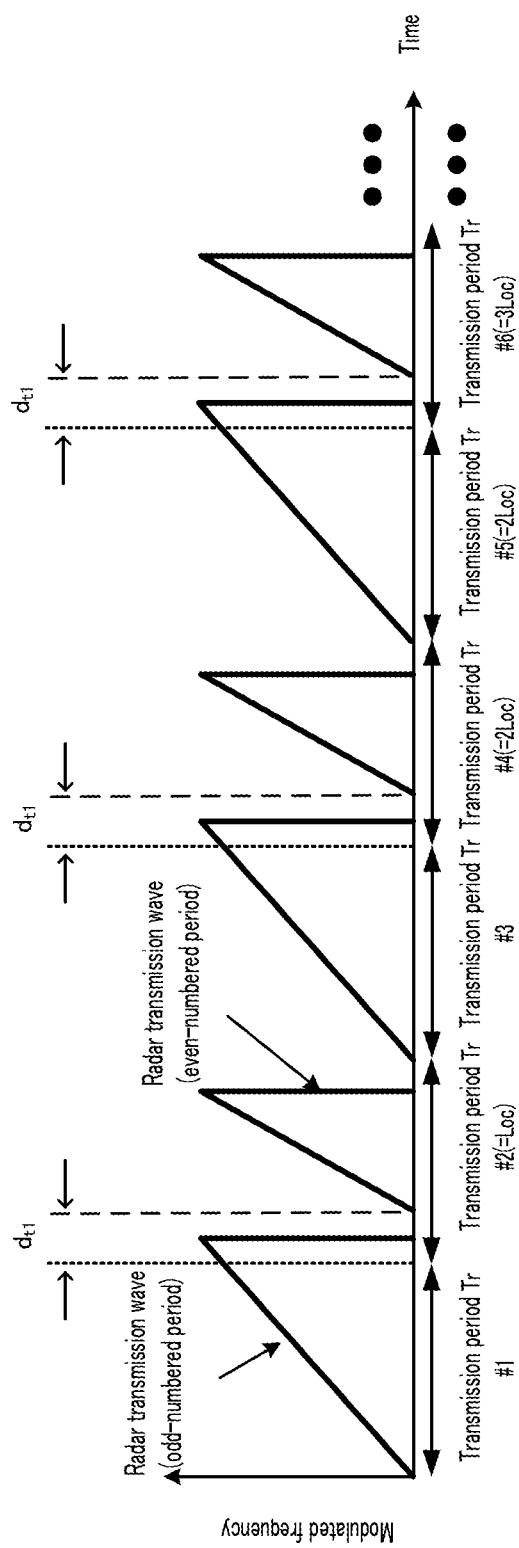
FIG. 20 illustrates an example of transmission signals in a case where the chirp pulse is used.

FIG. 20 illustrates an example of radar transmission signals (for example, radar transmission waves) outputted from radar apparatus 10c according to Variation 4. By way of example, FIG. 20 illustrates chirp signals that satisfy conditions B when Loc=2.

FIG. 20 illustrates, for example, radar transmission waves cyclically transmitting, per transmission period Tr, two chirp signals (first and second chirp signals) transmitted in the periods of 2Tr.

For example, with respect to the first chirp signals transmitted in the odd-numbered transmission periods, the second chirp signals transmitted in the even-numbered transmission periods have the same frequency modulation band ($BW_2 = BW_1$), a ½ sweep time ($TSWP_2 = TSWP_1/2$), and twice the frequency modulation change rate ($CPRATE_2 = CPRATE \times 2$).

In this case, the distance resolution of the first chirp signals is the same as the distance resolution of the second chirp signals, but the sweep time of the second chirp signals is ½ with respect to the first chirp signals. Thus, the distance index range is narrowed to ½. Therefore, the processing of the beat frequency analysis is performed by different operations that are different from those in Embodiment 1 in order for the distance index ranges to be the same (details will be described below).

Further, in the case of conditions B, a plurality of chirp signals with the same frequency modulation band and with a sweep time of an integer multiple (or 1/integer) are used. Here, the distance between the distance indices (hereinafter, referred to as distance resolution) is $\Delta R = R(f_b) - R(f_b - 1) = C_0/(2Bw)$ in accordance with Expression 35. Further, for example, when conditions B are satisfied, the distance resolutions for the outputs of the beat frequency analyzer as obtained by transmission of the chirp signals are the same. In addition, the longer the sweep time of each chirp signal, the farther the distance of the distance index range is obtained. However, since the coded Doppler multiplexing is performed, multiplexing is to be performed in the minimum distance index range, for example.

Therefore, the different chirp signals having the relationship satisfying conditions B are effective when high resolution detection is performed in a relatively short distance range.

Figure 21:
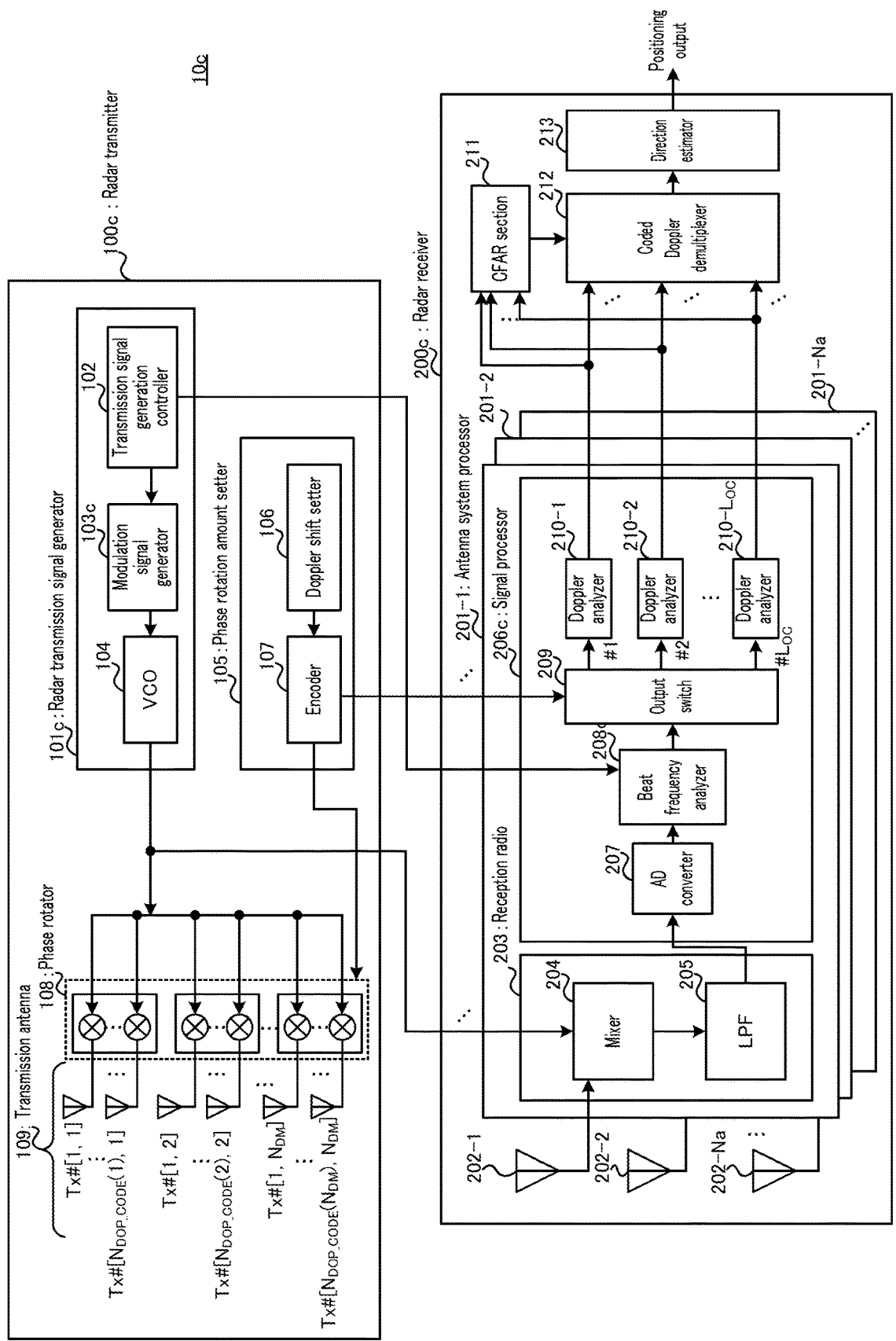
FIG. 21 is a block diagram illustrating an example of a configuration of a radar apparatus.

FIG. 21 is a block diagram illustrating an example configuration of radar apparatus 10c according to Variation 4. Radar apparatus 10c uses different chirp signals, for example, as periodically generated radar transmission waves. Hereinafter, a part of the operation different from the operation of radar apparatus 10 according to Embodiment 1 will be mainly described.

In radar transmitter 100c of radar apparatus 10c, the operation of transmission signal generation controller 102 is the same as that of Embodiment 1. Note that, transmission signal generation controller 102 outputs, for example, information on the types of radar transmission waves (for example, the radar transmission waves satisfying either conditions A or conditions B) to radar receiver 200c (for example, beat frequency analyzer 208c).

Modulation signal generator 103c generates modulation signals for generating Loc chirp signals to be transmitted in periods of (Loc×Tr) based on the generation timings for the radar transmission waves that are from transmission signal generation controller 102. For example, in the case of Loc=2 as illustrated in FIGS. 19 and 20, modulation signal generator 103c generates a modulation signal for generating a first chirp signal based on a first generation timing, and generates a modulation signal for generating a Loc-th (2nd) chirp signal based on a Loc-th (2nd) generation timing. Thereafter, modulation signal generator 103c cyclically repeats the generation of the modulation signal for generating the first chirp signal and the generation of the modulation signal for generating the Loc-th (2nd) chirp signal based on the generation timings of the radar transmission waves.

The subsequent operation of radar transmitter 100c is the same as that of Embodiment 1.

Next, an operation example of radar receiver 200c will be described.

The operation of reception radio 203 is the same as that of Embodiment 1. Note that, LPF 205 in reception radio 203 may change LPF characteristics (for example, a cutoff frequency or passband characteristics) to LPF characteristics suitable for the characteristics of a beat signal obtained from a chirp signal of each radar transmission wave based on information (not illustrated) on the first radar transmission wave generation timing and the second radar transmission wave generation timing that is from transmission signal generation controller 102. For example, LPF 205 may set the LPF characteristics suitable for the characteristics of the beat signal obtained from the chirp signal of the first radar transmission wave based on the first radar transmission wave generation timing, and may set the LPF characteristics suitable for the characteristics of the beat signal obtained from the chirp signal of the second radar transmission wave based on the second radar transmission wave generation timing.

The operation of AD converter 207 in signal processor 206c is the same as that in Embodiment 1.

For example, when the radar transmission waves satisfying conditions A are used, beat frequency analyzer 208c not only performs the operation of Embodiment 1 but also sets the range gate such that Range gate<$TSWP_{MIN}$ is satisfied, so as to adjust the sweep time to the chirp signal with the minimum sweep time.

In addition, when the radar transmission waves satisfying conditions B are used, and in the case of the transmission period in which the noc-th chirp signal is transmitted, beat frequency analyzer 208c sets noc-th range gate $TRG_{noc}$ such that following Expression 63 is satisfied, so as to adjust the sweep time for each chirp signal. Here, TRGmin is a range gate of the chirp signal having the minimum sweep time, and is set by beat frequency analyzer 208c such that TRGmin<TSWPmin is satisfied.

$$TRG_{noc} = COEFFB_{noc} \times TRG\,min \quad \text{(Expression 63)}$$

Further, beat frequency analyzer 208c performs, on the discretely sampled data obtained within the range gate, data puncturing (undersampling) processing to obtain 1/COEFFB$_{noc}$ data. This processing makes uniform the numbers of pieces of discretely sampled data for respective chirp signals. Hereinafter, the number of discrete samples left after the puncturing processing is denoted by "N$_{data}$."

Subsequent operations of radar receiver 200c are the same as those of Embodiment 1.

As described above, radar apparatus 10c in Variation 4 uses, as the radar transmission waves periodically generated by radar transmission signal generator 101c, the different chirp signals having the relationship satisfying conditions A or conditions B.

For example, when the different chirp signals having the relationship satisfying conditions A are used, the distance resolution is determined by frequency modulation bandwidth Bw$_{MIN}$ of the chirp signal having the minimum sweep time. In addition, when the different chirp signals having the relationship satisfying conditions A are used, the distance range is determined by minimum sweep time TSWP$_{MIN}$ (for example, the sweep time of the chirp signal having minimum frequency modulation bandwidth Bw$_{MIN}$) in order to adjust the sweep time to the chirp signal having the minimum sweep time. Thus, the use of the different chirp signals having the relationship satisfying conditions A allows radar apparatus 10c to have, for example, a relatively coarse distance resolution, and radar apparatus 10c is thus suitable for detection in a long distance range.

Further, for example, when the different chirp signals having the relationship satisfying conditions B are used, the distance resolutions of the outputs of beat frequency analyzer 208c as obtained by transmission of the chirp signals are the same. In addition, the longer the sweep time of each chirp signal, the farther the distance of the distance index range is obtained. However, since the coded Doppler multiplexing is performed, multiplexing is to be performed in the minimum distance index range. Thus, the use of the different chirp signals having the relationship satisfying conditions B allows radar apparatus 10c to perform high resolution detection in a relatively short distance range.

Further, in Variation 4, for example, when transmission delay d$_{t1}$ is set longer in the cases of FIGS. 19 and 20, the transmission period of a radar transmission wave may span beyond the timing of the Loc+1-th transmission period (for example, the timing of transmission period Tr #3 in the cases of FIGS. 19 and 20). Even in such a case, for example, using not only one chirp signal (e.g., an odd-numbered chirp signal) but also a different chirp signal (e.g., even-numbered chirp signal) with a sweep time shorter than that of the one chirp signal as illustrated in FIGS. 19 and 20 makes it possible to prevent the different chirp signal from spanning beyond the timing of the Loc+1-th transmission period (the third transmission period in the cases of FIGS. 19 and 20). It is thus possible to set a longer transmission delay.

Note that, in Variation 4, a variant radar transmission wave for detection in different sensing ranges may further be transmitted in the no-signal time section as described in Variation 2.

Figure 22:
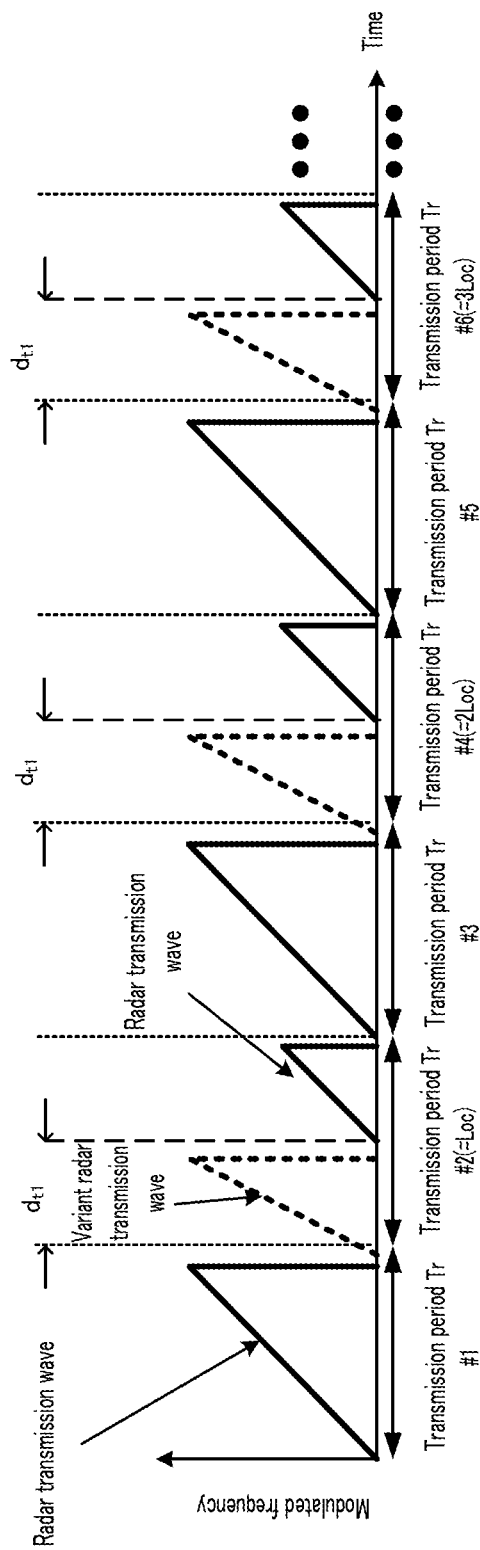
FIG. 22 illustrates an example of transmission signals in a case where the chirp pulse is used.
Figure 23:
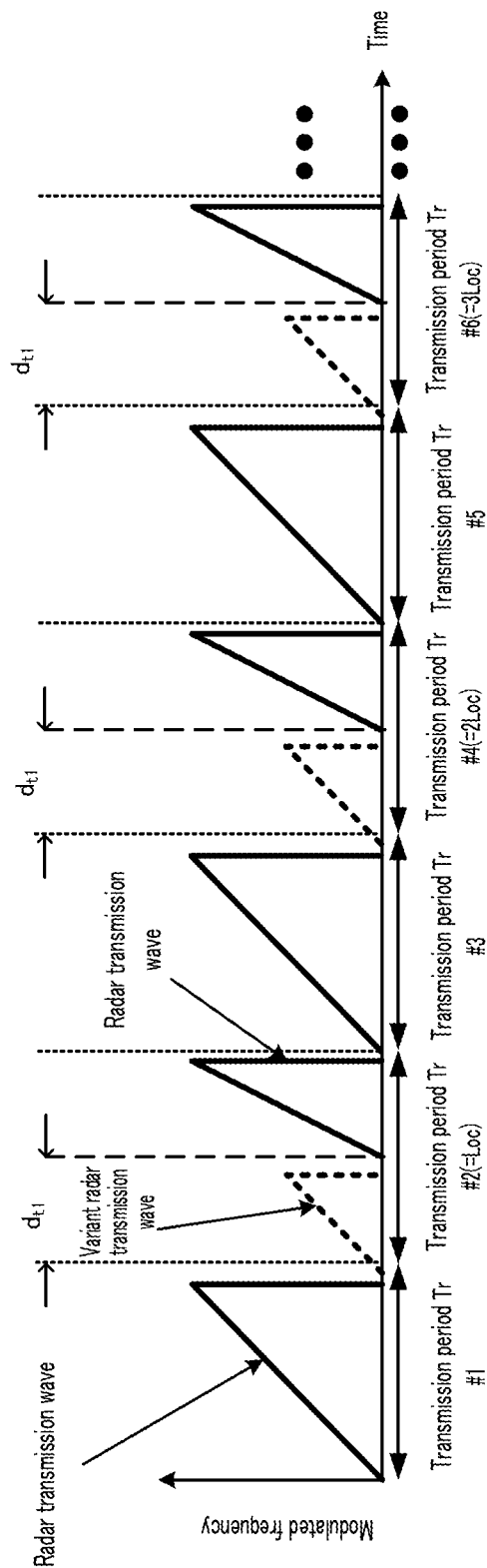
FIG. 23 illustrates an example of transmission signals in a case where the chirp pulse is used.

FIG. 22 illustrates an example in which, when Loc=2, variant radar transmission waves (chirp signals) are transmitted among the radar transmission waves satisfying conditions A in no-signal time sections including a time section for which transmission delay d$_{t1}$ is set in transmission period Tr. In addition, FIG. 23 illustrates an example in which, when Loc=2, variant radar transmission waves (chirp signals) are transmitted among the radar transmission waves satisfying conditions B in no-signal time sections including a time section for which transmission delay d$_{t1}$ is set in transmission period Tr.

Figure 24:
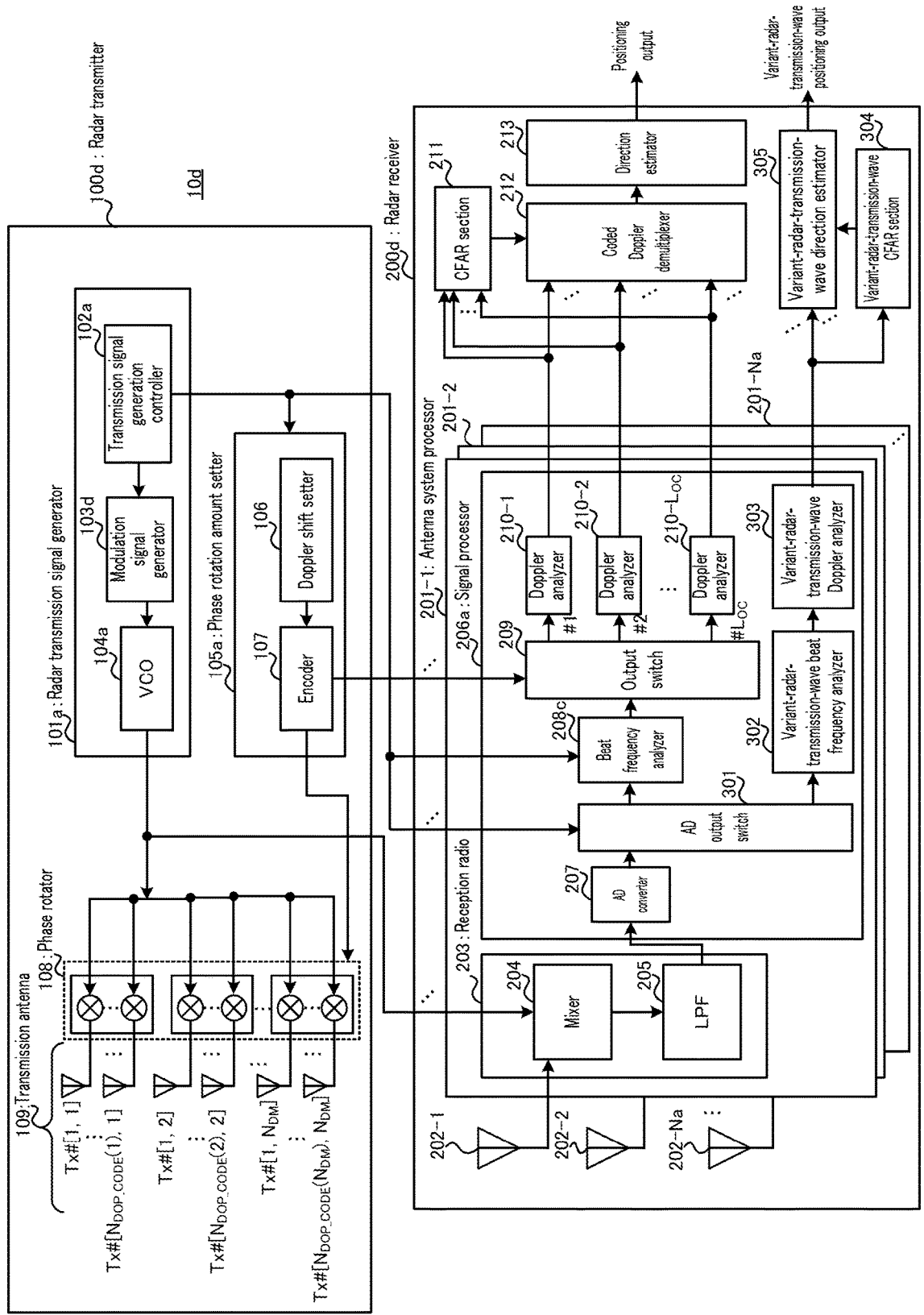
FIG. 24 is a block diagram illustrating an example of a configuration of a radar apparatus.

FIG. 24 is a block diagram illustrating an example of configuration of radar apparatus 10d performing the above operations. The operations of constituent sections illustrated in FIG. 24 are the same as those of the constituent sections in, for example, Variation 2 (FIG. 16) and Variation 4 (FIG. 21), and the description thereof is omitted. Note that modulation signal generator 103d illustrated in FIG. 24 may perform, for example, both the operation of modulation signal generator 103a of Variation 2 and the operation of modulation signal generator 103c of Variation 4.

With such a configuration, the effects of Embodiment 1, Invention 2-1, and Invention 2-3 can be obtained.

Note that radar transmitter 100d may perform MIMO multiplexing transmission of the variant radar transmission wave using a plurality of transmission antennas 109. In this case, radar transmitter 100d may set a phase rotation amount for multiplexing transmission by code multiplexing or Doppler multiplexing, or by code multiplexing and Doppler multiplexing in combination. Further, in radar receiver 200d, a multiplexed signal separator (not illustrated) may be provided on the downstream or upstream side of variant-radar-transmission-wave Doppler analyzer 303, and the multiplexed signal separator may perform the direction estimation processing. A conventional method may be applied to the processing performed by the multiplexed signal separator and the direction estimation processor, and a detailed description thereof will be omitted.

Further, chirp signals having the relationship satisfying conditions B with the odd-numbered chirp signals of the radar transmission waves may be used for variant radar transmission waves. For example, in FIG. 22, chirp signals having the same frequency modulation bandwidth, a shorter (e.g., ½) sweep time, and a higher (e.g., twice) frequency modulation change rate in comparison with the odd-numbered chirp signals of the radar transmission waves are transmitted as the variant radar transmission waves. Thus, the variant radar transmission waves and the odd-numbered chirp signals of the radar transmission waves are the chirp signals having the relationship satisfying conditions B. It is thus possible to perform the coded Doppler multiplexing transmission between the radar transmission waves (odd-numbered waves) and the variant radar transmission waves, and radar apparatus 10d is capable of detection with a higher distance resolution in a shorter distance range than by the radar transmission waves.

Further, chirp signals having the relationship satisfying conditions A with the odd-numbered chirp signals of the radar transmission waves may be used as the variant radar transmission waves. For example, in FIG. 23, chirp signals having a narrower (e.g., ½) frequency modulation bandwidth, a shorter (e.g., ½) sweep time, and the same frequency modulation change rate in comparison with the odd-numbered chirp signals of the radar transmission waves are transmitted as the variant radar transmission waves. Thus, the variant radar transmission waves and the odd-numbered chirp signals of the radar transmission waves are the chirp signals having the relationship satisfying conditions A. It is thus possible to perform the coded Doppler multiplexing transmission between the radar transmission waves (odd-numbered waves) and the variant radar transmission waves, and radar apparatus 10*d* is capable of detection in a longer distance range than by the radar transmission waves.

The foregoing description has been given of an exemplary embodiment of the present disclosure.

Other Embodiments

In a radar apparatus according to an exemplary embodiment of the present disclosure, a radar transmitter and a radar receiver may be individually arranged in physically separate locations. In a radar receiver according to an exemplary embodiment of the present disclosure, a direction estimator and any other component may be individually arranged in physically separate locations.

Further, the numeric values of parameters used in the exemplary embodiment of the present disclosure, such as number Nt of transmission antennas, number Na of reception antennas, number $N_{DM}$ of Doppler multiplexing, number $N_{CM}$ of codes, and delay time $d_t$ are illustrative and are not limited to those values.

A radar apparatus according to an exemplary embodiment of the present disclosure includes, for example, a central processing unit (CPU), a storage medium such as a read only memory (ROM) that stores a control program, and a work memory such as a random access memory (RAM), which are not illustrated. In this case, the functions of the sections described above are implemented by the CPU executing the control program. However, the hardware configuration of the radar apparatus is not limited to that in this example. For example, the functional sections of the radar apparatus may be implemented as an integrated circuit (IC). Each functional section may be formed as an individual chip, or some or all of them may be formed into a single chip.

Various embodiments have been described with reference to the drawings hereinabove. Obviously, the present disclosure is not limited to these examples. Obviously, a person skilled in the art would arrive variations and modification examples within a scope described in claims, and it is understood that these variations and modifications are within the technical scope of the present disclosure. Each constituent element of the above-mentioned embodiments may be combined optionally without departing from the spirit of the disclosure.

The expression "section" used in the above-described embodiments may be replaced with another expression such as "circuit (circuitry)," "device," "unit," or "module."

The above embodiments have been described with an example of a configuration using hardware, but the present disclosure can be realized by software in cooperation with hardware.

Each functional block used in the description of each embodiment described above is typically realized by an LSI, which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

Summary of Present Disclosure

A radar apparatus according to an exemplary embodiment of the present disclosure includes: a plurality of transmission antennas that transmit a transmission signal; and a transmission circuit that applies a phase rotation amount corresponding to a Doppler shift amount and a code sequence to the transmission signal to perform multiplexing transmission of the transmission signal from the plurality of transmission antennas, in which a transmission delay of the transmission signal is set for a transmission period of the transmission signal, each of the plurality of transmission antennas is associated with a combination of the Doppler shift amount and the code sequence such that at least one of the Doppler shift amount and the code sequence is different between a plurality of the combinations, and a number of multiplexing by the code sequence corresponding to a first Doppler shift amount of a plurality of the Doppler shift amounts is different from a number of multiplexing by the code sequence corresponding to a second Doppler shift amount of the plurality of Doppler shift amounts.

In an exemplary embodiment of the present disclosure, a plurality of the transmission delays include at least one transmission delay having a value greater than 0 and less than or equal to ½ of the transmission period.

In an exemplary embodiment of the present disclosure, a number of phases used for a phase rotation amount for applying the Doppler shift amount is less than a number of the plurality of transmission antennas.

In an exemplary embodiment of the present disclosure, an interval between phase rotation amounts for applying the plurality of Doppler shift amounts respectively is an equal interval.

In an exemplary embodiment of the present disclosure, an interval between phase rotation amounts for applying the plurality of Doppler shift amounts respectively is an unequal interval.

In an exemplary embodiment of the present disclosure, a number of phases used for a phase rotation amount for applying the Doppler shift amount is equal to a number of the plurality of Doppler shift amounts used for the multiplexing transmission.

In an exemplary embodiment of the present disclosure, the radar apparatus further including: a plurality of reception antennas that receive a reflected wave signal that is the transmission signal reflected from a target; and a reception circuit that judges aliasing of the reflected wave signal in a Doppler frequency domain based on a code sequence among a plurality of the code sequences which is different from a code sequence used for code multiplexing in the transmission circuit.

In an exemplary embodiment of the present disclosure, the transmission circuit transmits a first transmission signal in each of a plurality of the transmission periods, and transmits a second transmission signal in a no-transmission time section between transmissions of the first transmission signals, and the no-transmission time section includes a time section for which the transmission delay is set.

In an exemplary embodiment of the present disclosure, the first transmission signal and the second transmission signal are chirp signals, and at least one of a frequency modulation bandwidth, a sweep time, and a frequency modulation change rate is different between the first transmission signal and the second transmission signal.

In an exemplary embodiment of the present disclosure, the second transmission signal has a same frequency modulation bandwidth as the first transmission signal, and a shorter sweep time than the first transmission signal.

In an exemplary embodiment of the present disclosure, the second transmission signal has a narrower frequency modulation bandwidth than the first transmission signal, and a same frequency modulation change rate as the first transmission signal.

In an exemplary embodiment of the present disclosure, the transmission circuit transmits a first transmission signal and a second transmission signal in each of a plurality of the transmission periods.

In an exemplary embodiment of the present disclosure, the first transmission signal and the second transmission signal are chirp signals, and at least one of a frequency modulation bandwidth, a sweep time, and a frequency modulation change rate is different between the first transmission signal and the second transmission signal.

In an exemplary embodiment of the present disclosure, the transmission circuit transmits a plurality of the transmission signals in each of a plurality of the transmission periods corresponding to a code length of the code sequence, the plurality of transmission signals being different from one another in at least one of a frequency modulation bandwidth, a sweep time, and a frequency modulation change rate.

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2020-197085, filed on Nov. 27, 2020, the disclosure of which including the specification, drawings and abstract is incorporated herein by reference in its entirety.

INDUSTRIAL APPLICABILITY

The present disclosure is suitable as a radar apparatus for wide-angle range sensing.

REFERENCE SIGNS LIST 10, 10b, 10c, 10d Radar apparatus
100, 100a, 100b, 100c, 100d Radar transmitter
101, 101a, 101b, 101c Radar transmission signal generator
102, 102a, 102b Transmission signal generation controller
103a, 103b, 103c Modulation signal generator
104a, 104b VCO
105a, 105b Phase rotation amount setter
106 Doppler shift setter
107 Encoder
108 Phase rotator
109 Transmission antenna
200, 200a, 200b, 200c, 200d Radar receiver
201 Antenna system processor
202 Reception antenna
203 Reception radio
204 Mixer
205 LPF
206, 206a, 206b, 206c Signal processor
207 AD converter
208, 208c Beat frequency analyzer
209 Output switch
210 Doppler analyzer
211 CFAR section
212 Coded Doppler demultiplexer
213 Direction estimator
301, 401 AD output switch
302 Variant-radar-transmission-wave beat frequency analyzer
303 Variant-radar-transmission-wave Doppler analyzer
304 Variant-radar-transmission-wave CFAR section
305 Variant-radar-transmission-wave direction estimator

The invention claimed is:

1. A radar apparatus, comprising:
a plurality of transmission antennas, which, in operation, transmit a plurality of transmission signals in a plurality of transmission periods; and
circuitry, which, in operation,
applies a plurality of phase rotation amounts corresponding to a plurality of Doppler shift amounts and a plurality of code sequences to the plurality of transmission signals to perform multiplexing transmission of the plurality of transmission signals from the plurality of transmission antennas, and
sets a transmission delay for a transmission signal of the plurality of transmission signals in a transmission period of the plurality of transmission periods, the transmission delay having a value that is greater than 0 and less than or equal to ½ of the transmission period,
wherein the plurality of transmission antennas transmit the plurality of transmission signals to which a plurality of combinations of the plurality of Doppler shift amounts and the plurality of code sequences is applied,
at least one of the plurality of Doppler shift amounts or the plurality of code sequences is different between the plurality of combinations, and
a number of multiplexing by the plurality of code sequences corresponding to a first Doppler shift amount of the plurality of Doppler shift amounts is different from a number of multiplexing by the plurality of code sequences corresponding to a second Doppler shift amount of the plurality of Doppler shift amounts.

2. The radar apparatus according to claim 1, wherein a number of phases used for the plurality of phase rotation amounts for applying the plurality of Doppler shift amounts is less than a number of the plurality of transmission antennas.

3. The radar apparatus according to claim 1, wherein an interval between the plurality of phase rotation amounts for applying the plurality of Doppler shift amounts respectively is an equal interval.

4. The radar apparatus according to claim 1, wherein an interval between the plurality of phase rotation amounts for applying the plurality of Doppler shift amounts respectively is an unequal interval.

5. The radar apparatus according to claim 1, wherein a number of phases used for the plurality of phase rotation amounts for applying the plurality of Doppler shift amounts is equal to a number of the plurality of Doppler shift amounts used for the multiplexing transmission.

6. The radar apparatus according to claim 1, further comprising:
- a plurality of reception antennas, which, in operation, receives a plurality of reflected wave signals that are the plurality of transmission signals reflected from a target; and
- a reception circuit, which, in operation, judges aliasing of the plurality of reflected wave signals in a Doppler frequency domain based on a code sequence among the plurality of code sequences which is different from a code sequence used for code multiplexing in the circuitry.

7. The radar apparatus according to claim 1, wherein
the circuitry transmits a first transmission signal among the plurality of transmission signals in each of the plurality of transmission periods, and transmits a second transmission signal among the plurality of transmission signals in a no-transmission time section between transmissions of the first transmission signals, and
the no-transmission time section includes a time section for which the transmission delay is set.

8. The radar apparatus according to claim 7, wherein
the first transmission signal and the second transmission signal are chirp signals, and
at least one of a frequency modulation bandwidth, a sweep time, or a frequency modulation change rate is different between the first transmission signal and the second transmission signal.

9. The radar apparatus according to claim 8, wherein
the second transmission signal has a same frequency modulation bandwidth as the first transmission signal, and a shorter sweep time than the first transmission signal.

10. The radar apparatus according to claim 8, wherein
the second transmission signal has a narrower frequency modulation bandwidth than the first transmission signal, and a same frequency modulation change rate as the first transmission signal.

11. The radar apparatus according to claim 1, wherein
the circuitry transmits a first transmission signal and a second transmission signal in each of the plurality of transmission periods.

12. The radar apparatus according to claim 11, wherein
the first transmission signal and the second transmission signal are chirp signals, and
at least one of a frequency modulation bandwidth, a sweep time, or a frequency modulation change rate is different between the first transmission signal and the second transmission signal.

13. The radar apparatus according to claim 1, wherein
the circuitry transmits the plurality of transmission signals in a number of the plurality of transmission periods corresponding to a code length of the plurality of code sequences, the plurality of transmission signals being different from one another in at least one of a frequency modulation bandwidth, a sweep time, or a frequency modulation change rate.

* * * * *